United States Patent
Dai

(10) Patent No.: US 12,430,896 B2
(45) Date of Patent: Sep. 30, 2025

(54) INFORMATION PROCESSING SYSTEM, INFORMATION PROCESSING DEVICE, AND INFORMATION PROCESSING METHOD THAT PERFORMS AT LEAST ANY ONE OF PLURAL KINDS OF IMAGE PROCESSING ON A TAKEN IMAGE

(71) Applicant: KYOCERA Corporation, Kyoto (JP)

(72) Inventor: Xiaoyan Dai, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 648 days.

(21) Appl. No.: 17/756,882

(22) PCT Filed: Dec. 4, 2020

(86) PCT No.: PCT/JP2020/045287
§ 371 (c)(1),
(2) Date: Jun. 3, 2022

(87) PCT Pub. No.: WO2021/112234
PCT Pub. Date: Jun. 10, 2021

(65) Prior Publication Data
US 2023/0013468 A1 Jan. 19, 2023

(30) Foreign Application Priority Data

Dec. 6, 2019 (JP) ................. 2019-221131
Dec. 20, 2019 (JP) ................. 2019-230748
Dec. 24, 2019 (JP) ................. 2019-233268

(51) Int. Cl.
*G06V 10/776* (2022.01)
*G06V 10/75* (2022.01)
(Continued)

(52) U.S. Cl.
CPC .......... *G06V 10/776* (2022.01); *G06V 10/751* (2022.01); *G06V 10/764* (2022.01);
(Continued)

(58) Field of Classification Search
CPC .. G06V 10/776; G06V 10/751; G06V 10/764; G06V 10/25; G06V 10/46;
(Continued)

(56) References Cited

U.S. PATENT DOCUMENTS 8,903,164 B2 12/2014 Nishimura et al.
9,756,265 B2 9/2017 Kuboyama
(Continued)

FOREIGN PATENT DOCUMENTS

CN 102169581 A 8/2011
CN 109522930 A 3/2019
(Continued)

OTHER PUBLICATIONS

Ayami Iwata et al., "A Proposal of General-Purpose Input Interface by Application of Horizon View Camera", IEEJ Transactions on Electronics, Information and Systems, vol. 126, No. 1, 2006, pp. 44-50; with partial machine translation.
(Continued)

*Primary Examiner* — Kent Yip
(74) *Attorney, Agent, or Firm* — Studebaker Brackett PLLC

(57) ABSTRACT

An information processing system includes an imaging unit that generates an image signal by imaging and an information processing device. The information processing device performs at least any one of plural kinds of image processing on a taken image corresponding to the image signal. The information processing device specifies an object corresponding to a partial image included in the taken image on the basis of a state of the object corresponding to the partial image included in the taken image or a degree of reliability given to a processing result of the performed image processing.

17 Claims, 37 Drawing Sheets

(51) Int. Cl.
  *G06V 10/764* (2022.01)
  *G06V 30/19* (2022.01)
  *G06Q 20/20* (2012.01)
  *G06V 20/50* (2022.01)

(52) U.S. Cl.
  CPC ......... *G06V 30/191* (2022.01); *G06Q 20/202* (2013.01); *G06Q 20/208* (2013.01); *G06V 20/50* (2022.01)

(58) Field of Classification Search
  CPC ...... G06V 20/68; G06Q 20/208; G06Q 30/06; G07G 1/0063; G06T 7/00; G06T 7/254
  USPC .......................................... 382/103, 110, 157
  See application file for complete search history.

(56) References Cited

U.S. PATENT DOCUMENTS

| | | | |
|---|---|---|---|
| 10,642,422 B2 | 5/2020 | Kamamori | |
| 2013/0100295 A1* | 4/2013 | Naito | G07G 1/0063 348/169 |
| 2013/0182899 A1* | 7/2013 | Naito | G06V 10/987 382/103 |
| 2013/0329949 A1* | 12/2013 | Murata | G06F 16/5838 382/103 |
| 2019/0384954 A1* | 12/2019 | Lyubimov | G06K 7/1443 |

FOREIGN PATENT DOCUMENTS

| | | |
|---|---|---|
| CN | 109741551 A | 5/2019 |
| JP | 2008-210388 A | 9/2008 |
| JP | 2013-235578 A | 11/2013 |
| JP | 2013-242854 A | 12/2013 |
| JP | 2014-146890 A | 8/2014 |
| JP | 2015-022624 A | 2/2015 |
| JP | 2016-018459 A | 2/2016 |
| JP | 2017-199289 A | 11/2017 |
| JP | 2017-220198 A | 12/2017 |
| JP | 2018-181081 A | 11/2018 |
| WO | 2016/143067 A1 | 9/2016 |

OTHER PUBLICATIONS

Hiroaki Sakaguchi et al., "Recognizing pointing and calling in the simulator for train-driver's practice", IEICE Technical Report, vol. 113, No. 196, pp. 187-193, Aug. 26, 2013, The Institute of Electronics, Information and Communication Engineers, Japan.

* cited by examiner

FIG. 31

|  | FIRST PROCESSING | | SECOND PROCESSING | | THIRD PROCESSING | |
| --- | --- | --- | --- | --- | --- | --- |
|  | PROCESSING RESULT | DEGREE OF RELIABILITY | PROCESSING RESULT | DEGREE OF RELIABILITY | PROCESSING RESULT | DEGREE OF RELIABILITY |
| PARTIAL IMAGE 430a | RICE BALL WITH PICKLED PLUM | 95% | RICE BALL WITH PICKLED PLUM | 65% | RICE BALL WITH SEA KELP | 64% |
| PARTIAL IMAGE 430b | BUTTER | 94% | BUTTER | 90% | CHEESE | 75% |
| PARTIAL IMAGE 430c | UNABLE TO SPECIFY | - | CHOCOLATE | 80% | CHOCOLATE | 70% |

INFORMATION PROCESSING SYSTEM, INFORMATION PROCESSING DEVICE, AND INFORMATION PROCESSING METHOD THAT PERFORMS AT LEAST ANY ONE OF PLURAL KINDS OF IMAGE PROCESSING ON A TAKEN IMAGE

CROSS REFERENCE TO RELATED APPLICATIONS

This application claims priority from Japanese Patent Application No. 2019-221131 filed Dec. 6, 2019, Japanese Patent Application No. 2019-230748 filed Dec. 20, 2019, and Japanese Patent Application No. 2019-233268 filed Dec. 24, 2019, the entire contents of which are incorporated herein by reference.

TECHNICAL FIELD

The present disclosure relates to an information processing system, an information processing device, and an information processing method.

BACKGROUND ART

There are demands for a technique for recognizing an object based on an image taken from a specific direction without adjusting a posture of a subject. For example, an information processing system that recognizes which item an object is on the basis of an image obtained by photographing the object on an item recognition area in a cash register terminal installed at a store or the like (see Patent Literature 1).

CITATION LIST

Patent Literature

PTL 1: Japanese Unexamined Patent Application Publication No. 2017-220198

SUMMARY OF INVENTION

An information processing system according to an embodiment of the present disclosure includes:
an imaging unit that generates an image signal by imaging; and
an information processing device that performs at least any one of plural kinds of image processing on a taken image corresponding to the image signal,
wherein the information processing device specifies an object corresponding to a partial image included in the taken image on the basis of a state of the object corresponding to the partial image included in the taken image or a degree of reliability given to a processing result of the performed image processing.

An information processing device according to an embodiment of the present disclosure includes:
a communication unit that is communicable with an imaging unit that generates an image signal by imaging; and
a control unit that causes the communication unit to acquire a taken image corresponding to the image signal and performs at least any one of plural kinds of image processing on the acquired taken image,
wherein the control unit specifies an object corresponding to a partial image included in the taken image on the basis of a state of the object corresponding to the partial image included in the taken image or a degree of reliability given to a processing result of the performed image processing.

An information processing method according to an embodiment of the present disclosure includes:
generating an image signal by imaging;
acquiring a taken image corresponding to the image signal and performing at least any one of plural kinds of image processing on the acquired taken image; and
specifying an object corresponding to a partial image included in the taken image on the basis of a state of the object corresponding to the partial image included in the taken image or a degree of reliability given to a processing result of the performed image processing.

An information processing system according to an embodiment of the present disclosure includes:
an imaging unit that generates an image signal by imaging; and
an information processing device that acquires a taken image corresponding to the image signal and specifies an object corresponding to a partial image included in at least any one of two taken images taken at different imaging times on the basis of a difference image between the two taken images.

An information processing device according to an embodiment of the present disclosure includes:
a communication unit that is communicable with an imaging unit that generates an image signal by imaging; and
a control unit that causes the communication unit to acquire a taken image corresponding to the image signal and specifies an object corresponding to a partial image included in at least any one of two taken images taken at different imaging times on the basis of a difference image between the two taken images.

An information processing method according to an embodiment of the present disclosure includes:
generating an image signal by imaging; and
acquiring a taken image corresponding to the image signal and specifying an object corresponding to a partial image included in at least any one of two taken images taken at different imaging times on the basis of a difference image between the two taken images.

An information processing system according to an embodiment of the present disclosure includes:
a camera that generates an image signal by imaging;
a reflecting unit that is disposed within an imaging range of the camera and has a reflecting surface inclined with respect to an optical axis of the camera; and
an information processing device that performs object recognition on a first partial image in a region occupied by the reflecting unit in an entire region of an image corresponding to an image signal received from the camera and a second partial image in a region other than the region occupied by the reflecting unit.

An information processing device according to an embodiment of the present disclosure includes:
a communication unit that receives an image signal generated by imaging performed by a camera whose imaging range includes a reflecting unit having a reflecting surface inclined with respect to an optical axis of the camera; and
a control unit that performs object recognition by using a first partial image in a region occupied by the reflecting unit in an entire region of an image corresponding to the image signal and a second partial image in a region other than the region occupied by the reflecting unit.

An information processing method according to an embodiment of the present disclosure includes:

causing a camera whose imaging range includes a reflecting unit having a reflecting surface inclined with respect to an optical axis of the camera to generate an image signal by imaging; and performing object recognition by using a first partial image in a region occupied by the reflecting unit in an entire region of an image corresponding to the image signal and a second partial image in a region other than the region occupied by the reflecting unit.

BRIEF DESCRIPTION OF DRAWINGS

FIG. 31 illustrates an example of processing results and degrees of reliability according to the embodiment of the present disclosure.

DESCRIPTION OF EMBODIMENTS

Conventional information processing systems have rooms for improvement. According to an embodiment of the present disclosure, improved information processing system, information processing device, and information processing method can be provided.

Embodiments of an information processing system to which the present disclosure has been applied are described below with reference to the drawings.

Figure 1:
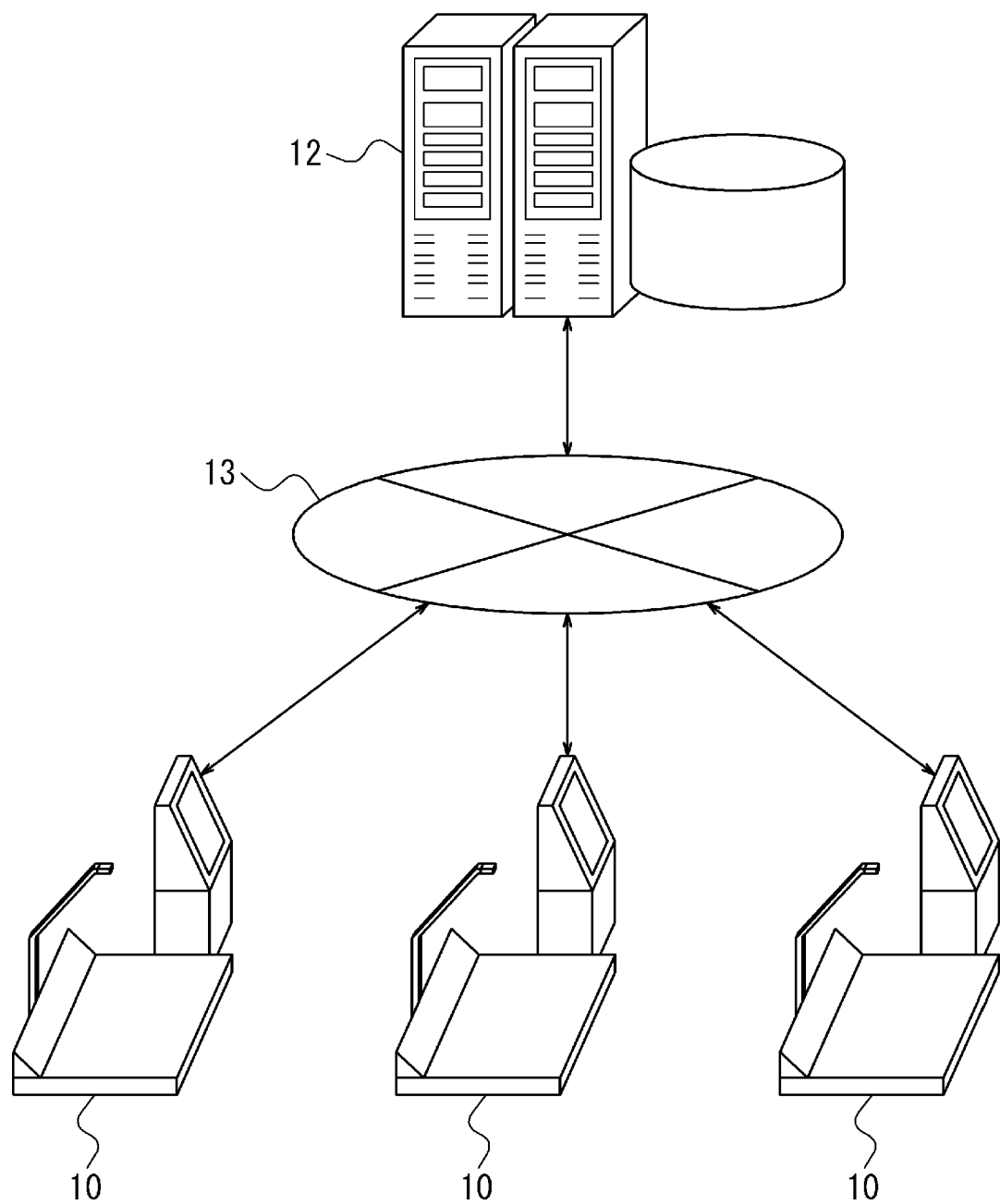
FIG. 1 is a configuration diagram illustrating an overall configuration of a payment system including an information processing system according to the present embodiment.

As illustrated in FIG. 1, a payment system 11 including an information processing system 10 according to an embodiment of the present disclosure includes at least one information processing system 10 and a server 12. In the present embodiment, the payment system 11 includes a plurality of information processing systems 10.

In the present embodiment, each of the information processing systems 10 is included in a register terminal. The information processing system 10 takes an image of an item placed on a register terminal by a purchaser. The information processing system 10 recognizes which item an object included in the image is among items sold at a store by performing object recognition on the taken image. An object in an image means an object drawn in the image. The information processing system 10 notifies the server 12 about a result of recognition of all items placed on the register terminal. The server 12 calculates a billing amount on the basis of the recognition results. The server 12 notifies the information processing system 10 about the billing amount. The information processing system 10 presents the billing amount to the purchaser and requests payment of the billing amount.

Figure 2:
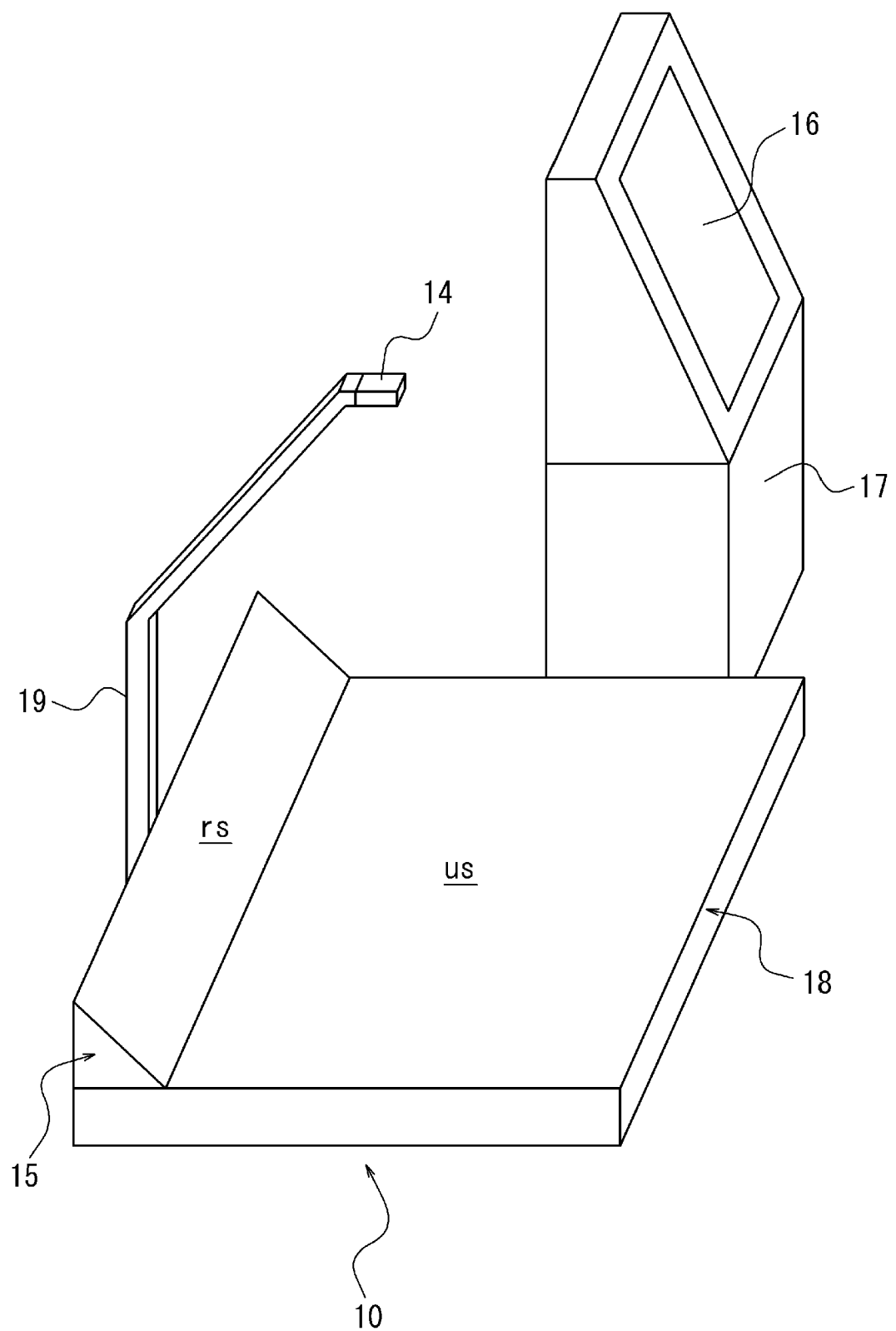
FIG. 2 is a configuration diagram illustrating an overall configuration of the information processing system of FIG. 1.

As illustrated in FIG. 2, the information processing system 10 includes a camera 14, a reflecting unit 15, and an information processing device 17. Furthermore, the information processing system 10 may further include a display device 16, a placing table 18, and a support pole 19.

The camera 14 is fixed so as to be capable of imaging an entire range of the placing table 18. The camera 14 is, for example, fixed on the support pole 19 extending from a side surface of the placing table 18. The camera 14 is, for example, fixed so as to be capable of imaging an entire upper surface us of the placing table 18 and have an optical axis perpendicular to the upper surface us. The camera 14 generates an image signal by successive imaging at any frame rate.

The reflecting unit 15 is disposed at any position within an imaging range of the camera 14. The reflecting unit 15 may be, for example, disposed at any position such as a center or an end portion within the imaging range. Only a single reflecting unit 15 may be disposed or a plurality of reflecting units 15 may be disposed. In the present embodiment, a single reflecting unit 15 is fixed so as to be disposed along one side of the placing table 18 having a rectangular shape. The reflecting unit 15 is, for example, a triangular prism whose length is identical to a longitudinal length of the placing table 18 and whose bottom surface is an isosceles right triangle. The reflecting unit 15 is disposed so that vertexes of two bottom surfaces of the triangular prism are located on the same long side of the placing table 18 and a side surface of the triangular prism faces the upper surface us of the placing table 18. Furthermore, a size of the reflecting unit 15 may be set to an optimum one as appropriate according to a size of the placing table 18 and the imaging range of the camera 14.

A reflecting surface rs of the reflecting unit 15 is inclined with respect to the optical axis of the camera 14. In the present embodiment, the reflecting surface rs of the reflecting unit 15 is formed by coating a side surface corresponding to a bottom side of the bottom surface with a material such as a metal material such as aluminum, silver, or chromium. Although the reflecting surface rs is flat in the present embodiment, the reflecting surface rs may have a spherical shape, an aspherical shape, or a cylinder side surface shape and may have a bulged shape or a recessed shape.

The display device 16 is a conventionally known display. The display device 16 displays an image corresponding to an image signal transmitted from the information processing device 17. The display device 16 may function as a touch screen, as described later.

Figure 3:
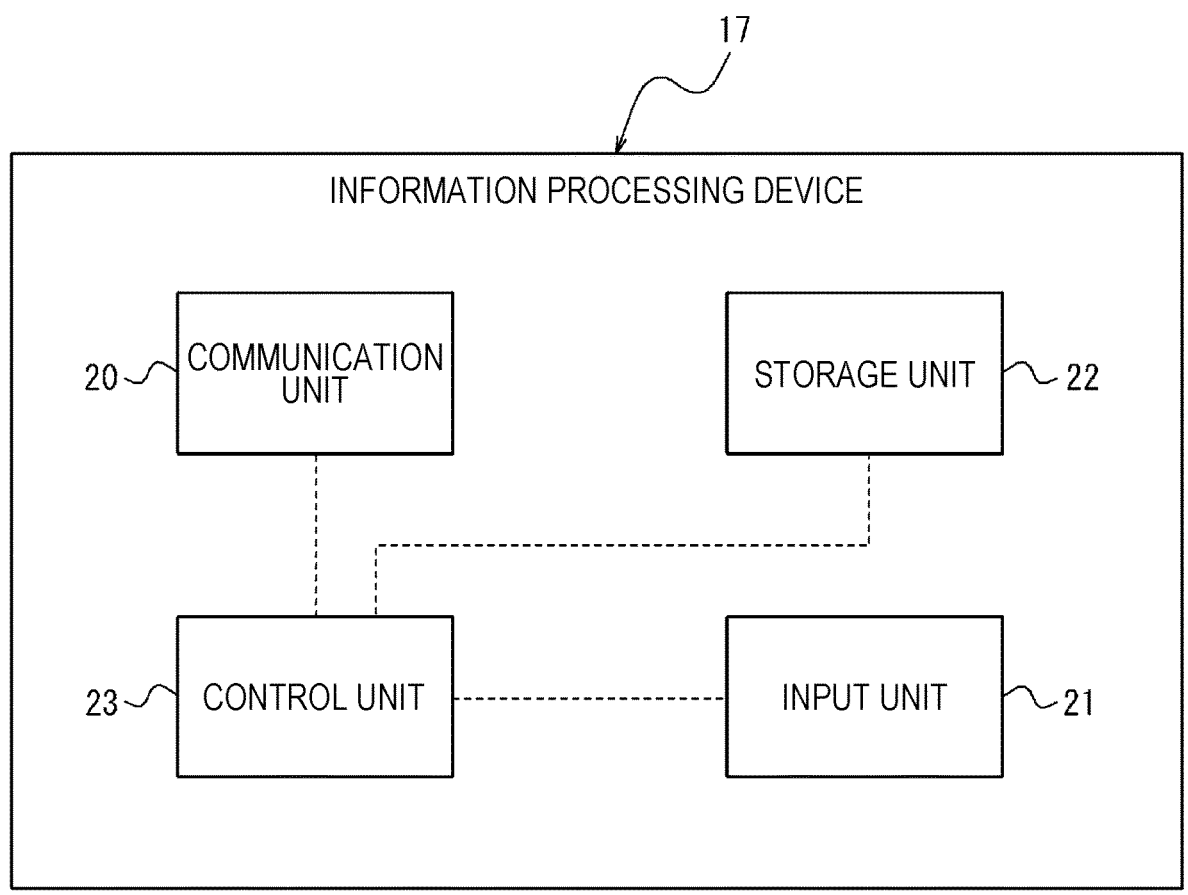
FIG. 3 is a functional block diagram illustrating an outline configuration of an information processing device of FIG. 2.

As illustrated in FIG. 3, the information processing device 17 includes a communication unit 20, an input unit 21, a storage unit 22, and a control unit 23. Although the information processing device 17 is configured as a device different from the camera 14, the reflecting unit 15, and the display device 16, the information processing device 17 may be, for example, integral with at least one of the camera 14, the reflecting unit 15, the placing table 18, the support pole 19, and the display device 16.

The communication unit 20 includes, for example, a communication module that communicates with the camera 14 through a wired or wireless communication line. The communication unit 20 receives an image signal from the camera 14. The communication unit 20 includes a communication module that communicates with the display device 16 through a communication line. The communication unit 20 transmits an image signal corresponding to an image to be displayed to the display device 16. The communication unit 20 may receive, from the display device 16, a position signal corresponding to a position at which contact is detected on a display surface. The communication unit 20 includes a communication module that communicates with the server 12 over a network 13. The communication unit 20 transmits result information corresponding to a confirmed recognition result, which will be described later, to the server 12. The communication unit 20 may receive, from the server 12, bill information corresponding to a billing amount.

The input unit 21 includes one or more interfaces for detecting user's entry. The input unit 21 may include, for example, a physical key, a capacitive key, and a touch screen integral with the display device 16. In the present embodiment, the input unit 21 is a touch screen.

The storage unit 22 includes, for example, storage devices such as a random access memory (RAM) and a read only memory (ROM). The storage unit 22 stores therein various programs for causing the control unit 23 to function and various kinds of information used by the control unit 23.

The control unit 23 includes one or more processors and a memory. The processors may include a general-purpose processor that reads a specific program and executes a specific function and a dedicated processor specialized for specific processing. The dedicated processor may include an application specific integrated circuit (ASIC). The processors may include a programmable logic device (PLD). The PLD may include a field-programmable gate array (FPGA). The control unit 23 may be a system-on-a-chip (SoC) or a system in a package (SiP) in which one or a plurality of processors work together.

Figure 4:
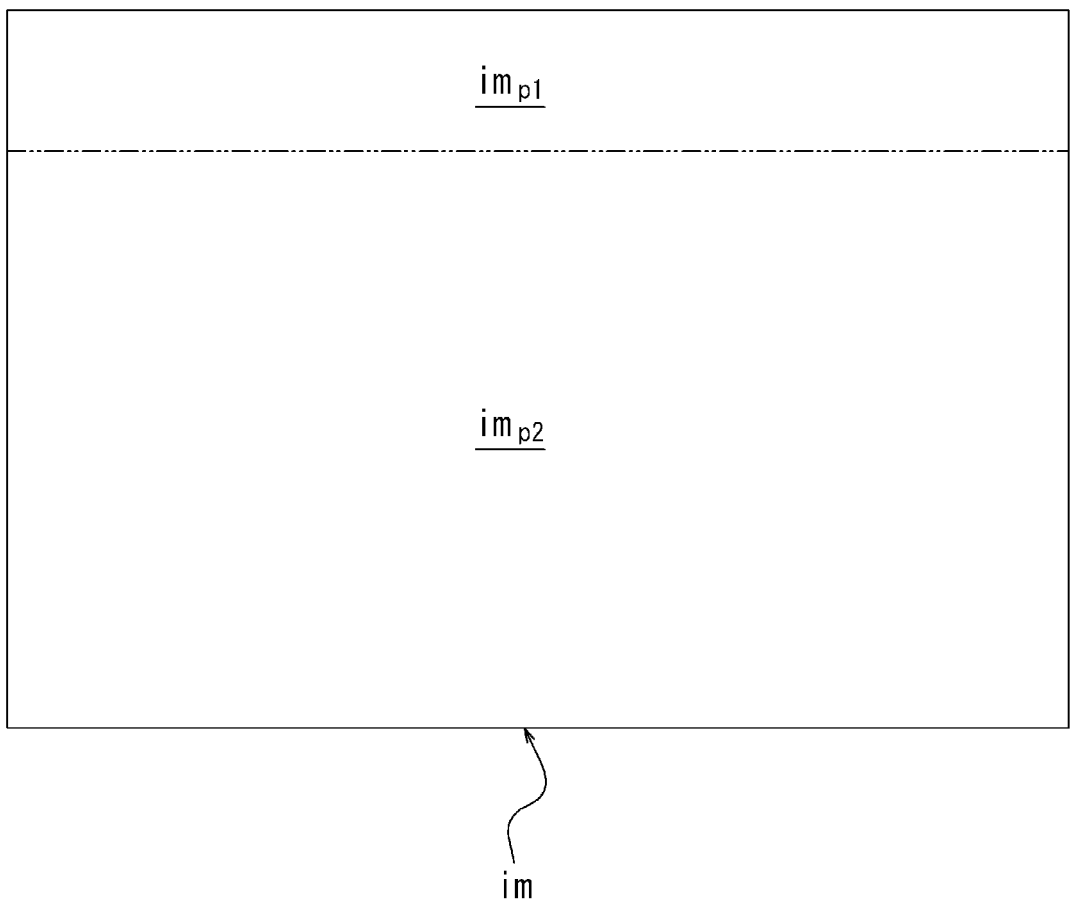
FIG. 4 is a view for explaining a region of a first partial image and a region of a second partial image in an image taken by a camera of FIG. 2.

As illustrated in FIG. 4, the control unit 23 divides an image im corresponding to an image signal received from the camera 14 into a first partial image $im_{p1}$ and a second partial image $im_{p2}$. The first partial image $im_{p1}$ is an image of a region occupied by the reflecting unit 15 in an entire region of the image im corresponding to the image signal. The second partial image $im_{p2}$ is an image of a region other than the region occupied by the reflecting unit 15 in the entire region of the image.

The control unit 23 performs object recognition on the first partial image $im_{p1}$ and the second partial image $im_{p2}$, as described below. The object recognition means grasping what an object in the image im is and creating a recognition result. The control unit 23 may, for example, detect an object in the image im and create a recognition result indicating what the detected object is. In the present embodiment, detection of an object in the image im means individually grasping the presence of the object in the image im together with a position thereof. Alternatively, the control unit 23 may, for example, create a recognition result by directly performing object recognition without detecting an object in the image im. By the object recognition, for example, the control unit 23 recognizes an object that is placed on the placing table 18 and is located within the imaging range of the camera 14.

The control unit 23 performs the object recognition on the first partial image $im_{p1}$ and the second partial image $im_{p2}$, for example, by a known recognition method such as barcode detection, deep neural network (DNN), pattern matching, or character recognition. The control unit 23 provisionally recognizes an object in the image im by the object recognition and calculates a degree of reliability of the provisional recognition result of the object. The degree of reliability is an index indicative of accuracy of the recognition result.

The control unit 23 may recognize an object, for example, by any of the following first to fourth methods. Note that the following describes object recognition using each of the methods assuming that the object recognition is performed in a situation where a "rice ball" and a "bottle of tea" (hereinafter referred to as "tea") are placed on the placing table 18.

According to the first method, the control unit 23 performs object recognition on one of the first and second partial images $im_{p1}$ and $im_{p2}$. In the present embodiment, the control unit 23 performs object recognition on the second partial image $im_{p2}$. The control unit 23 provisionally recognizes each object by object recognition and creates a provisional recognition result. The control unit 23 compares a degree of reliability given to each object with a threshold value. In a case where the degrees of reliability of all of the objects are higher than the threshold value, the control unit 23 confirms, as final recognition results, the provisional recognition results created for all of the objects by the object recognition performed on the second partial image $im_{p2}$. For example, in a case where provisional recognition results of two objects recognized in the second partial image $im_{p2}$ are a "rice ball" and "tea" and degrees of reliability of the provisional recognition results are higher than the threshold value, the control unit 23 confirms the provisional recognition results "rice ball" and "tea" as final recognition results.

Furthermore, according to the first method, in a case where a degree of reliability given to at least one of the objects by the object recognition performed on the second partial image $im_{p2}$ is equal to or less than the threshold value, the control unit 23 performs object recognition on the other partial image, that is, the first partial image $im_{p1}$. For example, in a case where provisional recognition results of the two objects recognized in the second partial image $im_{p2}$ are a "rice ball" and "green juice" and a degree of reliability given to one of the objects is equal to or less than the threshold value, the control unit 23 performs object recognition on the first partial image $im_{p1}$.

Furthermore, according to the first method, the control unit 23 confirms, as final recognition results, provisional recognition results of all of the objects created by the object recognition on the first partial image $im_{p1}$. For example, the control unit 23 confirms, as final recognition results, provisional recognition results "rice ball" and "tea" of the two objects recognized in the first partial image $im_{p1}$.

According to the second method, the control unit 23 performs object recognition on one of the first and second partial images $im_{p1}$ and $im_{p2}$ and comparison between degrees of reliability for all objects and a threshold value, as in the first method. In the present embodiment, in a case where there is an object whose degree of reliability is higher than the threshold value among all objects, the control unit 23 confirms, as a final recognition result, a recognition result created for the object by the object recognition on the one partial image, that is, the second partial image $im_{p2}$. For example, in a case where a provisionary recognition result of one of the two objects recognized in the second partial image $im_{p2}$ is a "rice ball" and a degree of reliability thereof is higher than the threshold value, the control unit 23 confirms, as a final recognition result, the provisional recognition result "rice ball" of the object.

Furthermore, according to the second method, in a case where a degree of reliability given to an object by object recognition performed on the second partial image $im_{p2}$ is equal to or lower than the threshold value, the control unit 23 associates the object in the second partial image $im_{p2}$ with an object recognized in the first partial image $im_{p1}$. For example, the control unit 23 may regard objects located at the same position in a specific direction in the first partial image $im_{p1}$ and the second partial image $im_{p2}$ as an identical object and associate these objects. The control unit 23 performs object recognition of the associated object in the other partial image, that is, the first partial image $im_{p1}$. For example, in a case where a provisional recognition result of one of the two objects recognized in the second partial image $im_{p2}$ is "green juice" and a degree of reliability thereof is equal to or lower than the threshold value, the control unit 23 performs object recognition of this object in the first partial image $im_{p1}$.

Furthermore, according to the second method, the control unit 23 confirms, as a final recognition result, a provisional recognition result created for the object by the object recognition performed on the first partial image $im_{p1}$. For example, in a case where as a result of the object recognition performed on the first partial image $im_{p1}$, a provisional recognition result "tea" is created for the object for which the provisional recognition result "green juice" has been created by the object recognition performed on the second partial image $im_{p2}$, the control unit 23 confirms the provisional recognition result "tea" as a final recognition result.

According to the first method and the second method, the control unit 23 may determine on which of the first partial image $im_{p1}$ and the second partial image $im_{p2}$ object recognition is performed earlier on the basis of a degree of ease. The degree of ease is a value indicative of easiness of creation of an accurate recognition result for an image on which object recognition is performed.

The control unit 23, for example, performs segmentation on each of the first partial image $im_{p1}$ and the second partial image $im_{p2}$ to calculate a degree of ease and extracts a segmentation region in each of the first partial image $im_{p1}$ and the second partial image $im_{p2}$. A segmentation region is a region where an image regarded as a single object is formed. The control unit 23 may calculate, as a degree of ease, the number of segmentation regions extracted in each of the first partial image $im_{p1}$ and the second partial image $im_{p2}$. The number of segmentation regions is equivalent to the number of objects detected in each of the first partial image $im_{p1}$ and the second partial image $im_{p2}$. Alternatively, the control unit 23 may calculate, as degrees of ease, a total size of the segmentation regions with respect to the size of the first partial image $im_{p1}$ and a total size of the segmentation regions with respect to the size of the second partial image $im_{p2}$. Alternatively, the control unit 23 may calculate, as degrees of ease, a total size of the segmentation regions in the first partial image $im_{p1}$ and a total size of the segmentation regions in the second partial image $im_{p2}$.

The control unit 23 may perform object recognition on one of the first and second partial images $im_{p1}$ and $im_{p2}$ that is higher in calculated degree of ease.

According to the third method, the control unit 23 performs object recognition on each of the first partial image $im_{p1}$ and the second partial image $im_{p2}$. The control unit 23 associates an object provisionally recognized in the first partial image $im_{p1}$ and an object provisionally recognized in the second partial image $im_{p2}$. For example, the control unit 23 may regard objects located at the same position in a specific direction in the first partial image $im_{p1}$ and the second partial image $im_{p2}$ as an identical object and associate these objects. Alternatively, the control unit 23 may regard objects located in the first partial image $im_{p1}$ and the second partial image $im_{p2}$ and whose shapes (including shapes of edges) are identical as an identical object and associate these objects. In a case where provisional recognition results of the associated objects match each other, the control unit 23 confirms the provisional recognition results of the objects as a final recognition result.

Furthermore, according to the third method, in a case where the provisional recognition results of the associated objects are different, the control unit 23 presents the provisional recognition results. For example, the control unit 23 may present the provisional recognition results to a user by causing an image indicative of the provisional recognition results to be displayed on the display device 16. In the configuration in which an image is displayed, the control unit 23 controls the communication unit 20 to generate an image signal corresponding to the image and transmit the image signal to the display device 16. The control unit 23 may, for example, present the provisional recognition results by a method other than the method of displaying an image, such as presentation using voice. The control unit 23 may present provisional recognition results in descending order of a degree of reliability. In a case where user's selection of a provisional recognition result from among the presented provisional recognition results is detected by the input unit 21, the control unit 23 may confirm the selected provisional recognition result as a final recognition result.

For example, in a case where provisional recognition results created by object recognition for objects associated between the first partial image $im_{p1}$ and the second partial image $im_{p2}$ are "tea" and "green juice", the control unit 23 presents the recognition results "tea" and "green juice". In a case where a degree of reliability of the provisional recognition result "tea" in the first partial image $im_{p1}$ is higher than a degree of reliability of the provisional recognition result "green juice" in the second partial image $im_{p2}$, the provisional recognition results are presented in an order of "tea" and "green juice".

Alternatively, according to the third method, in a case where the provisional recognition results of the associated objects are different and a degree of reliability of at least one of the provisional recognition results exceeds a threshold value, the control unit 23 confirms the provisional recognition result of the higher degree of reliability as a final recognition result of the object. For example, in a case where provisional recognition results created by object recognition for objects associated between the first partial image $im_{p1}$ and the second partial image $im_{p2}$ are "tea" and "green juice" and a degree of reliability of each of the provisional recognition results is higher than the threshold value, the control unit 23 confirms, as a final recognition result, the provisional recognition result "tea" of the higher degree of reliability.

According to the fourth method, the control unit 23 detects an object in each of the first partial image $im_{p1}$ and the second partial image $im_{p2}$. The control unit 23 associates an object detected in the first partial image $im_{p1}$ and an object detected in the second partial image $im_{p2}$. The control unit 23 extracts portions where the associated objects are detected in the first partial image $im_{p1}$ and the second partial image $im_{p2}$. The control unit 23 performs object recognition on a combination of the portions extracted from the first partial image $im_{p1}$ and the second partial image $im_{p2}$. The control unit 23 creates a provisional recognition result of the objects by the object recognition performed on the combination of the portions extracted from the first partial image $im_{p1}$ and the second partial image $im_{p2}$. The control unit 23 confirms the created provisional recognition result as a final recognition result.

The control unit 23 controls the communication unit 20 to transmit information indicative of the confirmed final recognition result to the server 12. When information indicative of a billing amount is received from the server 12 in response to the transmission of the information indicative of the final recognition result, the control unit 23 presents the billing amount to a user. The control unit 23 may present the billing amount to the user, for example, by creating an image requesting payment of the billing amount and causing the display device 16 to display the image.

The server 12 is, for example, a physical server or a cloud server. The server 12 specifies an object placed on the placing table 18 in the information processing system 10 on the basis of information indicative of a final recognition result transmitted from the information processing system 10. The server 12 calculates a billing amount for a user of the information processing system 10 by reading out a selling price of the object from a database. The server 12 transmits information indicative of the billing amount to the information processing system 10.

The server 12 may have a reference database of images, features, characters written on surfaces, and the like of a plurality of specific objects used for object recognition in the information processing system 10 and transmit reference information in the reference database to the information processing system 10.

Next, confirming processing according to the first method performed by the control unit 23 in the present embodiment is described with reference to the flowchart of FIG. 5. The confirming processing according to the first method starts every time an image signal of 1 frame is received from the camera 14.

In step S100, the control unit 23 divides an image im corresponding to the received image signal into a first partial image $im_{p1}$ and a second partial image $im_{p2}$. After the division, the processing proceeds to step S101.

In step S101, the control unit 23 extracts a segmentation region from each of the first partial image $im_{p1}$ and the second partial image $im_{p2}$ obtained by the division in step S100. After the extraction, the processing proceeds to step S102.

In step S102, the control unit 23 calculates a degree of ease for each of the first partial image $im_{p1}$ and the second partial image $im_{p2}$ on the basis of the segmentation region extracted in step S101. After the calculation, the processing proceeds to step S103.

In step S103, the control unit 23 selects one of the first and second partial images $im_{p1}$ and $im_{p2}$ that is higher in degree of ease calculated in step S102. After the selection, the processing proceeds to step S104.

In step S104, the control unit 23 performs object recognition on the one of the first and second partial images $im_{p1}$ and $im_{p2}$ selected in step S103. The control unit 23 calculates a degree of reliability of a provisional recognition result of each object provisionally recognized by the object recognition. After the object recognition, the processing proceeds to step S105.

In step S105, the control unit 23 determines whether or not the degrees of reliability of all of the objects recognized in step S104 are higher than a threshold value. In a case where the degrees of reliability of all of the objects are higher than the threshold value, the processing proceeds to step S106. In a case where a degree of reliability of at least one of the objects is not higher than the threshold value, the processing proceeds to step S107.

In step S106, the control unit 23 confirms, as final recognition results, provisional recognition results of all of the objects provisionally recognized in step S104. After the confirmation, the processing proceeds to step S109.

In step S107, the control unit 23 performs object recognition on the other one of the first and second partial images $im_{p1}$ and $im_{p2}$ that is not selected in step S103. After the object recognition, the processing proceeds to step S108.

In step S108, the control unit 23 confirms, as final recognition results, provisional recognition results of all of the objects provisionally recognized by the object recognition in step S108. After the confirmation, the processing proceeds to step S109.

In step S109, the control unit 23 controls the communication unit 20 to transmit information indicative of the final recognition results confirmed in step S106 or step S108 to the server 12. After the transmission, the confirming processing according to the first method is finished.

Next, confirming processing according to the second method performed by the control unit 23 in the present embodiment is described with reference to the flowchart of FIG. 6. The confirming processing according to the second method starts every time an image signal of 1 frame is received from the camera 14.

In steps S200 to S206, the control unit 23 performs the same processes as steps S100 to S106 of the confirming processing according to the first method. In a case where a degree of reliability of at least one of the objects is not higher than the threshold value in step S205, the processing proceeds to step S207. After the confirmation in step S206, the processing proceeds to step S210.

In step S207, the control unit 23 associates the object for which a degree of reliability of a provisional recognition result calculated in step S204 is lower than the threshold value and an object recognized in the other one of the first and second partial images $im_{p1}$ and $im_{p2}$ that is not selected in step S203. After the association, the processing proceeds to step S208.

In step S208, the control unit 23 performs object recognition of the object associated in step S207 on the other one of the first and second partial images $im_{p1}$ and $im_{p2}$ that is not selected in step S203. After the object recognition, the processing proceeds to step S209.

In step S209, the control unit 23 confirms, as a final recognition result, a provisional recognition result created for the object whose degree of reliability calculated in step S204 is lower than the threshold value. The control unit 23 confirms, as a final recognition result, a provisional recognition result created by the object recognition in step S208 for the object whose degree of reliability of the provisional recognition result calculated in step S204 is lower than the threshold value. After the confirmation, the processing proceeds to step S210.

In step S210, the control unit 23 controls the communication unit 20 to transmit information indicative of the final recognition result confirmed in step S206 or step S209 to the server 12. After the transmission, the confirming processing according to the second method is finished.

Figure 7:
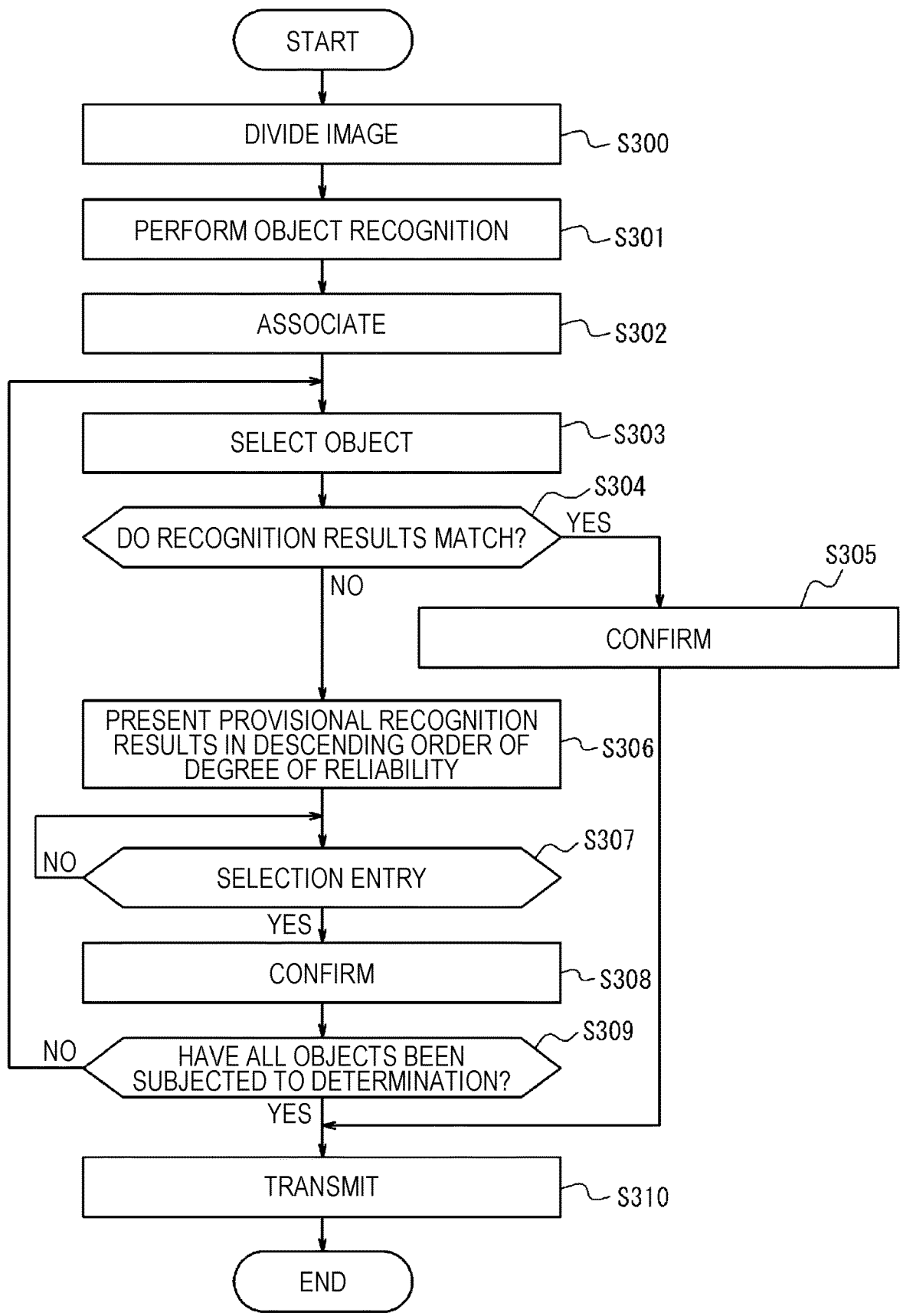
FIG. 7 is a flowchart for explaining confirming processing according to a third method performed by the control unit of FIG. 3.

Next, confirming processing according to the third method performed by the control unit 23 in the present embodiment is described with reference to the flowchart of FIG. 7. The confirming processing according to the third method starts every time an image signal of 1 frame is received from the camera 14.

In step S300, the control unit 23 divides an image im corresponding to the received image signal into a first partial image $im_{p1}$ and a second partial image $im_{p2}$. After the division, the processing proceeds to step S301.

In step S301, the control unit 23 performs object recognition on each of the first partial image $im_{p1}$ and the second partial image $im_{p2}$ obtained by the division in step S300. After the object recognition, the processing proceeds to step S302.

In step S302, the control unit 23 associates an object provisionally recognized in the first partial image $im_{p1}$ by the object recognition in step S301 and an object provisionally recognized in the second partial image $im_{p2}$ by the object recognition in step S301. After the association, the processing proceeds to step S303.

In step S303, the control unit 23 selects objects for which whether or not provisional recognition results thereof match each other has not been determined among all objects associated in step S302. After the selection, the processing proceeds to step S304.

In step S304, the control unit 23 determines whether or not provisional recognition results created for associated objects by the object recognition performed in the first partial image $im_{p1}$ and the second partial image $im_{p2}$ match each other. In a case where the provisional recognition results match each other, the processing proceeds to step S305. In a case where the provisional recognition results do not match each other, the processing proceeds to step S306.

In step S305, the control unit 23 confirms, as a final recognition result, the provisional recognition results created for the objects selected in step S303 by the object recognition in step S301. After the confirmation, the processing proceeds to step S310.

In step S306, the control unit 23 presents the provisional recognition results created by the object recognition performed on the first partial image $im_{p1}$ and the second partial image $im_{p2}$ to a user in a descending order of a degree of reliability. After the presentation, the processing proceeds to step S307.

In step S307, the control unit 23 determines whether or not user entry selecting any of the presented provisional recognition results has been detected. In a case where such user entry has not been detected, the processing returns to step S307. In a case where such user entry has been detected, the processing proceeds to step S308.

In step S308, the control unit 23 confirms, as a final recognition result, the provisional recognition result selected by the user entry in step S307. After the confirmation, the processing proceeds to step S309.

In step S309, the control unit 23 determines whether or not all objects associated in step S302 have been subjected to the determination as to whether or not provisional recognition results match each other. In a case where not all objects have been subjected to the determination, the processing returns to step S303. In a case where all objects have been subjected to the determination, the processing proceeds to step S310.

In step S310, the control unit 23 controls the communication unit 20 to transmit information indicative of the final recognition result confirmed in step S305 or step S308 to the server 12. After the transmission, the confirming processing according to the third method is finished.

Figure 8:
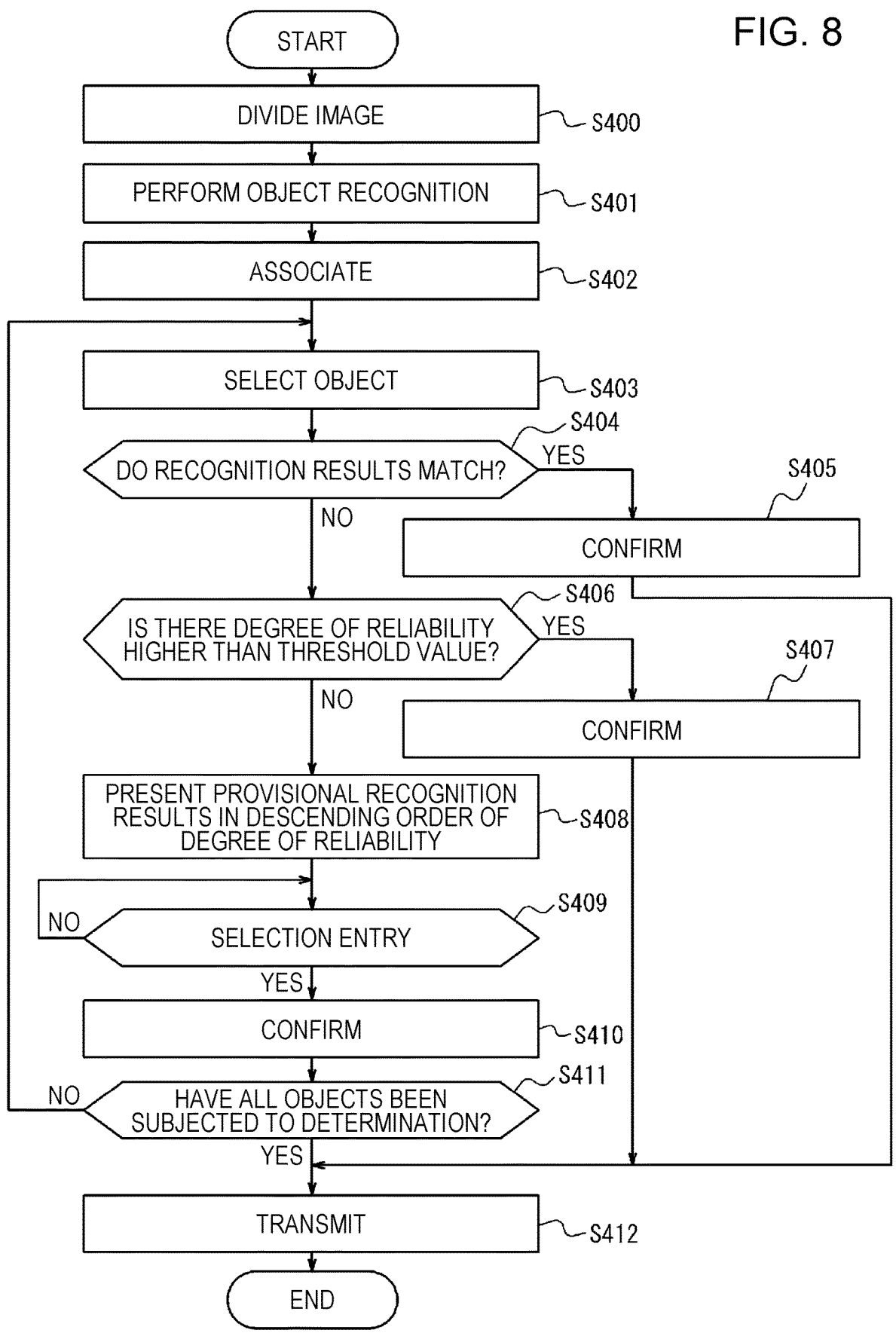
FIG. 8 is a flowchart for explaining confirming processing according to a modification of the third method performed by the control unit of FIG. 3.

Next, confirming processing according to a modification of the third method performed by the control unit 23 in the present embodiment is described with reference to the flowchart of FIG. 8. The confirming processing according to the modification of the third method starts every time an image signal of 1 frame is received from the camera 14.

In steps S400 to S405, the control unit 23 performs the same processes as steps S300 to S305 of the confirming processing according to the third method. In a case where provisional recognition results created for associated objects by the object recognition performed on the first partial image $im_{p1}$ and the second partial image $im_{p2}$ match each other in step S404, the processing proceeds to step S405. After the confirmation in step S405, the processing proceeds to step S412.

In step S406, the control unit 23 determines whether or not a degree of reliability of at least one of provisional recognition results created for the objects selected in step S403 by the object recognition performed on the first partial image $im_{p1}$ and the second partial image $im_{p2}$ is higher than the threshold value. In a case where the degree of reliability of at least one of the provisional recognition results is higher than the threshold value, the processing proceeds to step S407. Otherwise, the processing proceeds to step S408.

In step S407, the control unit 23 confirms, as a final recognition result for the objects selected in step S403, a provisional recognition result of a higher degree of reliability. After the confirmation, the processing proceeds to step S412.

In steps S408 to S412, the control unit 23 performs the same processes as steps S306 to S310 of the confirming processing according to the third method. After transmission of information indicative of the final recognition result in step S412, the confirming processing according to the modification of the third method is finished.

Figure 9:
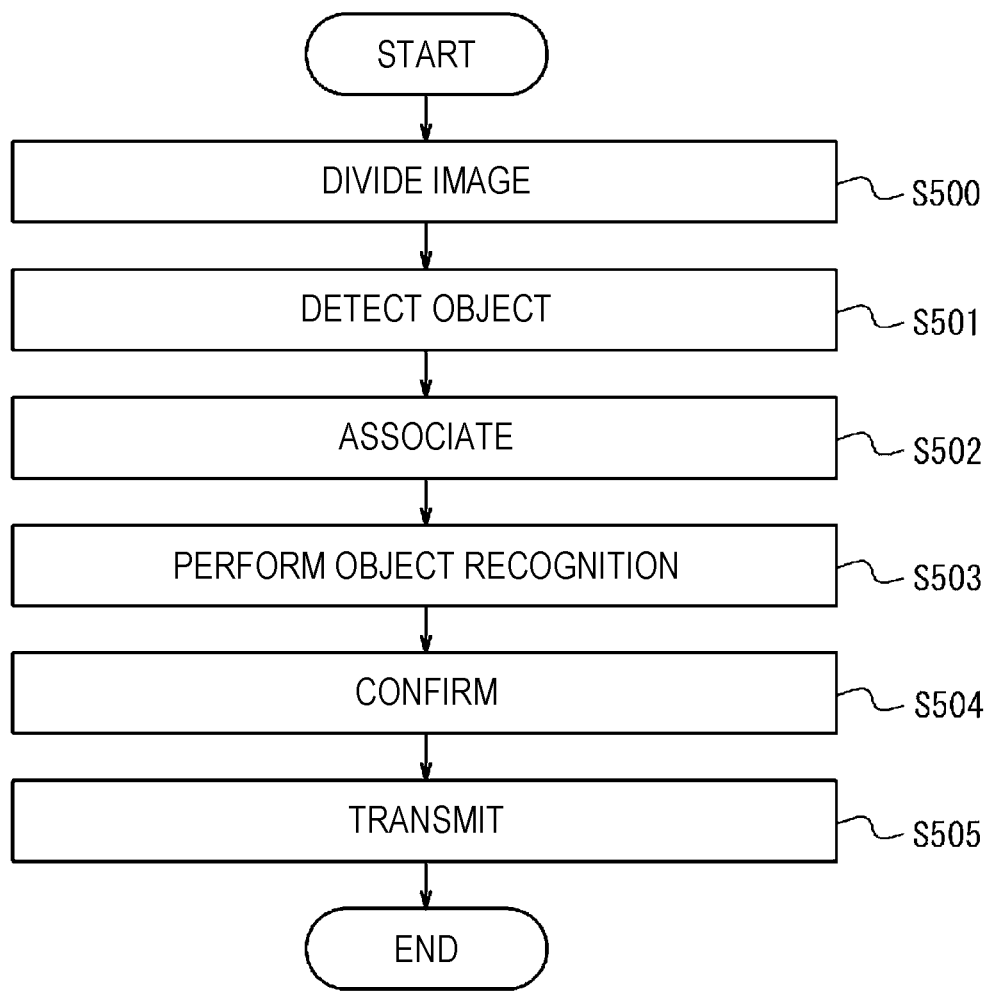
FIG. 9 is a flowchart for explaining confirming processing according to a fourth method performed by the control unit of FIG. 3.

Next, confirming processing according to the fourth method performed by the control unit 23 in the present embodiment is described with reference to the flowchart of FIG. 9. The confirming processing according to the fourth method starts every time an image signal of 1 frame is received from the camera 14.

In step S500, the control unit 23 divides an image im corresponding to the received image signal into a first partial image $im_{p1}$ and a second partial image $im_{p2}$. After the division, the processing proceeds to step S501.

In step S501, the control unit 23 detects an object in each of the first partial image $im_{p1}$ and the second partial image $im_{p2}$ obtained by the division in step S500. After the object detection, the processing proceeds to step S502.

In step S502, the control unit 23 associates an object detected in the first partial image $im_{p1}$ in step S501 and an object detected in the second partial image $im_{p2}$ in step S501. After the association, the processing proceeds to step S503.

In step S503, the control unit 23 extracts portions where the objects associated in step S502 are detected in the first partial image $im_{p1}$ and the second partial image $im_{p2}$. The control unit 23 performs object recognition of the associated objects on a combination of the extracted portions. After the object recognition, the processing proceeds to step S504.

In step S504, the control unit 23 confirms, as a final recognition result, a provisional recognition result created by the object recognition in step S503. After the confirmation, the processing proceeds to step S505.

In step S505, the control unit 23 controls the communication unit 20 to transmit information indicative of the final recognition result confirmed in step S504 to the server 12. After the transmission, the confirming processing according to the fourth method is finished.

The information processing system 10 according to the present embodiment configured as above performs object recognition on the first partial image $im_{p1}$ in a region occupied by the reflecting unit 15 in the entire region of the image im corresponding to the image signal received from the camera 14 and the second partial image $im_{p2}$ in a region other than the region occupied by the reflecting unit 15. According to such a configuration, in the information processing system 10, images of the same object seen from different directions can be included in the first partial image $im_{p1}$ and the second partial image $im_{p2}$. Therefore, the information processing system 10 can perform object recognition by using images of an object seen from a plurality of directions just by the single camera 14 without adjusting a posture of the object. As a result, the information processing system 10 can improve accuracy of recognition of an object with a simple configuration.

Furthermore, the information processing system 10 according to the present embodiment performs object recognition on one of the first and second partial images $im_{p1}$ and $im_{p2}$, calculates a degree of reliability of a provisional recognition result of an object created by the object recognition, and confirms the provisional recognition result of the object in a case where the degree of reliability is higher than a threshold value. According to such a configuration, the information processing system 10 confirms a recognition result on the basis of a degree of reliability, which is an index indicative of accuracy of a recognition result, and therefore can further improve accuracy of recognition of an object.

Furthermore, in a case where a degree of reliability of a provisional recognition result of at least one object created by object recognition performed on one of the first and second partial images $im_{p1}$ and $im_{p2}$ is equal to or less than the threshold value, the information processing system 10 according to the present embodiment performs object recognition on the other one of the first and second partial images $im_{p1}$ and $im_{p2}$ and confirms provisional recognition results of all objects created by this object recognition. According to such a configuration, the information processing system 10 performs object recognition of an object seen from a different direction in a case where recognition accuracy of a recognition result is low, and therefore can perform object recognition keeping high recognition accuracy.

Furthermore, in a case where a degree of reliability of an object created by object recognition performed on one of the first and second partial images $im_{p1}$ and $im_{p2}$ is equal to or less than the threshold value, the information processing system 10 according to the present embodiment performs object recognition on a portion including the object in the other one of the first and second partial images $im_{p1}$ and $im_{p2}$ and confirms a provisional recognition result of the object provisionally recognized by this object recognition. According to such a configuration, the information processing system 10 performs object recognition using the other partial image as for an object whose recognition result created by object recognition performed on one partial image is equal to or less than the threshold value and therefore can further improve recognition accuracy.

Furthermore, the information processing system 10 according to the present embodiment calculates degrees of ease of object recognition in the first partial image $im_{p1}$ and the second partial image $im_{p2}$ and performs object recognition earlier on one of the first and second partial images $im_{p1}$ and $im_{p2}$ that is higher in degree of ease. According to such a configuration, the information processing system 10 reduces a possibility of performing object recognition on both of the first partial image $im_{p1}$ and the second partial image $im_{p2}$. This can contribute to a reduction in processing burden and an increase in processing speed.

Furthermore, the information processing system 10 according to the present embodiment performs object recognition on each of the first partial image $im_{p1}$ and the second partial image $im_{p2}$, associates an object provisionally recognized in the first partial image $im_{p1}$ and an object provisionally recognized in the second partial image $im_{p2}$, and in a case where provisional recognition results of the associated objects match each other, confirms the provisional recognition results of the objects. According to such a configuration, the information processing system 10 can further improve accuracy of recognition of an object.

Furthermore, in a case where the provisional recognition results of the associated objects are different, the information processing system 10 according to the present embodiment present both of the provisional recognition results. In a case where the provisional recognition results are different, there is a possibility that the provisional recognition results are wrong recognition results. In view of this, according to the above configuration, the information processing system 10 can notify a user about an object for which a provisional recognition result has not been confirmed and provisional recognition results of the object as candidates.

Furthermore, the information processing system 10 according to the present embodiment presents the provisional recognition results in a descending order of a degree of reliability. According to such a configuration, the information processing system 10 can allow a user to speedily specify an object for which a provisional recognition result has not been confirmed.

Furthermore, in a case where the provisional recognition results of the associated objects are different and a degree of reliability of at least one of the provisional recognition results is higher than a threshold value, the information processing system 10 according to the present embodiment confirms a provisional recognition result of a higher degree of reliability as a recognition result of the object. Even in a case where the provisional recognition results are different, a provisional recognition result exceeding the threshold value is highly likely to be correct. According to the above configuration, the information processing system 10 can automatically perform object recognition while minimizing the number of opportunities to request a user's operation.

Furthermore, the information processing system 10 according to the present embodiment detects an object in each of the first partial image $im_{p1}$ and the second partial image $im_{p2}$, associates an object detected in the first partial image $im_{p1}$ and an object detected in the second partial image $im_{p2}$, performs object recognition on a combination of portions of the first partial image $im_{p1}$ and the second partial image $im_{p2}$ where the associated objects are detected, and confirms a provisional recognition result of the object created by the object recognition. Recognition accuracy of object recognition using outer appearances of an object to be recognized seen from a plurality of directions is generally higher than recognition accuracy of object recognition using an outer appearance seen from a single direction. According to the above configuration, the information processing system 10 can therefore further improve recognition accuracy.

Figure 10:
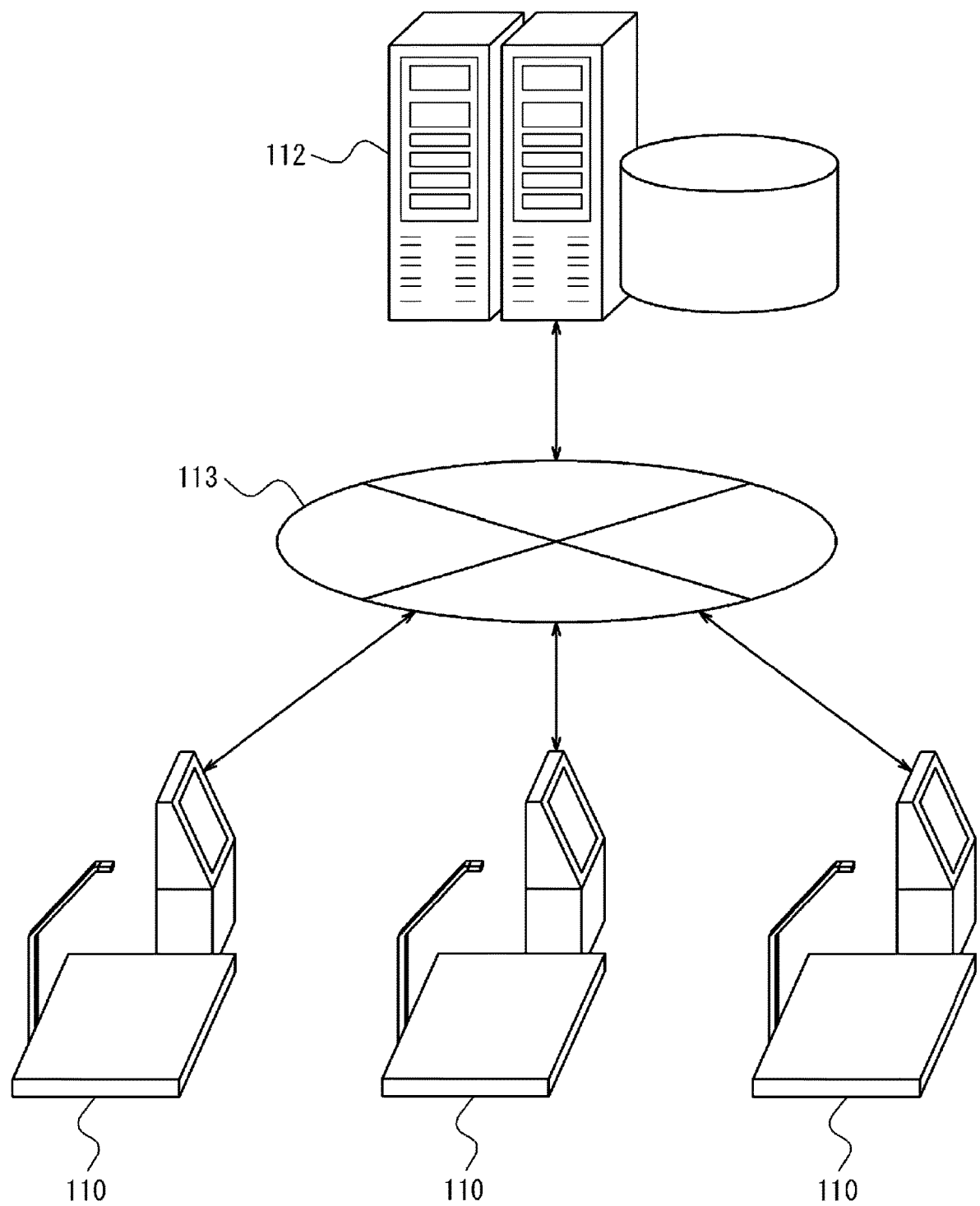
FIG. 10 illustrates an overall configuration of a payment system according to another embodiment of the present disclosure.

As illustrated in FIG. 10, a payment system 111 includes at least one information processing system 110 and a server 112. The server 112 may be a physical server or may be a cloud server. The information processing system 110 and the server 112 can communicate over a network 113. The network 113 may be a wireless network, may be a wired network, or may be a combination of a wireless network and a wired network.

The information processing system 110 may be installed at any store such as a convenience store or a supermarket. The information processing system 110 may be configured as a cash register terminal at the store. The information processing system 110 generates an image by imaging an item placed on a placing table 114 (described later) by a customer. The information processing system 110 specifies which item at the shop the item in the generated image is. In the present disclosure, an "object in an image" means an image of the object drawn in the image. The information processing system 110 transmits item information thus specified to the server 112 over the network 113. The item information can include an item name and the number of items. The server 112 calculates a billing amount for the customer on the basis of the item information. The server 112 transmits the billing amount to the information processing system 110 over the network 113. The information processing system 110 requests payment of the billing amount from the customer by presenting the billing amount to the customer.

Figure 11:
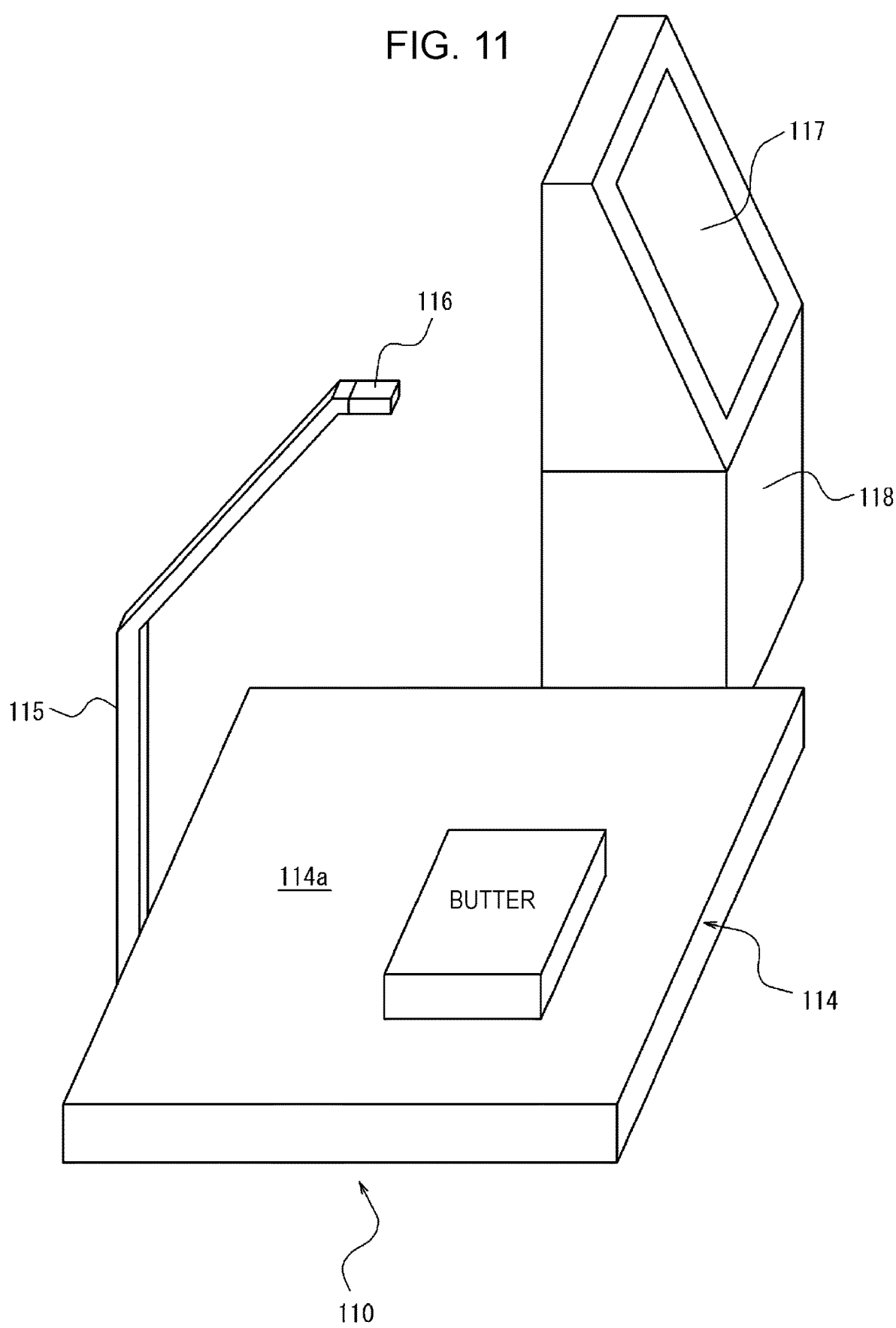
FIG. 11 illustrates an overall configuration of an information processing system illustrated in FIG. 10.

As illustrated in FIG. 11, the information processing system 110 includes a camera 116 (imaging unit) and an information processing device 118. The information processing system 110 may include the placing table 114, a support pole 115, and a display device 117.

The placing table 114 includes a placing surface 114a. A customer places an item which he or she wants to buy on the placing surface 114a at a time of payment. In the present embodiment, the placing surface 114a has a substantially rectangular shape. However, the placing surface 114a may have any shape.

The support pole 115 extends from a side part of the placing table 114 toward one side in a direction normal to the placing surface 114a. The one side in the direction normal to the placing surface 114a may be a side away from the placing surface 114a in the direction normal to the placing surface 114a. The camera 116 is located at a front end of the support pole 115.

The camera 116 generates an image signal corresponding to a taken image by imaging. In the present embodiment, the camera 116 images the placing surface 114a of the placing table 114. However, the camera 116 need just image at least a part of the placing surface 114a and may image a range exceeding the placing surface 114a. The range imaged by the camera 116 is not limited to the placing surface 114a of the placing table 114. For example, the range imaged by the camera 116 may be an inside of a shopping basket 314 such as the one illustrated in FIG. 26, which will be described later.

The camera 116 may be disposed so as to be capable of imaging the placing surface 114a of the placing table 114. The camera 116 may be disposed so that an optical axis thereof becomes perpendicular to the placing surface 114a. The camera 116 may be disposed at a front end of the support pole 115. The camera 116 may be, for example, fixed at the front end of the support pole 115 so as to be capable of imaging the placing surface 114a of the placing table 114.

The camera 116 can acquire a signal indicative of start of imaging from the information processing device 118. Upon receipt of the signal indicative of start of imaging, the camera 116 can start imaging. The camera 116 supplies an image signal generated by imaging to the information processing device 118 over a communication line. The camera 116 successively performs imaging at any frame rate. The camera 116 can generate image signals of different imaging times by successively performing imaging. However, the camera 116 may take a still image as needed on the basis of a predetermined trigger.

The display device 117 may be configured to include any display such as a liquid crystal display. The display device 117 displays an image on the basis of a signal acquired from the information processing device 118. For example, the display device 117 can acquire a signal indicative of a billing amount of an item from the information processing device 118. The display device 117 can display an image indicative of the billing amount of the item on the basis of the signal indicative of the billing amount of the item.

The display device 117 may have a touch screen function. The display device 117 may be disposed close to the placing table 114. The display device 117 may be disposed so as to face a customer when the customer places an item on the placing table 114.

Figure 12:
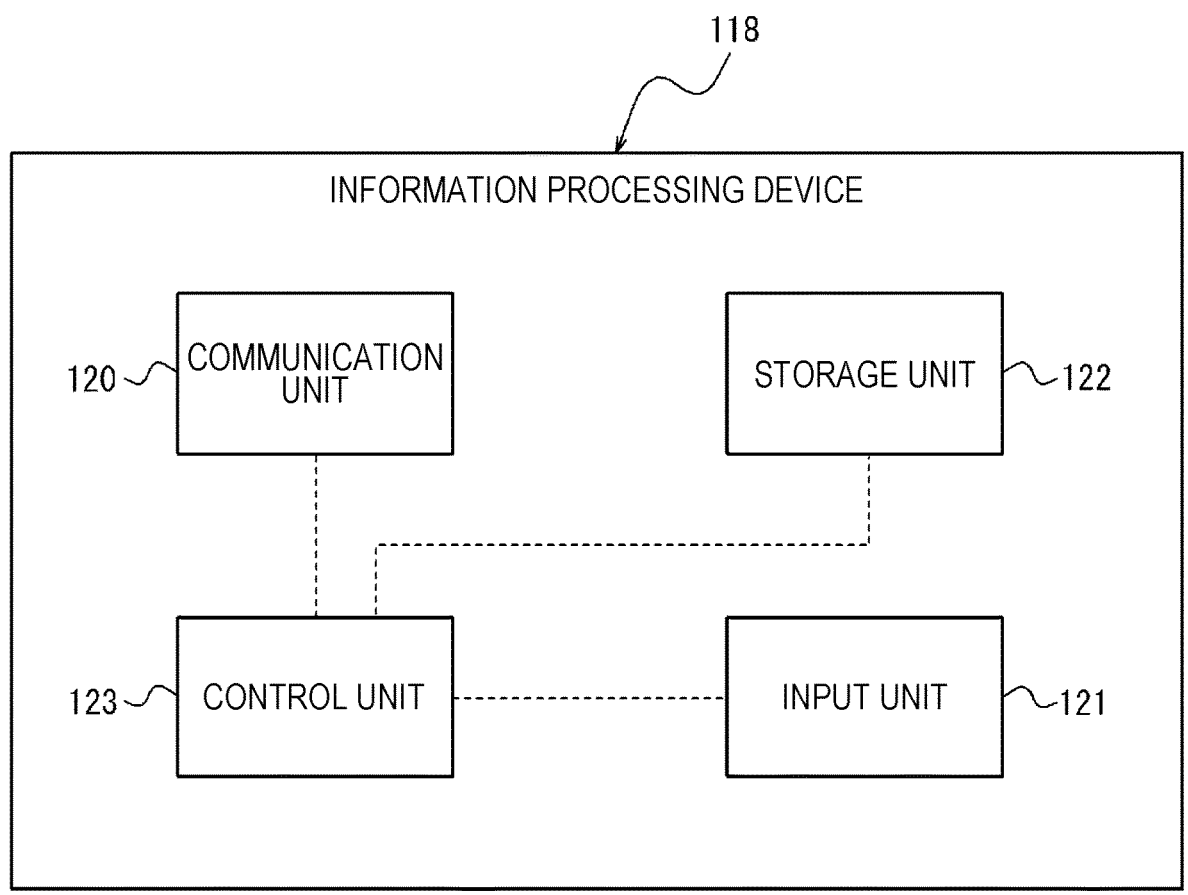
FIG. 12 is a functional block diagram of the information processing system illustrated in FIG. 11.

The information processing device 118 may be disposed close to the placing table 114. As illustrated in FIG. 12, the information processing device 118 includes a control unit 123. The information processing device 118 may include a communication unit 120, an input unit 121, and a storage unit 122.

The communication unit 120 includes a communication module. The communication module may include a communication module that can communicate with the camera 116 through a communication line, a module that can communicate with the display device 117 through a communication line, and a communication module that can communicate with the server 112 over the network 113. The communication line between the camera 116 and the communication unit 120 and the communication line between the display device 117 and the communication unit 120 may each be a wired communication line or may each be a wireless communication line.

The input unit 121 includes one or more interfaces that are capable of detecting user's entry. For example, the input unit 121 may be configured to include at least any one of a physical key, a capacitive key, and a touch screen. In the present embodiment, the input unit 121 is a touch screen. The input unit 121 that is a touch screen is provided integrally with the display device 117.

The storage unit 122 includes storage devices such as a RAM and a ROM. The storage unit 122 stores therein various programs for causing the control unit 123 to function and various kinds of information used by the control unit 123.

The storage unit 122 may store item data of a shop. The item data can be used, for example, for object detection and object recognition, which will be described later. The item data may include an item image, characters written on a package of the item, and the like that are associated with an identifier for identifying the item. Hereinafter, it is assumed that the identifier for identifying an item is an item name for convenience of description.

The control unit 123 includes one or more processors and a memory. The processors may include a general-purpose processor that reads a specific program and executes a specific function and a dedicated processor specialized for specific processing. The dedicated processor may include an application specific integrated circuit (ASIC). The processors may include a programmable logic device (PLD). The PLD may include an FPGA. The control unit 23 may be an SoC or an SiP in which one or a plurality of processors work together.

The control unit 123 may cause the communication unit 120 to acquire the item data from the server 112 over the network 113. The control unit 123 may cause the acquired item data to be stored in the storage unit 122.

The control unit 123 can cause the communication unit 120 to transmit a signal indicative of start of imaging to the camera 116. The control unit 123 may transmit the signal indicative of start of imaging when the information processing device 118 is activated. The control unit 123 may transmit the signal indicative of start of imaging when the input unit 121 detects user's entry indicative of start of imaging. This user's entry can be given by a store clerk with the use of the input unit 121, for example, when the store opens.

The control unit 123 causes the communication unit 120 to acquire an image signal from the camera 116. The control unit 123 can acquire a taken image corresponding to the image signal by acquiring the image signal. The control unit 123 may cause the acquired taken image to be stored in the storage unit 122. In a case where the camera 116 generates image signals of different imaging times, the control unit 123 can acquire taken images of different imaging times. In a case where a customer buys a plurality of items, the customer may place the items on the placing surface 114a of the placing table 114 one after another. In a case where the customer places the items on the placing surface 114a of the placing table 114 one after another, the taken images can show how the items are placed on the placing table 114 one after another with passage of time. For example, the control unit 123 may acquire taken images 130, 131, and 132 such as the ones illustrated in FIGS. 13, 14, and 15.

Figure 13:
FIG. 13 illustrates an example of a taken image according to the embodiment of the present disclosure.

The taken image 130 such as the one illustrated in FIG. 13 is an image taken at an imaging time t0. At the imaging time t0, an item or the like is not placed on the placing surface 114a of the placing table 114. The taken image 130 includes an image corresponding to the placing surface 114a of the placing table 114.

Figure 14:
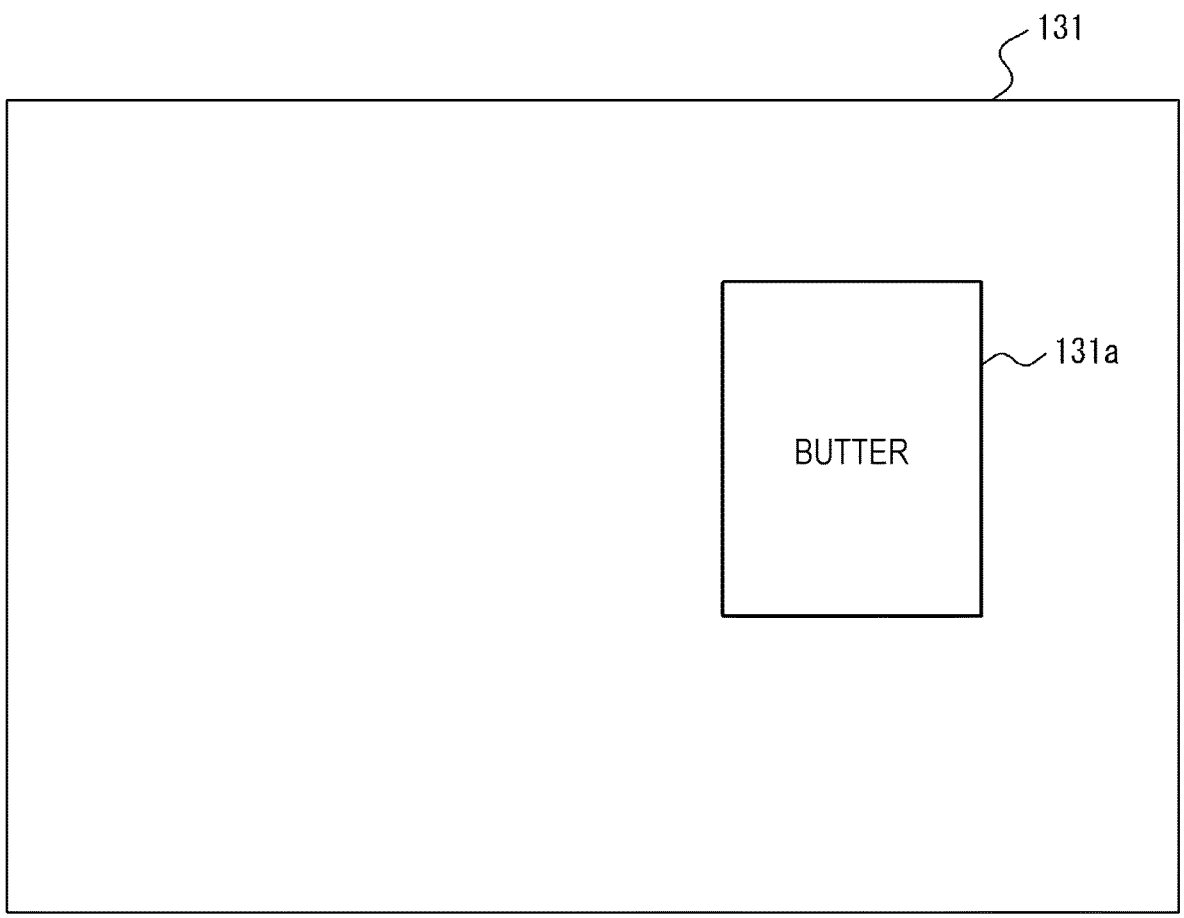
FIG. 14 illustrates an example of a taken image according to the embodiment of the present disclosure.

The taken image 131 such as the one illustrated in FIG. 14 is an image taken at an imaging time t1. The imaging time t1 is later than the imaging time t0. At the imaging time t1, butter is placed on the placing surface 114a of the placing table 114. The taken image 131 includes a partial image 131a. The partial image 131a is a part of the taken image 131. The partial image 131a corresponds to the butter.

Figure 15:
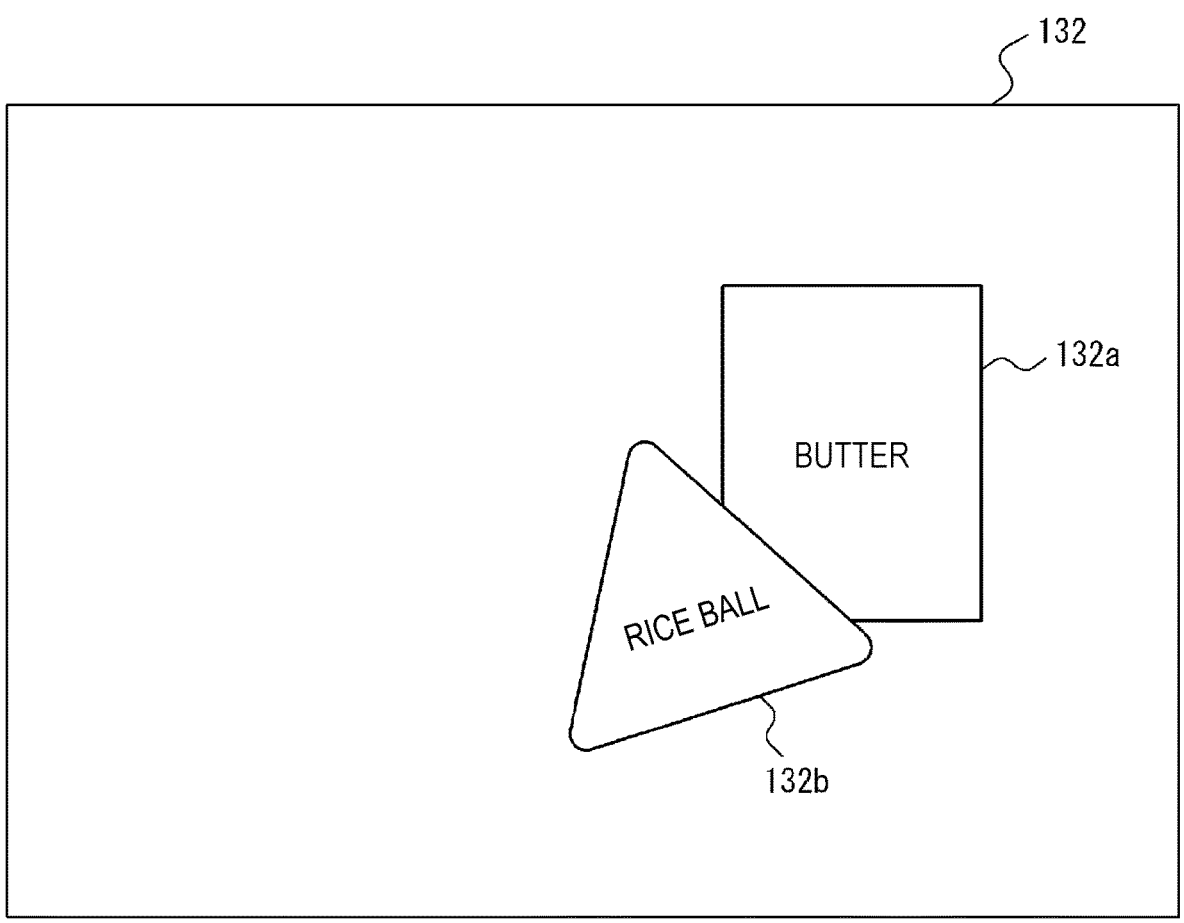
FIG. 15 illustrates an example of a taken image according to the embodiment of the present disclosure.

The taken image 132 such as the one illustrated in FIG. 15 is an image taken at an imaging time t2. The imaging time t2 is later than the imaging time t1. At the imaging time t2, the butter and a rice ball are placed on the placing surface 114a of the placing table 114. The rice ball is placed after the customer places the butter on the placing table 114. The rice ball partially overlaps the butter. The taken image 132 includes a partial image 132a and a partial image 132b. The partial image 132a and the partial image 132b are parts of the taken image 132. The partial image 132a corresponds to the butter. The partial image 132b corresponds to the rice ball. Since the rice ball partially overlaps the butter, the partial image 132a has a missing part unlike the partial image 131a such as the one illustrated in FIG. 14.

The control unit 123 generates a difference image on the basis of two taken images of different imaging times. For example, the control unit 123 may generate a difference image by calculating differences in luminance values of pixels between the two images. The control unit 123 may generate a difference image in a case where the control unit 123 determines that there is a difference between two taken images of different imaging times. An example of processing for determining whether or not there is a difference between two taken images is described below.

The control unit 123 detects the number of objects in a taken image by object detection. In the present disclosure, the "object detection" means detecting an object to be detected as an object distinguished from a background and other objects in a taken image. The object to be detected is an item of a store where the information processing system 110 is installed. The control unit 123 may detect the number of objects by detecting an object in a taken image by a known object detection method. An example of the known object detection method is a method using segmentation, semantic segmentation, and/or a bounding box. The control unit 123 may detect the number of objects in a taken image by a known object recognition method. An example of the known object recognition method is a method using machine learning such as deep learning and/or feature pattern matching.

The control unit 123 determines whether or not the number of objects individually detected in a taken image has changed. The control unit 123 may determine whether or not the number of objects individually detected in a taken image has changed by comparing the number of objects detected in latest detection processing and the number of objects detected in second latest detection processing. According to such a configuration, it can be determined whether or not there is a difference between two taken images.

In a case where it is determined that the number of objects individually detected has changed, the control unit 123 generates a difference image by using a taken image in which the change in the number of objects is detected and a taken image taken at an earlier imaging time than the taken image in which the change in the number of objects is detected. The taken image taken at an earlier imaging time than the taken image in which the change in the number of objects is detected may be a taken image taken predetermined time earlier than the taken image in which the change in the number of objects is detected. The predetermined time may be set as appropriate assuming a time it takes for a customer to place a next item on the placing table 114 after placing an item on the placing table 114. Alternatively, the taken image taken at an earlier imaging time than the taken image in which the change in the number of objects is detected may be a taken image before the change in the number of objects. The taken image before the change in the number of objects may be a latest one among taken images before the change in the number of objects. In the present embodiment, the taken image taken at an earlier imaging time than the taken image in which the change in the number of objects is detected is a taken image before the change in the number of objects.

Figure 16:
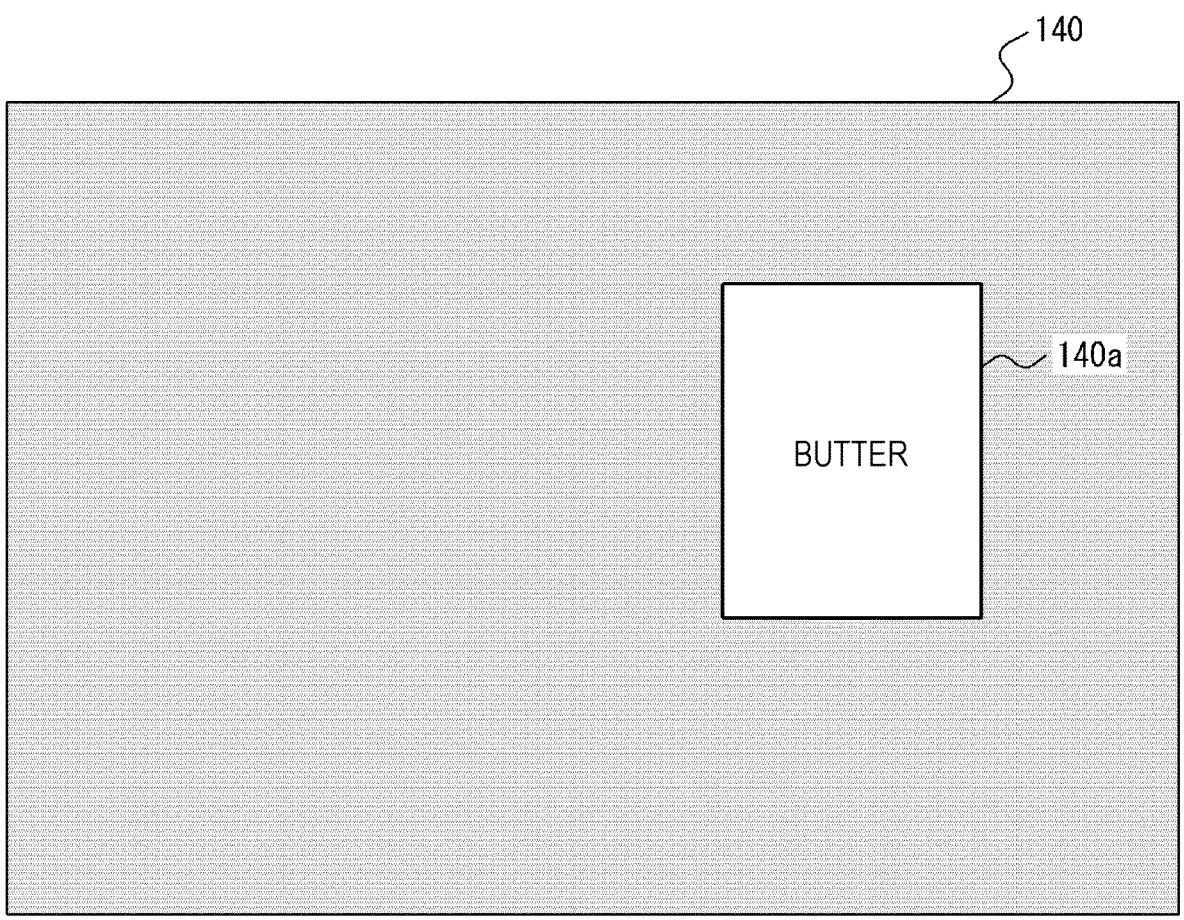
FIG. 16 illustrates an example of a difference image according to the embodiment of the present disclosure.

For example, in detection processing, the control unit 123 detects the number of objects in the taken image 130 as zero. In next detection processing, the control unit 123 detects the number of objects in the taken image 131 as one. The control unit 123 determines that the number of objects individually detected in the taken image 131 has changed by comparing 1, which is the number of objects detected in the latest detection processing, and zero, which is the number of objects detected in the second latest detection processing. The control unit 123 generates a difference image 140 such as the one illustrated in FIG. 16 by using the taken image 131 in which the change in the number of objects to one is detected and the taken image 130 before the change in the number of objects. The difference image 140 includes a partial image 140a. The partial image 140a is a region where non-zero pixels are continuous. The partial image 140a can be generated on the basis of a difference value between the partial image 131a of the taken image 131 and a part of the taken image 130 corresponding to the partial image 131a. The partial image 140a corresponds to the partial image 131a included in the taken image 131, which is one of the two taken images, that is, the taken image 130 and the taken image 131.

Figure 17:
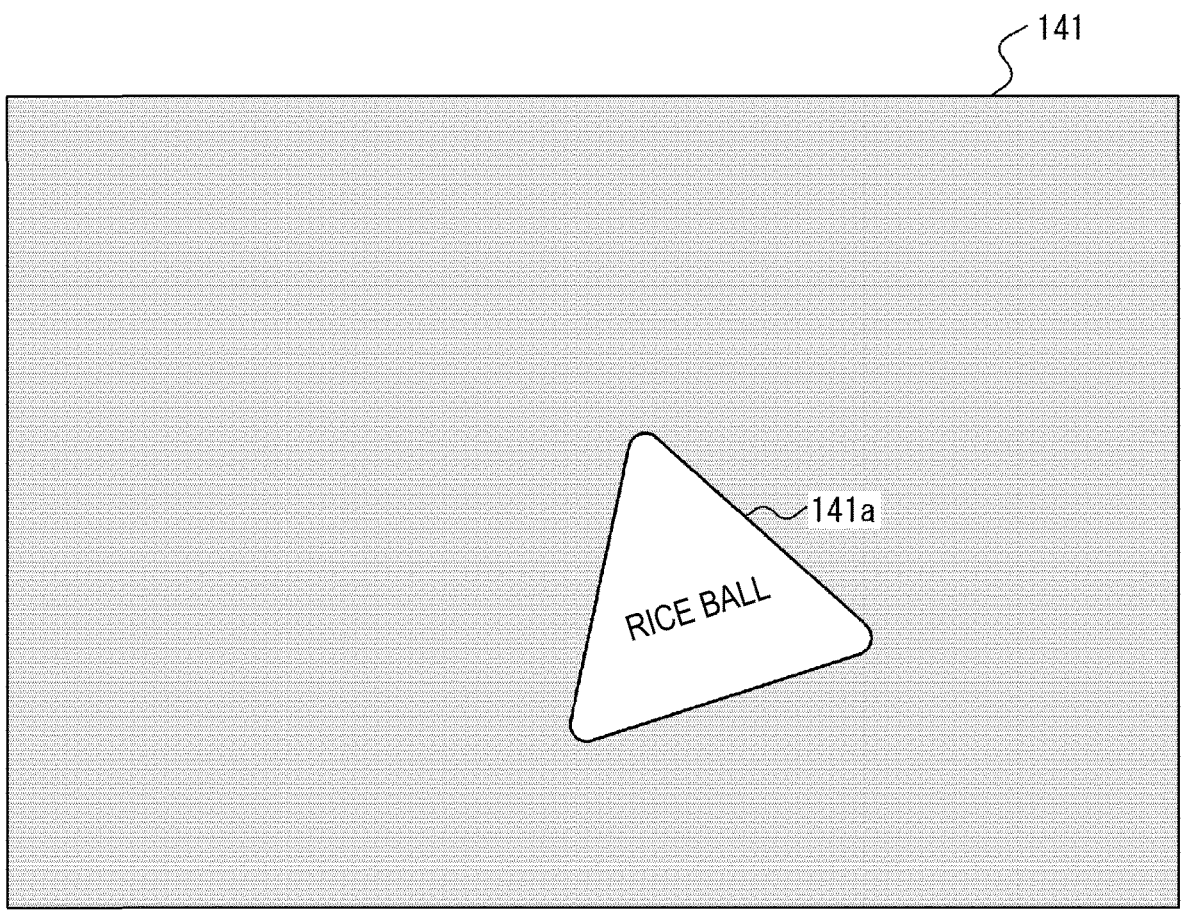
FIG. 17 illustrates an example of a difference image according to the embodiment of the present disclosure.

For example, in detection processing, the control unit 123 detects the number of objects in the taken image 132 as two. It is assumed that the detection processing immediately preceding this detection processing is the detection processing performed on the taken image 131. The control unit 123 determines that the number of objects individually detected in the taken image 132 has changed by comparing 2, which is the number of objects detected in the latest detection processing, and 1, which is the number of objects detected in the second latest detection processing. The control unit 123 generates a difference image 141 such as the one illustrated in FIG. 17 by using the taken image 132 in which the change in the number of objects to 2 is detected and the taken image 131 before the change in the number of objects. The difference image 141 includes a partial image 141a. The partial image 141a is a region where non-zero pixels are continuous. The partial image 141a can be generated on the basis of a difference value between the partial image 132b of the taken image 132 and a part of the taken image 131 corresponding to the partial image 132b. The partial image 141a corresponds to the partial image 132b included in the taken image 132, which is one of the two taken images, that is, the taken image 131 and the taken image 132.

The control unit 123 specifies objects corresponding to partial images included in at least one of the taken images 130 to 132 by performing object recognition on the difference images 140 and 141. Object recognition performed on a difference image may include specifying an identifier, that is, a name of an object corresponding to a partial image in the difference image by analyzing the partial image in the difference image. Object recognition performed on a difference image may include detecting an object from the difference image. The control unit 123 may execute a known object recognition method on a difference image. An example of the known object recognition method is a method using machine learning such as deep learning, character recognition, and/or feature pattern matching. The control unit 123 detects the partial image 140a and specifies that an item name of an object corresponding to the partial image 140a is "butter" by performing object recognition on the difference image 140. The control unit 123 detects the partial image 141a corresponding to an object and specifies that an item name of an object corresponding to the partial image 141a is a "rice ball" by performing object recognition on the difference image 141.

The control unit 123 finishes generation of a difference image when user's entry indicative of request of payment is detected by the input unit 121. The user's entry indicative of request of payment may be given by a customer with the use of the input unit 121 after the customer places all items on the placing table 114. Alternatively, the control unit 123 may finish generation of a difference image in a case where the number of objects individually detected in a taken image does not change for a predetermined period after it is determined that the number of objects in a taken image has changed. The predetermined period may be a period longer than a period it is supposed to take for a customer to place a next item on the placing table 114 after placing an item on the placing table 114.

When the processing for specifying an object is finished, the control unit 123 causes the communication unit 120 to transmit the specified item information to the server 112 over the network 113. The item information can include an item name and the number of items. The server 112 acquires the item information from the information processing device 118 over the network 113. The server 112 calculates a billing amount for a customer on the basis of the item information. The server 112 transmits a signal indicative of the billing amount to the information processing device 118 over the network 113. The control unit 123 causes the communication unit 120 to acquire the signal indicative of the billing amount from the server 112 over the network 113. The control unit 123 causes the communication unit 120 to transmit the signal indicative of the billing amount to the display device 117.

Figure 18:
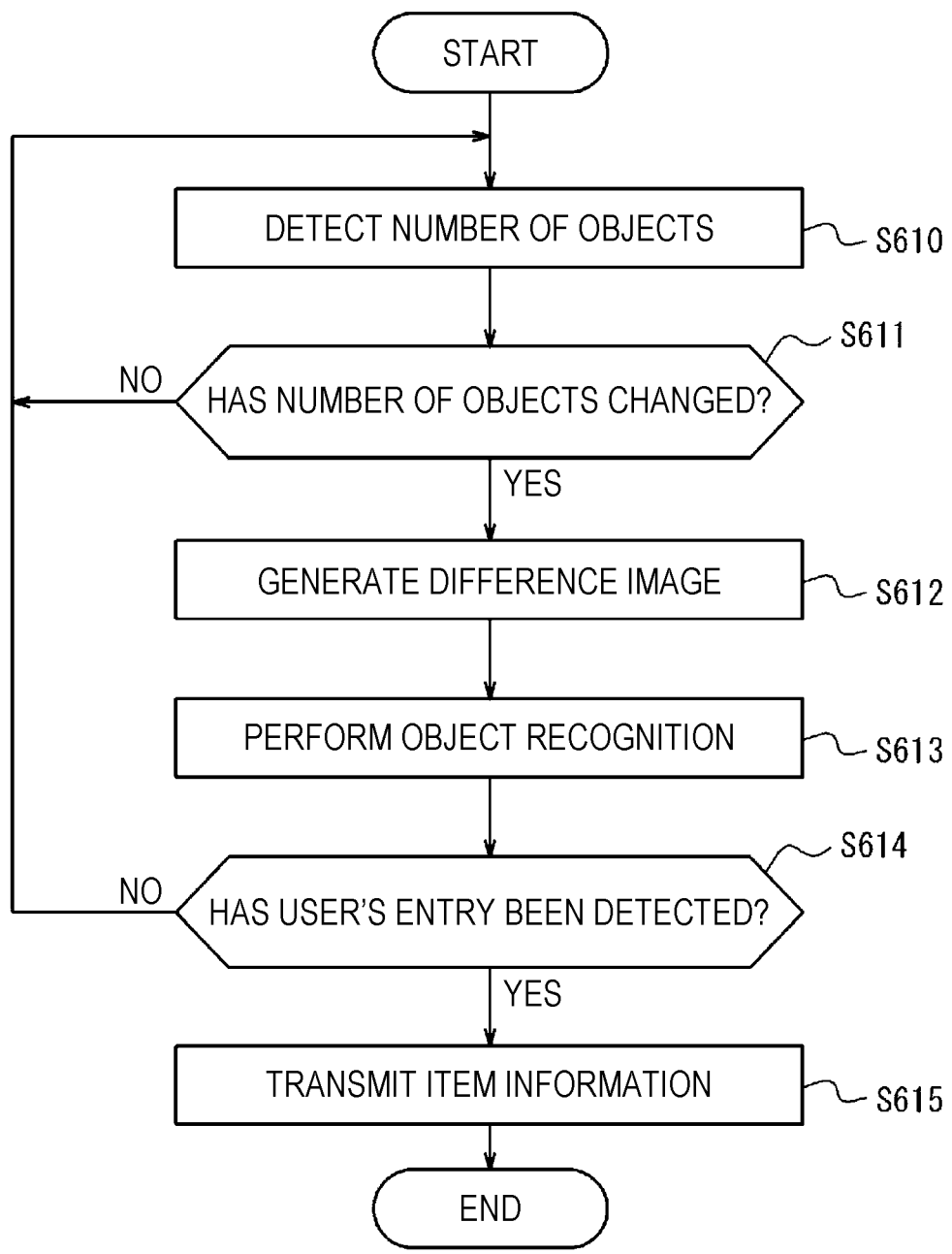
FIG. 18 is a flowchart illustrating object specifying processing of the information processing system according to the embodiment of the present disclosure.

FIG. 18 is a flowchart illustrating object specifying processing of the information processing system 110 according to the embodiment of the present disclosure. The control unit 123 may start the object specifying processing when acquisition of an image signal from the camera 116 starts. The control unit 123 may cause the image signal acquired from the camera 116 to be stored in the storage unit 122. Furthermore, the control unit 123 may start the object specifying processing again after customer's payment is finished.

The control unit 123 detects the number of objects in a taken image (step S610). The control unit 123 determines whether or not the number of objects individually detected in a taken image has changed (step S611).

In a case where the control unit 123 determines that the number of objects individually detected has changed (YES in step S611), the control unit 123 proceeds to a process in step S612. On the other hand, in a case where the control unit 123 determines that the number of objects individually detected has not changed (NO in step S611), the control unit 123 returns to the process in step S610.

In the process in step S612, the control unit 123 generates a difference image by using a taken image in which the change in the number of objects is detected and a taken image taken at an earlier imaging time than the taken image in which the change in the number of objects is detected. In a process in step S613, the control unit 123 specifies an object by performing object recognition on the difference image.

In a process in step S614, the control unit 123 determines whether or not user's entry indicative of request of payment has been detected by the input unit 121. In a case where the control unit 123 determines that user's entry indicative of request of payment has been detected by the input unit 121 (YES in step S614), the control unit 123 proceeds to a process in step S615. On the other hand, in a case where the control unit 123 determines that user's entry indicative of request of payment has not been detected by the input unit 121 (NO in step S614), the control unit 123 returns to the process in step S610.

In the process in step S615, the control unit 123 causes the communication unit 120 to transmit specified item information to the server 112.

In a case where the number of objects individually detected in a taken image has not changed for a predetermined period after it is determined in the process in step S611 that the number of objects individually detected has changed, the control unit 123 may proceed to the process in step S615.

As described above, in the information processing system 110 according to the present embodiment, a difference image is generated from two taken images of different imaging times by the information processing device 118. Even in a case where any of the two taken images includes a plurality of partial images corresponding to objects, the plurality of partial images can be included in different difference images. For example, the taken image 132 such as the one illustrated in FIG. 15 includes the partial image 132*a* corresponding to butter and the partial image 132*b* corresponding to a rice ball. The partial image 140*a* corresponding to the partial image 132*a* is included in the difference image 140. The partial image 141*a* corresponding to the partial image 132*b* is included in the difference image 141. The information processing device 118 performs object recognition on such a difference image, and therefore can specify an object more accurately than a case where object recognition is performed on a taken image.

Furthermore, in the information processing system 110 according to the present embodiment, an object can be specified by performing object recognition on a difference image without imaging an object from plural directions by cameras. In the information processing system 110, a plurality of cameras need not be provided so as to face the placing table 114 since it is unnecessary to image an object from plural direction by cameras. According to such a configuration, the information processing system 110 according to the present embodiment can specify an object with a simpler configuration.

Therefore, according to the present embodiment, information processing system 110, information processing device 118, and information processing method that are improved can be provided.

Furthermore, in the information processing system 110 according to the present embodiment, a difference image is generated by using a taken image in which the change in the number of objects individually detected is detected and a taken image taken at an earlier imaging time than the taken image in which the change in the number of objects individually detected is detected. According to such a configuration, a difference image can be generated by using taken images between which a difference is present more certainly.

Next, the information processing system 110 according to still another embodiment of the present disclosure is described. In the embodiment of the present disclosure, the control unit 123 uses taken images taken at imaging times before and after a taken image including a partial image corresponding to a finger as the two taken images of different imaging times used for generation of a difference image. In the embodiment of the present disclosure, the storage unit 22 may store an image or the like of a finger.

The control unit 123 determines whether or not a taken image acquired from the camera 116 includes a partial image corresponding to a finger. The control unit 123 may determine whether or not a taken image acquired from the camera 116 includes a partial image corresponding to a finger by performing object recognition on the taken image.

In a case where it is determined that a partial image corresponding to a finger is included in the taken image, the control unit 123 acquires taken images taken at imaging times before and after this taken image. For example, the control unit 123 may acquire a taken image taken at an imaging time earlier by a first period than the taken image including the partial image corresponding to the finger and a taken image taken at an imaging time later by a second period than the taken image including the partial image corresponding to the finger. The first period and the second period may be set as appropriate assuming a period it takes for a customer to place an individual item on the placing table 114. The first period and the second period may be the same or may be different. In the present embodiment, the control unit 123 acquires a taken image taken at an imaging time earlier by the first period than the taken image including the partial image corresponding to the finger and a taken image taken at an imaging time later by the second period than the taken image including the partial image corresponding to the finger.

Figure 19:
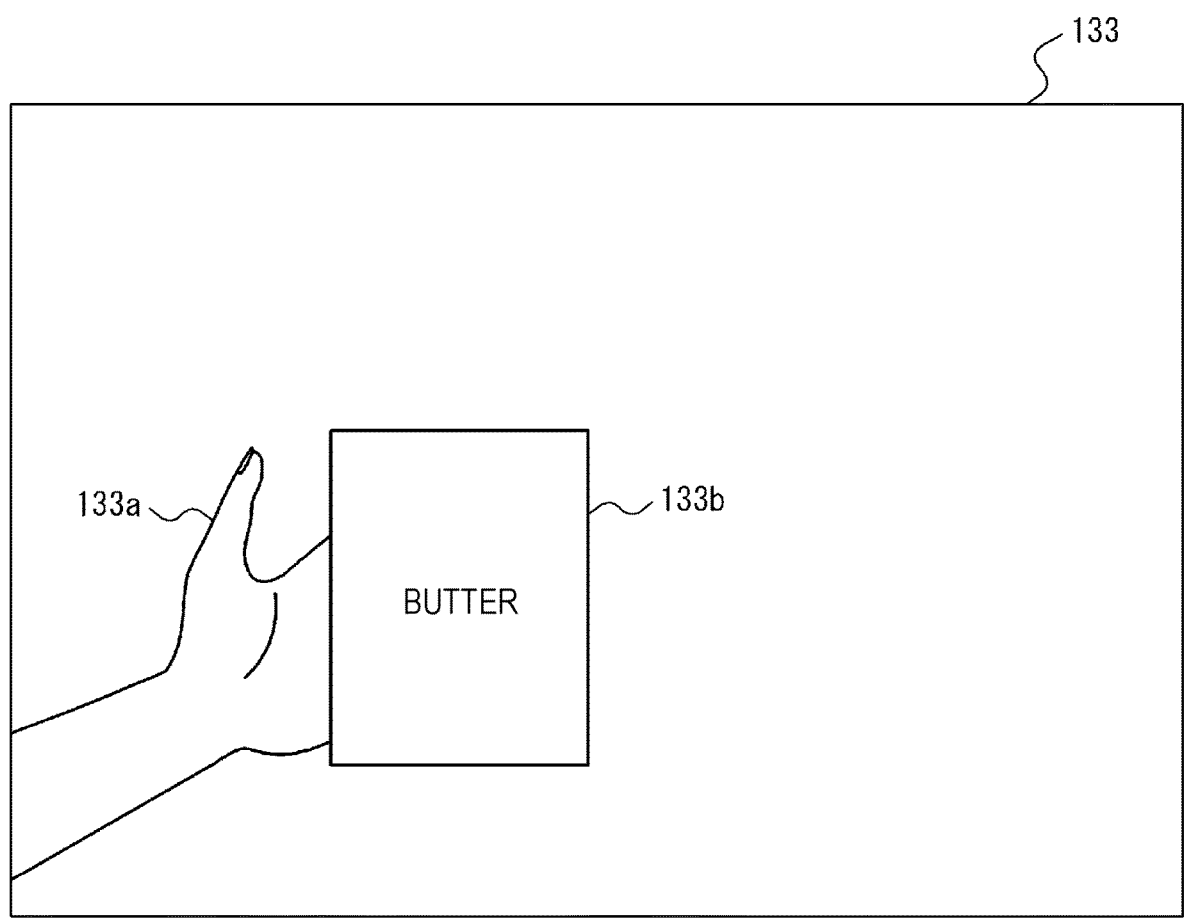
FIG. 19 illustrates an example of a taken image according to still another embodiment of the present disclosure.

For example, the control unit 123 acquires a taken image 133 such as the one illustrated in FIG. 19. The taken image 133 is an image taken at an imaging time t01. At the imaging time t01, a customer holding butter in his or her hand is trying to place the butter on the placing surface 114a of the placing table 114. The taken image 133 includes a partial image 133a and a partial image 133b. The partial image 133a and the partial image 133b are parts of the taken image 133. The partial image 133a corresponds to a finger. The partial image 133b corresponds to butter. The control unit 123 determines that the partial image 133a corresponding to a finger is included in the taken image 133. It is assumed that an imaging time earlier by the first period than the imaging time t01 is the imaging time t0 of the taken image 130 described above. Furthermore, it is assumed that an imaging time later by the second period than the imaging time t01 is the imaging time t1 of the taken image 131 described above. The control unit 123 generates the difference image 140 by using the taken image 130 and the taken image 131.

Figure 20:
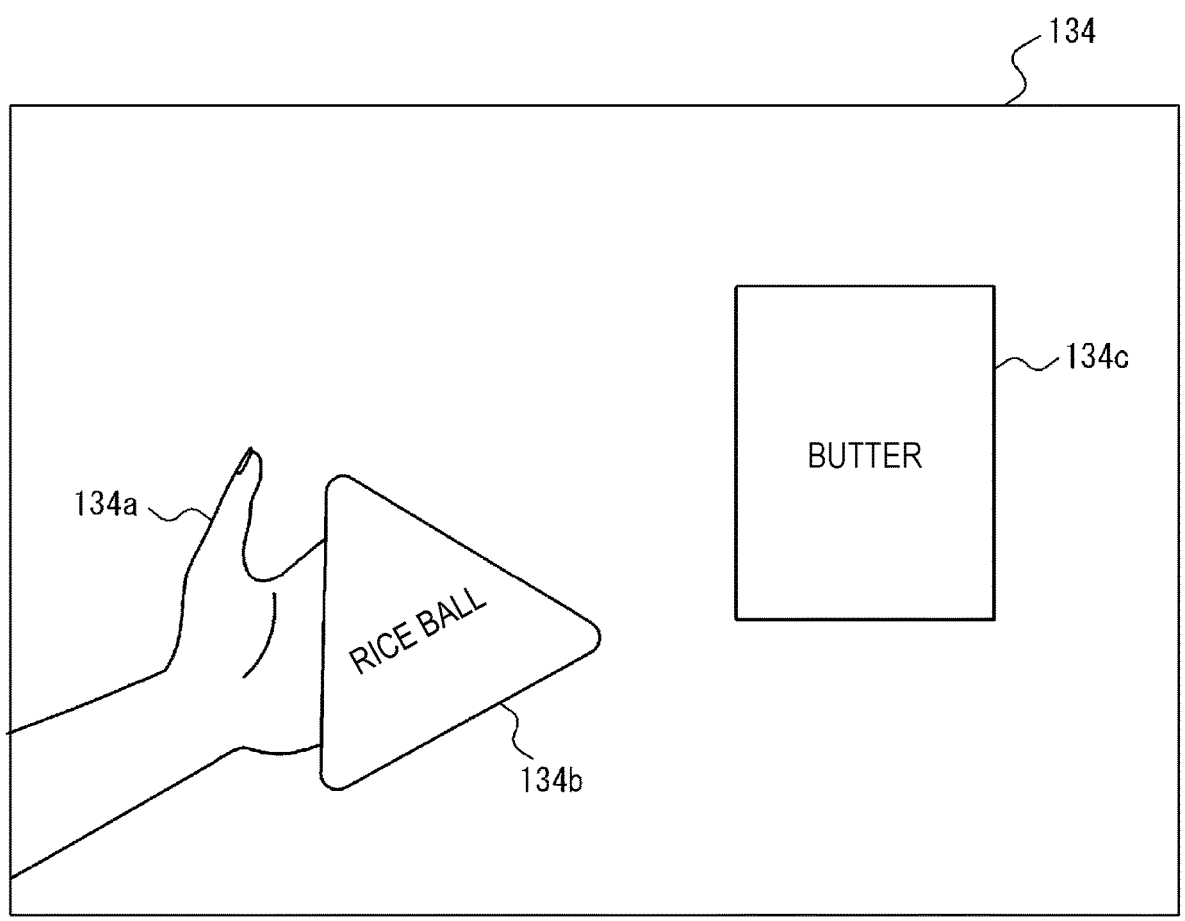
FIG. 20 illustrates an example of a taken image according to still another embodiment of the present disclosure.

For example, the control unit 123 acquires a taken image 134 such as the one illustrated in FIG. 20. The taken image 134 is an image taken at an imaging time t12. At the imaging time t12, a customer holding a rice ball in his or her hand is trying to place the rice ball on the placing surface 114a of the placing table 114. The taken image 134 includes a partial image 134a, a partial image 134b, and a partial image 134c. The partial image 134a, the partial image 134b, and the partial image 134c are parts of the taken image 134. The partial image 134a corresponds to a finger. The partial image 134b corresponds to the rice ball. The partial image 134c corresponds to the butter. The control unit 123 determines that the partial image 134a corresponding to a finger is included in the taken image 134. It is assumed that an imaging time earlier by the first period than the imaging time t12 is the imaging time t1 of the taken image 131 described above. Furthermore, it is assumed that an imaging time later by the second period than the imaging time t12 is the imaging time t2 of the taken image 132 described above. The control unit 123 generates the difference image 141 by using the taken image 131 and the taken image 132.

Figure 21:
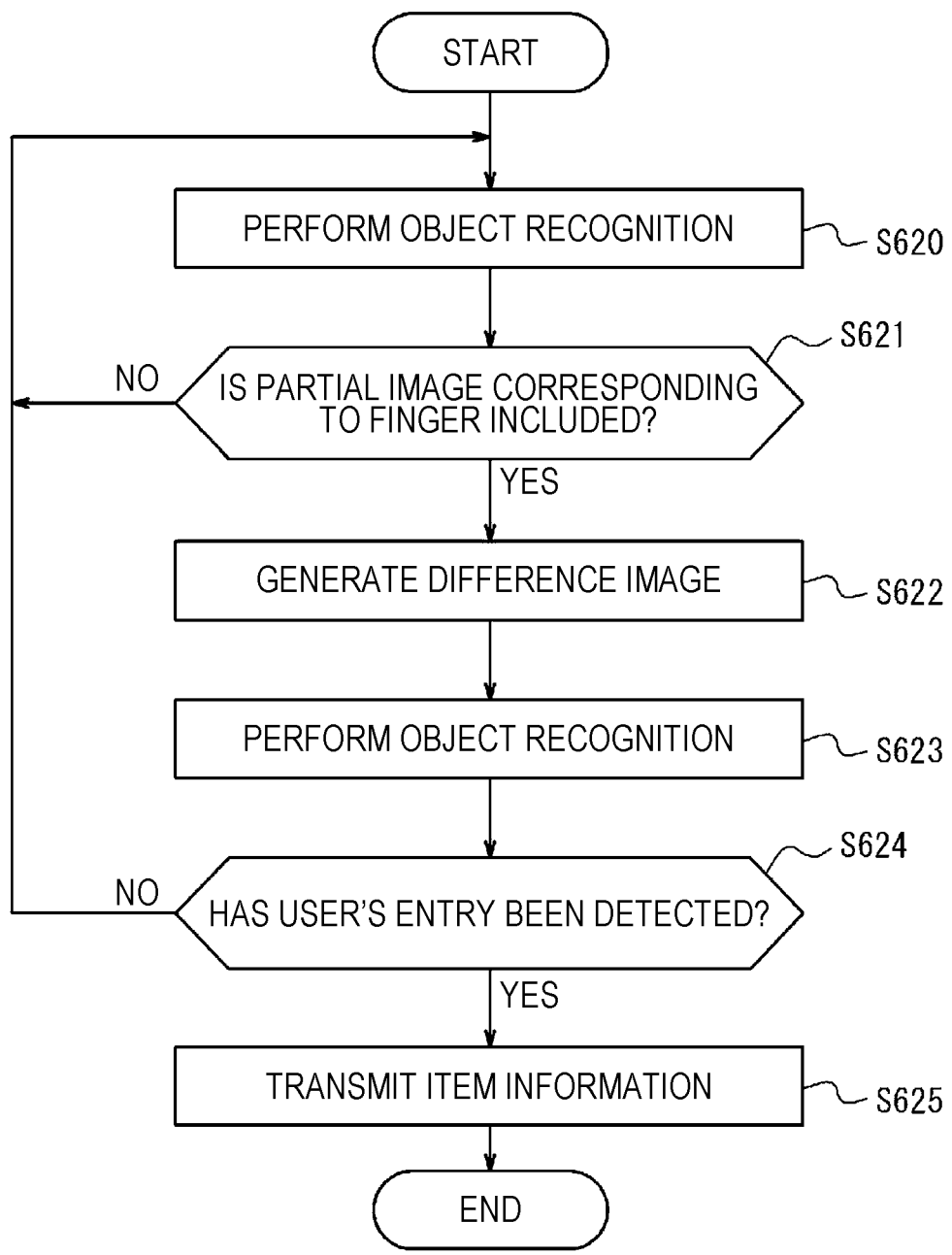
FIG. 21 is a flowchart illustrating object specifying processing of the information processing system according to the embodiment of the present disclosure.

FIG. 21 is a flowchart illustrating object specifying processing of the information processing system 110 according to the embodiment of the present disclosure. The control unit 123 may start the object specifying processing when acquisition of an image signal from the camera 116 starts. The control unit 123 may cause the image signal acquired from the camera 116 to be stored in the storage unit 122. Furthermore, the control unit 123 may start the object specifying processing again after customer's payment is finished.

The control unit 123 performs object recognition on a taken image (step S620) and thereby determines whether or not a partial image corresponding to a finger is included in the taken image (step S621). In a case where the control unit 123 determines that a partial image corresponding to a finger is included in the taken image (YES in step S621), the control unit 123 proceeds to a process in step S622. On the other hand, in a case where the control unit 123 determines that a partial image corresponding to a finger is not included in the taken image (NO in step S621), the processing returns to the process in step S620.

In the process in step S622, the control unit 123 generates a difference image by using taken images taken at imaging times before and after the taken image including the partial image corresponding to a finger.

The control unit 123 performs processes in steps S623, S624, and S625 in the same manner as the processes in steps S613, S614, and S615 illustrated in FIG. 18.

Figure 22:
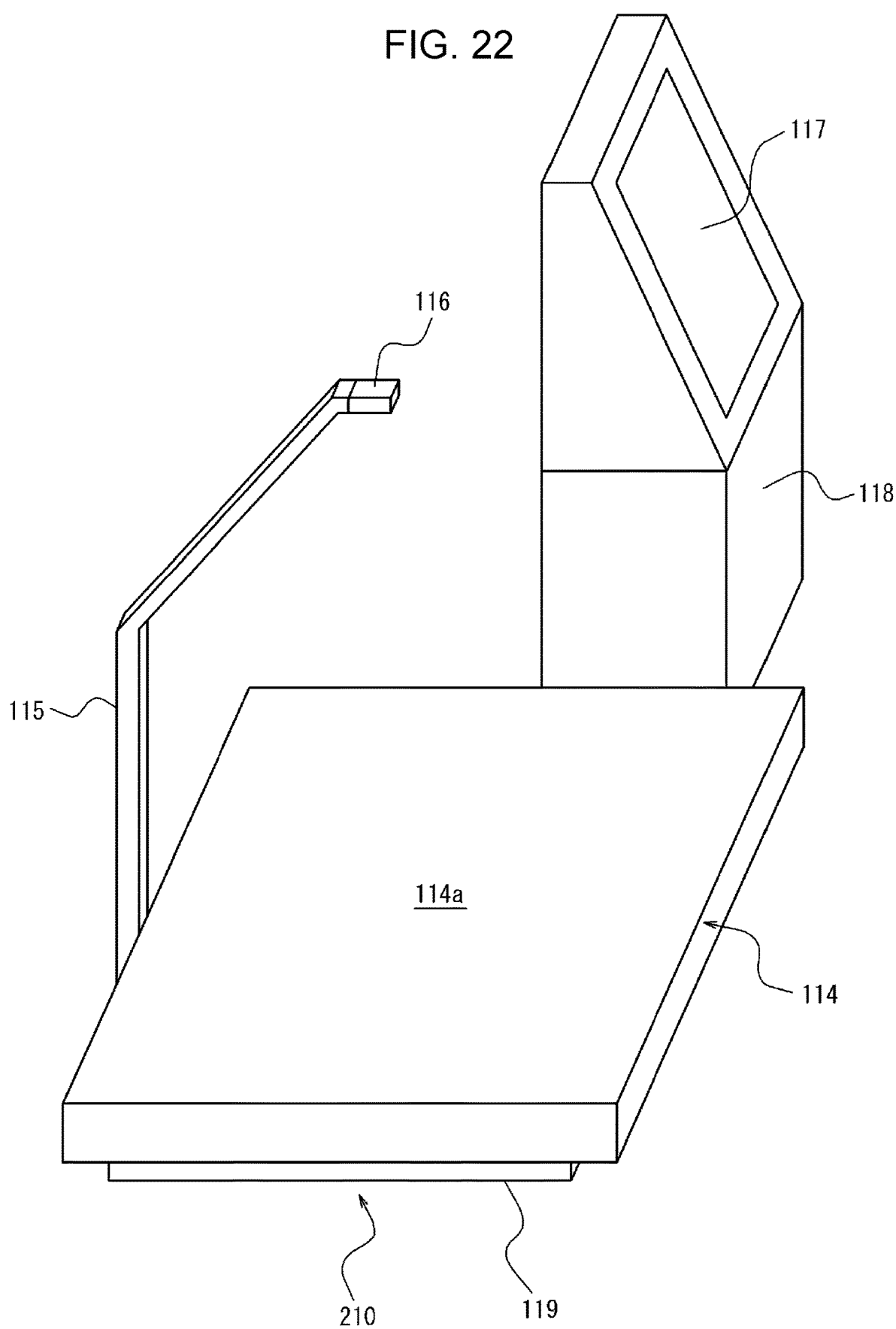
FIG. 22 illustrates an overall configuration of an information processing system according to still another embodiment of the present disclosure.

FIG. 22 illustrates an overall configuration of an information processing system 210 according to still another embodiment of the present disclosure. The information processing system 210 includes a camera 116, an information processing device 118, and a weight sensor 119. The information processing system 210 may include a placing table 114, a support pole 115, and a display device 117.

The weight sensor 119 detects a weight applied to the placing surface 114a of the placing table 114. The weight sensor 119 supplies the detected weight to the information processing device 118 through a communication line. The weight sensor 119 is disposed as appropriate so as to be capable of detecting a weight applied to the placing surface 114a.

In the information processing device 118 according to the present embodiment, a communication unit 120 may include a communication module that can communicate with the weight sensor 119 through a communication line. The communication line between the weight sensor 119 and the communication unit 120 may be a wired communication line or may be a wireless communication line.

In the information processing device 118 according to the present embodiment, a control unit 123 uses taken images taken at imaging times before and after a time at which the weight applied to the placing surface 114a of the placing table 114 changes as the two taken images of different imaging times used for generation of a difference image. For example, the control unit 123 can cause the communication unit 120 to acquire the weight applied to the placing surface 114a of the placing table 114 from the weight sensor 119 through the communication line. The control unit 123 determines whether or not the weight applied to the placing surface 114a of the placing table 114 has changed. In a case where the control unit 123 determines that the weight applied to the placing surface 114a of the placing table 114 has changed, the control unit 123 acquires taken images taken at imaging times before and after a time of the change in the weight applied to the placing surface 114a of the placing table 114. The control unit 123 may acquire a taken image taken at an imaging time earlier by a third period than the time of the change in the weight applied to the placing surface 114a as the image taken at an imaging time before the time of the change in the weight. The third time may be set as appropriate assuming a period it takes for a customer to place an individual item on the placing table 114. The control unit 123 may acquire a taken image taken at an imaging time closest to the time of the change in the weight applied to the placing surface 114a among taken images taken after the time of the change in the weight applied to the placing surface 114a as the taken image taken at the imaging time after the time of the change in the weight.

For example, in a case where a customer places butter on the placing table 114 on which nothing is placed, a weight applied to the placing surface 114a of the placing table 114 increases due to a weight of the butter. That is, the weight applied to the placing surface 114a of the placing table 114 changes. It is assumed that the control unit 123 acquires the taken image 130 and the taken image 131 described above as taken images taken at imaging times before and after a time of the change in weight applied to the placing surface 114a of the placing table 114. The control unit 123 can generate the difference image 140 described above by using the taken image 130 and the taken image 131.

For example, in a case where the customer places a rice ball on the placing table 114 on which the butter is placed, the weight applied to the placing surface 114a of the placing table 114 increases due to a weight of the rice ball. That is, the weight applied to the placing surface 114a of the placing table 114 changes. It is assumed that the control unit 123 acquires the taken image 131 and the taken image 132 described above as taken images taken at imaging times before and after a time of the change in weight applied to the placing surface 114a of the placing table 114. The control unit 123 can generate the difference image 141 described above by using the taken image 131 and the taken image 132.

When the weight applied to the placing surface 114a of the placing table 114 changes, the control unit 123 may cause the communication unit 120 to transmit a signal indicative of imaging to the camera 116. In a case where the customer buys a plurality of items, the customer may place the items on the placing surface 114a of the placing table 114 one after another. In a case where the customer places the items on the placing surface 114a of the placing table 114 one after another, the weight applied to the placing surface 114a can change sequentially. In a case where the weight applied to the placing surface 114a changes sequentially, the control unit 123 can transmit a signal indicative of imaging to the camera 116 sequentially when the weight applied to the placing surface 114a changes. The camera 116 may take a still image sequentially while using the signal indicative of imaging received from the control unit 123 as a predetermined trigger.

Figure 23:
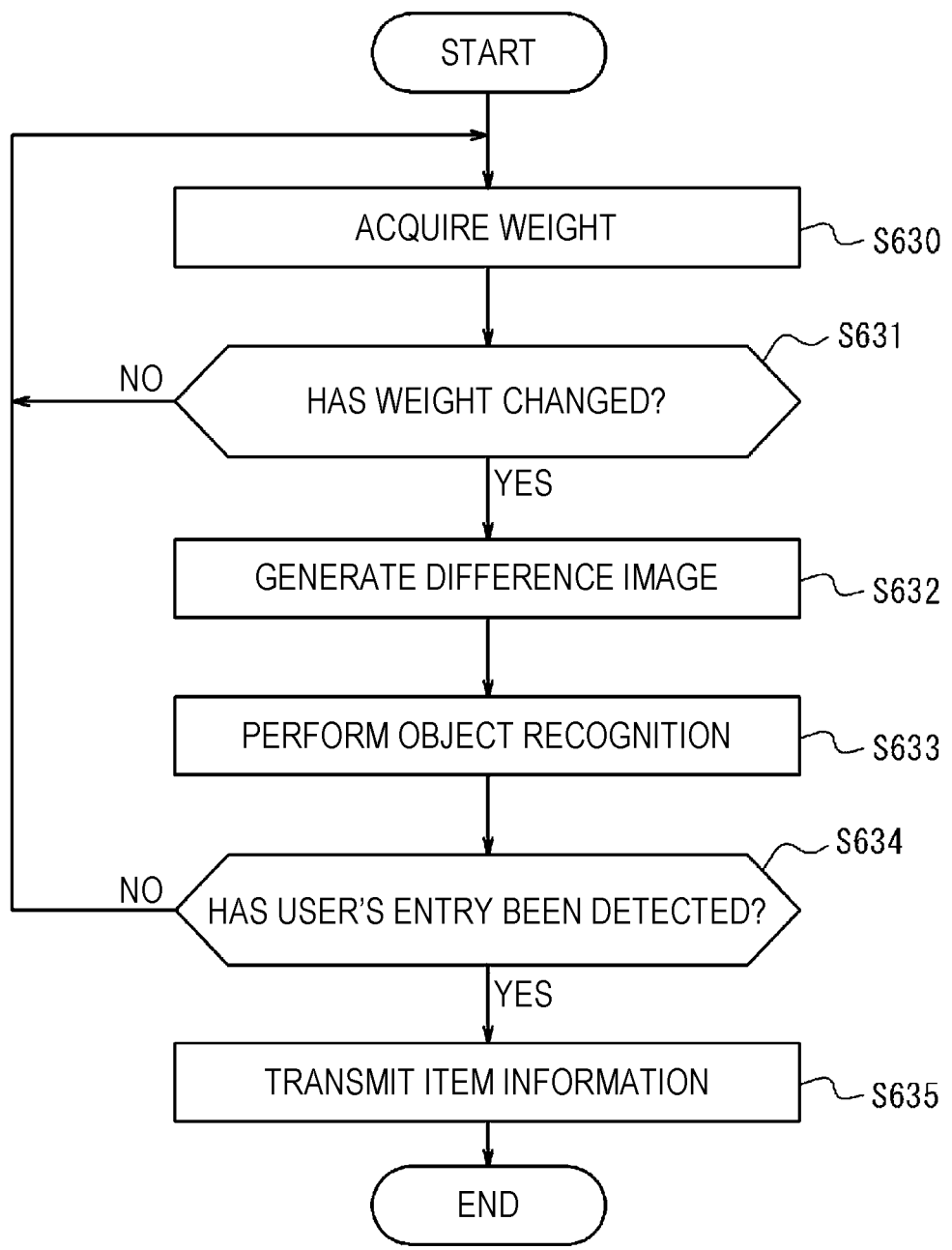
FIG. 23 is a flowchart illustrating object specifying processing of the information processing system according to the embodiment of the present disclosure.

FIG. 23 is a flowchart illustrating object specifying processing of the information processing system 210 according to the embodiment of the present disclosure. The control unit 123 may start the object specifying processing when acquisition of an image signal from the camera 116 starts. The control unit 123 may cause the image signal acquired from the camera 116 to be stored in the storage unit 122. Furthermore, the control unit 123 may start the object specifying processing again after customer's payment is finished.

The control unit 123 causes the communication unit 120 to acquire a weight applied to the placing surface 114a of the placing table 114 from the weight sensor 119 through the communication line (step S630). The control unit 123 determines whether or not the weight applied to the placing surface 114a of the placing table 114 has changed (step S631).

In a case where the control unit 123 determines that the weight applied to the placing surface 114a of the placing table 114 has changed (YES in step S631), the control unit 123 proceeds to a process in step S632. On the other hand, in a case where the control unit 123 determines that the weight applied to the placing surface 114a of the placing table 114 has not changed (NO in step S631), the control unit 123 returns to the process in step S630.

In the process in step S632, the control unit 123 generates a difference image by using taken images taken at imaging times before and after a time of the change in weight applied to the placing surface 114a of the placing table 114.

The control unit 123 performs processes in steps S633, S634, and S635 in the same manner as the processes in steps S613, S614, and S615 illustrated in FIG. 18.

Figure 24:
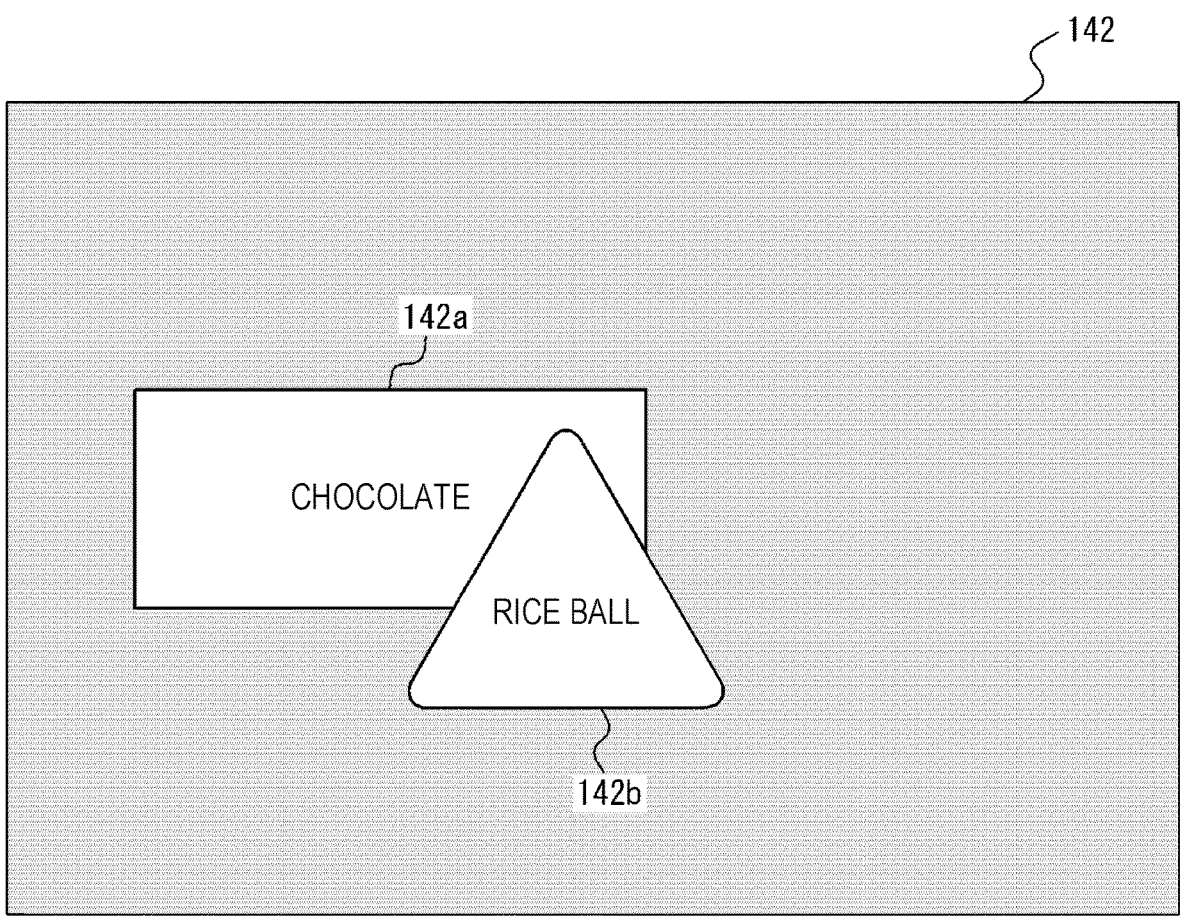
FIG. 24 illustrates an example of a difference image according to the embodiment of the present disclosure.

FIG. 24 illustrates an example of a difference image 142 according to the embodiment of the present disclosure. The difference image 142 includes partial images corresponding to two objects. For example, the difference image 142 includes a partial image 142a and a partial image 142b. The partial image 142a and the partial image 142b are parts of the difference image 142. The partial image 142a corresponds to chocolate. The partial image 142b corresponds to a rice ball.

A customer sometimes places a plurality of items on the placing surface 114a of the placing table 114 at one time. In a case where a customer places a plurality of items on the placing surface 114a at one time, a difference image including partial images corresponding to a plurality of objects such as the difference image 142 can be generated.

In the information processing device 118 according to the present embodiment, in a case where a plurality of objects are individually detected in a difference image, the control unit 123 performs object recognition on each of partial images corresponding to the objects. For example, the control unit 123 may detect the number of objects in the difference image. The control unit 123 may detect the number of objects by detecting the objects in the difference image by the known object detection method. The control unit 123 determines whether or not a plurality of objects have been individually detected in the difference image. In a case where it is determined that a plurality of objects have been individually detected in the difference image, the control unit 123 performs object recognition for each of partial images corresponding to the objects.

For example, the control unit 123 detects two different objects in the difference image 142. The control unit 123 determines that a plurality of objects have been separately detected in the difference image 142. The control unit 123 performs object recognition for each of the partial image 142a and the partial image 142b corresponding to the objects. The control unit 123 specifies an object corresponding to the partial image 142a as chocolate by performing object recognition on the partial image 142a. The control unit 123 specifies an object corresponding to the partial image 142b as a rice ball by performing object recognition on the partial image 142b.

Figure 25:
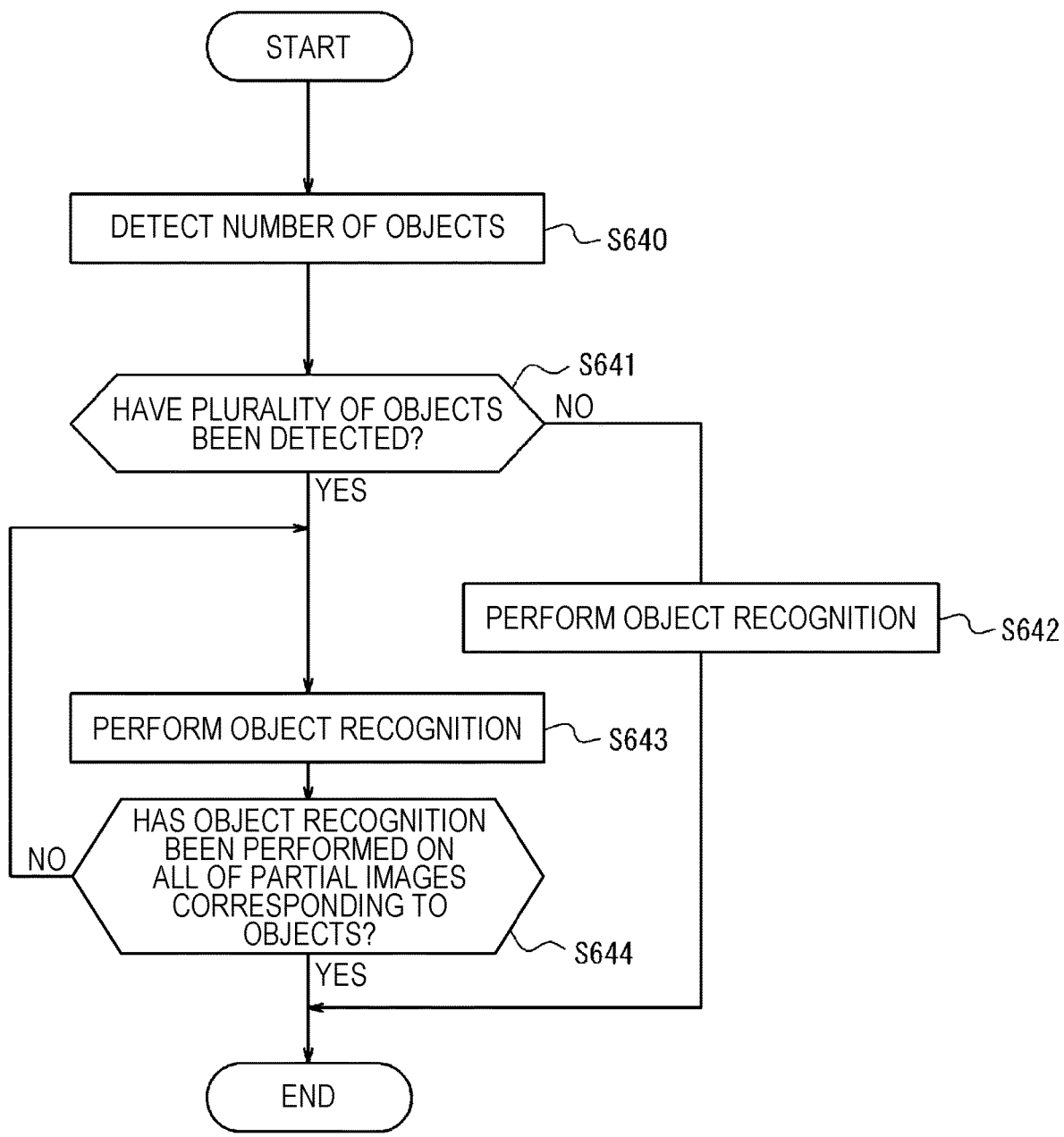
FIG. 25 is a flowchart illustrating object recognition on a difference image in the information processing system according to the embodiment of the present disclosure.

FIG. 25 is a flowchart illustrating object recognition performed on a difference image in the information processing system 110 according to the embodiment of the present disclosure. The object recognition performed on a difference image may be performed instead of the process in step S613 illustrated in FIG. 18, the process in step S623 illustrated in FIG. 21, and the process in step S633 illustrated in FIG. 23. In this case, the control unit 123 may start the object recognition on a difference image after performing the process in step S612 illustrated in FIG. 18, after performing the process in step S622 illustrated in FIG. 21, or after performing the process in step S632 illustrated in FIG. 23.

The control unit 123 detects the number of objects in the difference image (step S640). The control unit 123 determines whether or not a plurality of objects have been individually detected in the difference image (step S641).

In a case where the control unit 123 determines that a plurality of objects have not been individually detected in the difference image (NO in step S641), the control unit 123 proceeds to a process in step S642. For example, in a case where the control unit 123 determines that a single object has been detected in the difference image, the control unit 123 proceeds to the process in step S642. In the process in step S642, the control unit 123 performs object recognition on the difference image. After the process in step S642, the control unit 123 proceeds to the process in step S614 illustrated in FIG. 18, the process in step S624 illustrated in FIG. 21, or the process in step S634 illustrated in FIG. 23.

In a case where the control unit 123 determines that a plurality of objects have been individually detected in the difference image (YES in step S641), the control unit 123 proceeds to a process in step S643. When the control unit 123 proceeds to the process in step S643, the control unit 123 may cause the number of objects detected in the difference image to be stored in the storage unit 122.

In the process in step S643, the control unit 123 performs object recognition on a partial image corresponding to a single object included in the difference image. In a process in step S644, the control unit 123 determines whether or not the process in step S643 has been performed on all of partial images corresponding to the objects included in the difference image.

In a case where the control unit 123 determines that the process in step S643 has been performed on all of the partial images corresponding to the objects (YES in step S644), the control unit 123 proceeds to the process in step S614 illustrated in FIG. 18, the process in step S624 illustrated in FIG. 21, or the process in step S634 illustrated in FIG. 23.

In a case where the control unit 123 does not determine that the process in step S643 has been performed on all of the partial images corresponding to the objects (NO in step S644), the control unit 123 performs the process in step S643 again. In the process in step S643 performed again, the control unit 123 performs object recognition on a partial image on which object recognition has not been performed among the partial images corresponding to the objects detected in the difference image.

As described above, according to the present embodiment, in a case where a plurality of objects are detected in a difference image, object recognition is performed for each of partial images corresponding to the objects. The objects can be more accurately specified by such processing.

Figure 26:
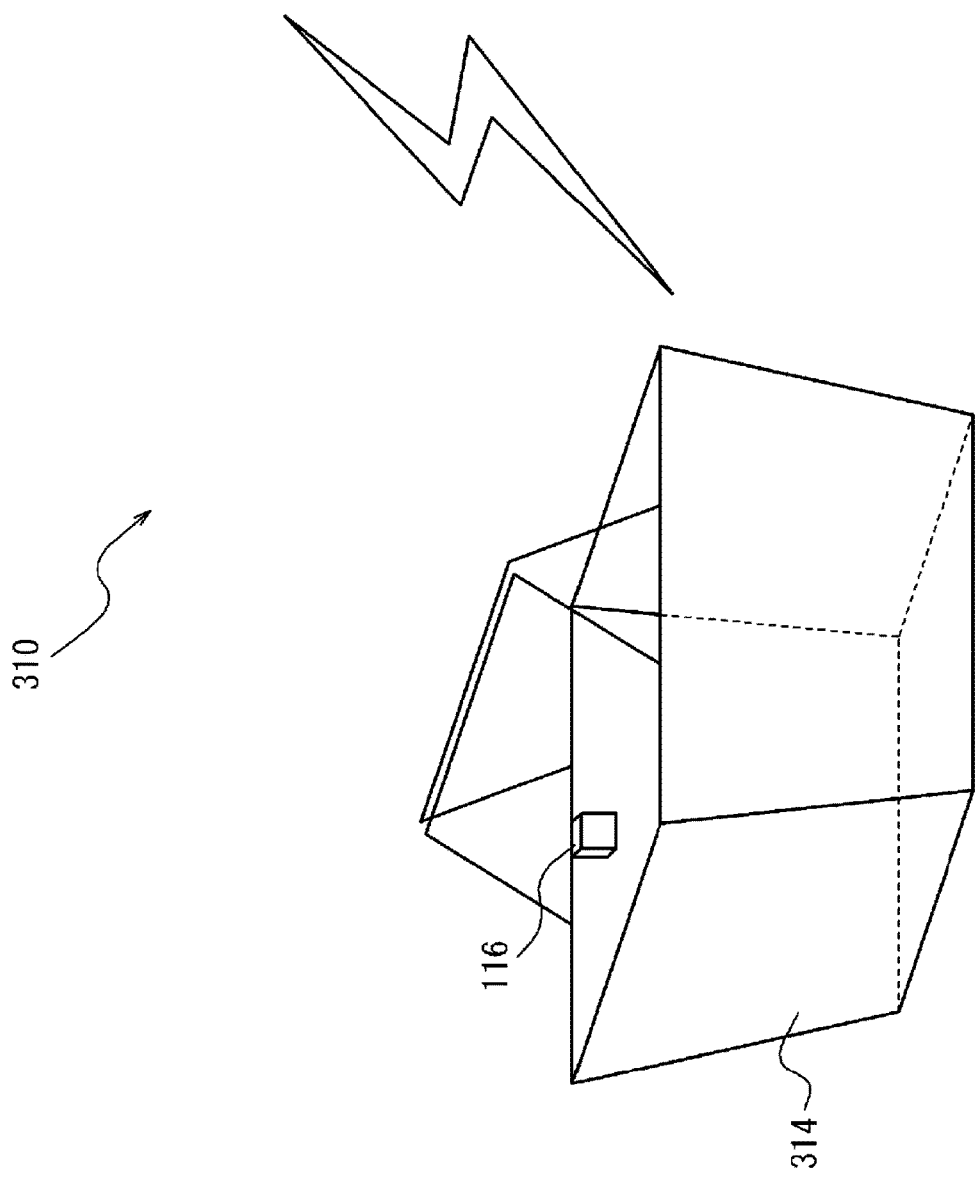
FIG. 26 illustrates an overall configuration of an information processing system according to still another embodiment of the present disclosure.

FIG. 26 illustrates an overall configuration of an information processing system 310 according to still another embodiment of the present disclosure. The information processing system 310 includes a shopping basket 314, a camera 116, a display device 117, and an information processing device 118.

The shopping basket 314 can be used by a customer who has visited a store. The customer can put an item which he or she wants to buy into the shopping basket 314.

The camera 116 images an inside of the shopping basket 314. The camera 116 may be disposed so as to be capable of imaging the inside of the shopping basket 314. The camera 116 may be disposed on an edge of an upper portion of the shopping basket 314. The camera 116 may be, for example, fixed on an edge of an upper portion of the shopping basket 314 so as to be capable of imaging the inside of the shopping basket 314.

The camera 116 may include a communication module that is capable of performing wireless communication with the information processing device 118. The camera 116 may transmit an image signal to the information processing device 118 by the wireless module.

As described above, the information processing device 118 can specify an object corresponding to an image included in at least any one of two taken images of different imaging times on the basis of a difference image between the two taken images.

Figure 27:
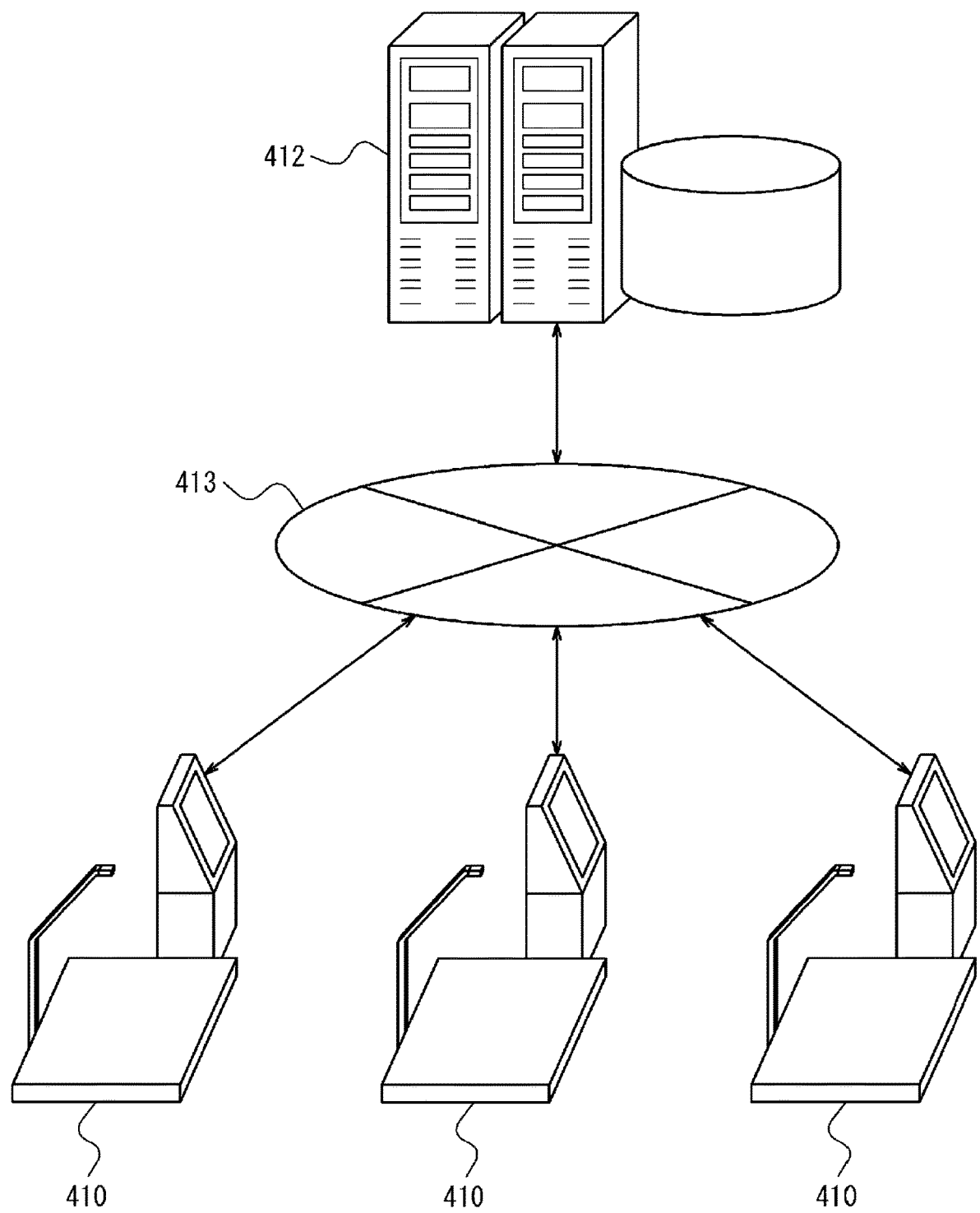
FIG. 27 illustrates an overall configuration of a payment system according to still another embodiment of the present disclosure.

As illustrated in FIG. 27, a payment system 411 includes at least one information processing system 410 and a server 412. The server 412 may be a physical server or may be a cloud server. The information processing system 410 and the server 412 are communicable with each other over a network 413. The network 413 may be a wireless network, may be a wired network, or may be a combination of a wireless network and a wired network.

The information processing system 410 may be disposed at any store such as a convenience store or a supermarket. The information processing system 410 may be configured as a cash register terminal of the store. The information processing system 410 generates a taken image by imaging an item placed by a placing table 414, which will be described later, by a customer. The information processing system 410 specifies which item of the store an object in the generated taken image is. In the present disclosure, an "object in a taken image" means an image of the object drawn as an image in the taken image. The information processing system 410 transmits item information thus specified to the server 412 over the network 413. The item information can include an item name and the number of items. The server 412 calculates a billing amount for a customer on the basis of the item information. The server 412 transmits the billing amount to the information processing system 410 over the network 413. The information processing system 410 requests payment of the billing amount from the customer by presenting the billing amount to the customer.

Figure 28:
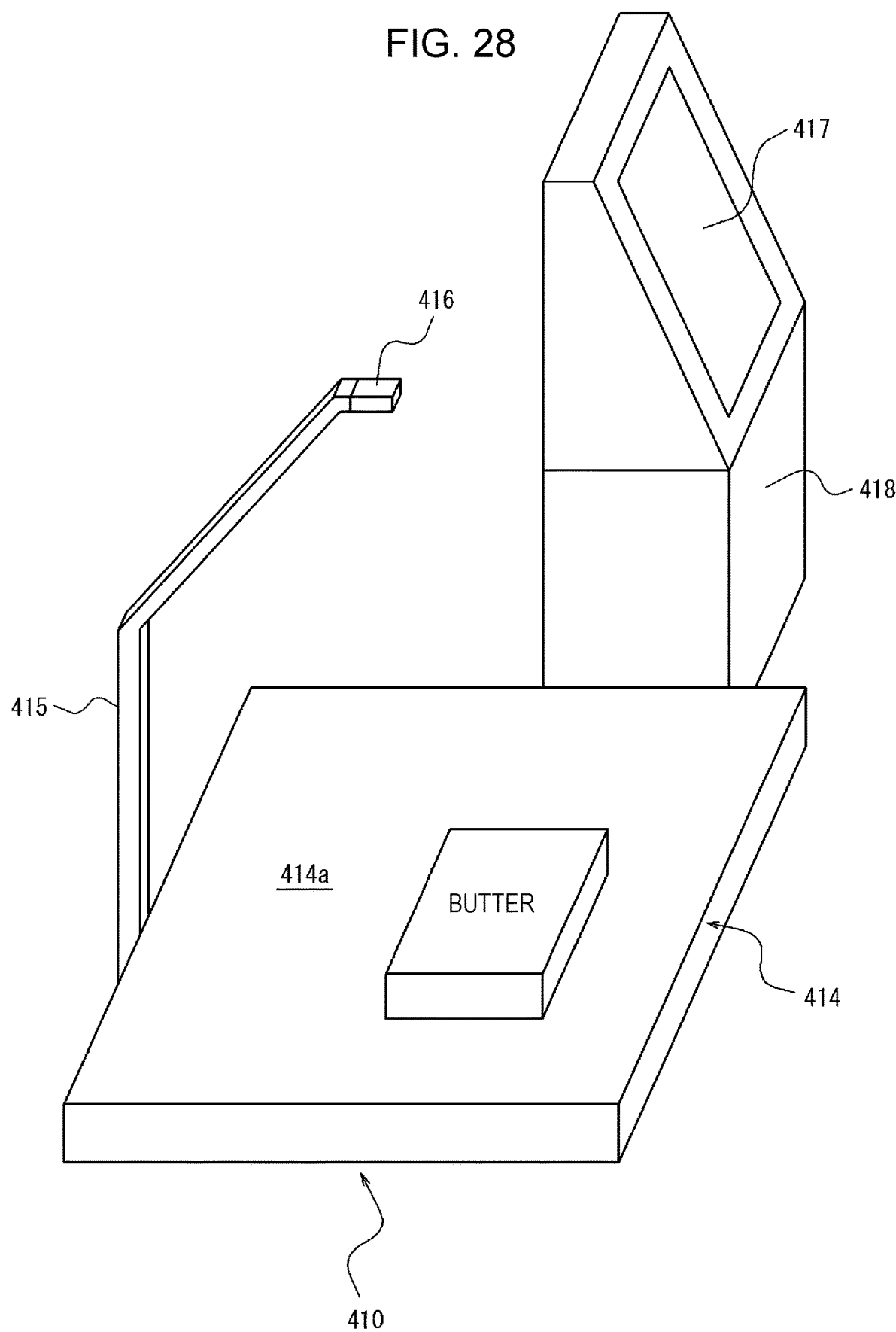
FIG. 28 illustrates an overall configuration of an information processing system illustrated in FIG. 27.

As illustrated in FIG. 28, the information processing system 410 includes a camera 416 (imaging unit) and an information processing device 418. The information processing system 410 may include the placing table 414, a support pole 415, and a display device 417.

The placing table 414 includes a placing surface 414a. A customer places an item which he or she wants to buy on the placing surface 414a at a time of payment. In the present embodiment, the placing surface 414a has a substantially rectangular shape. However, the placing surface 414a may have any shape.

The support pole 415 extends from a side portion of the placing table 414 toward one side in a direction normal to the placing surface 414a. The one side in the direction normal to the placing surface 414a may be a side away from the placing surface 414a in the direction normal to the placing surface 414a. The camera 416 is located at a front end of the support pole 415.

The camera 416 generates an image signal corresponding to a taken image by imaging. The camera 416 may be disposed so as to be capable of imaging at least a part of the placing surface 414a of the placing table 414. The camera 416 may be disposed so that an optical axis thereof becomes perpendicular to the placing surface 414a. The camera 416 may be disposed at the front end of the support pole 415. The camera 416 may be, for example, fixed at the front end of the support pole 415 so as to be capable of imaging the placing surface 414a of the placing table 414.

The camera 416 can acquire a signal indicative of start of imaging from the information processing device 418. Upon receipt of the signal indicative of start of imaging, the camera 416 can start imaging. The camera 416 may supply an image signal generated by the imaging to the information processing device 418 through the communication line. The camera 416 may perform imaging at any frame rate. The camera 416 may perform imaging successively at any frame rate or may take a still image as needed on the basis of a predetermined trigger. The predetermined trigger may be a signal indicative of imaging from the information processing device 418.

The display device 417 may include any display such a liquid crystal display. The display device 417 displays an image on the basis of a signal acquired from the information processing device 418. For example, the display device 417 can acquire a signal indicative of a billing amount of an item from the information processing device 418. The display device 417 can display an image indicative of the billing amount of the item on the basis of the signal indicative of the billing amount of the item.

The display device 417 may have a touch screen function. The display device 417 may be disposed close to the placing table 414. The display device 417 may be disposed so as to face a customer when the customer places an item on the placing table 414.

Figure 29:
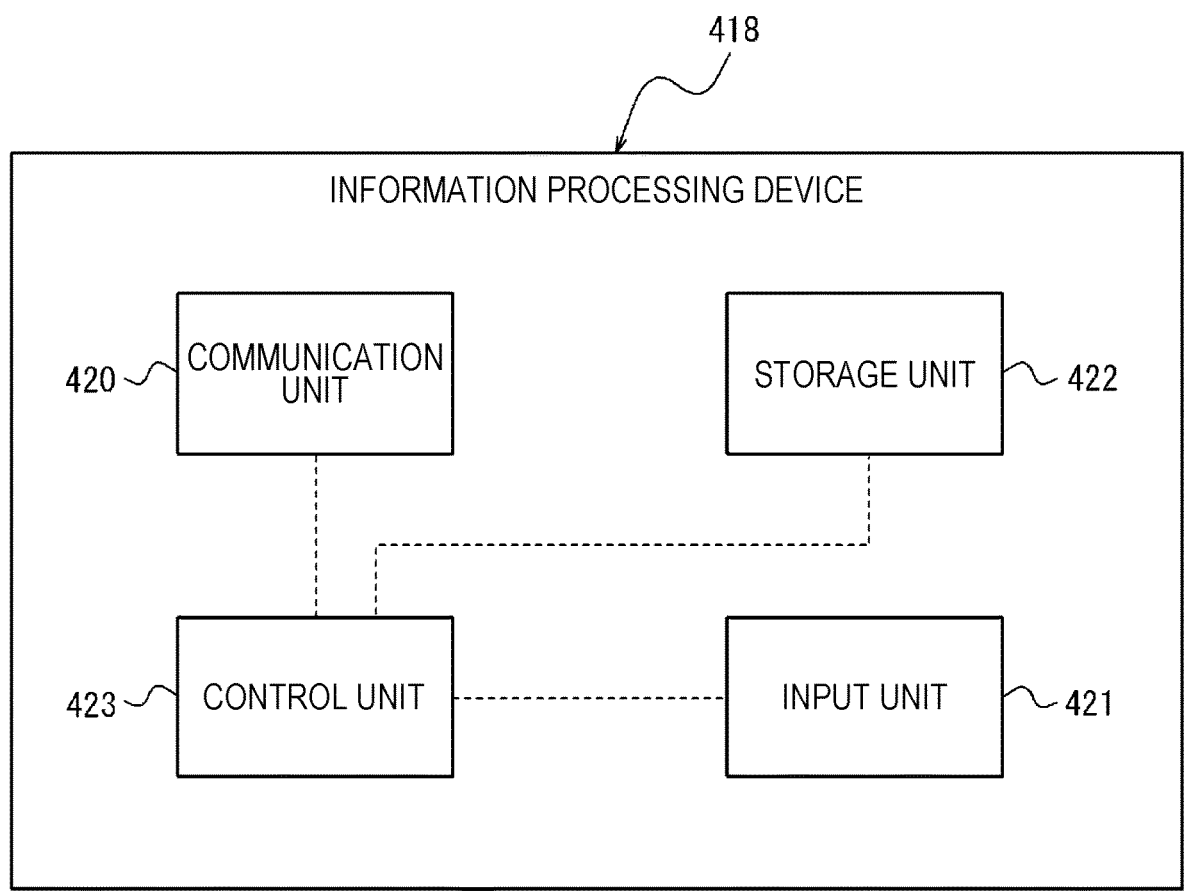
FIG. 29 is a functional block diagram of the information processing system illustrated in FIG. 28.

The information processing device 418 may be disposed close to the placing table 414. As illustrated in FIG. 29, the information processing device 418 includes a control unit 423. The information processing device 418 may include a communication unit 420, an input unit 421, and a storage unit 422.

The communication unit 420 includes a communication module. The communication module may include a communication module that can communicate with the camera 416 through a communication line, a module that can communicate with the display device 417 through a communication line, and a communication module that can communicate with the server 412 over the network 413. The communication line between the camera 416 and the communication unit 420 and the communication line between the display device 417 and the communication unit 420 may each be a wired communication line or may each be a wireless communication line.

The input unit 421 includes one or more interfaces that are capable of detecting user's entry. For example, the input unit 421 may include at least any one of a physical key, a capacitive, key, and a touch screen. In the present embodiment, the input unit 421 is a touch screen. The input unit 421 that is a touch screen is provided so as to be integral with the display device 417.

The storage unit 422 includes any storage device such as a RAM and a ROM. The storage unit 422 stores therein various programs for causing the control unit 423 to function and various kinds of information used by the control unit 423. The storage unit 422 may store therein item data of the store.

The item data may include character data. The character data may include a character string written on a package or the like of an item. The character string written on a package or the like of an item may be associated with an identifier for identifying the item. Examples of the identifier include an item name, an item code, a barcode, and any identification (ID). Hereinafter, it is assumed that an identifier for identifying an item is an item name for convenience of description. The character data can be used in first processing, which will be described later. The item data may include any data used in the first processing, which will be described later, in addition to the character data. For example, in a case where code recognition, which will be described later, is used in the first processing, which will be described later, the item data may include images of a one-dimensional code such as a barcode, a two-dimensional code such as a QR code (Registered Trademark), and a marker such as an identification marker. These images may be associated with an identifier.

The item data may include a machine learning model. The machine learning model can be generated by machine learning and learning data, as described later. The machine learning model can be used in second processing, which will be described later. The machine learning model may be a trained model.

The item data may include item image data. The item image data may include an item image associated with an identifier for identifying the item. Hereinafter, it is assumed that the identifier for identifying an item is an item name for convenience of description. The item image data can be used in the second processing and third processing, which will be described later. The same item image data may be used in the second processing and the third processing, which will be described later. Alternatively, different item image data may be used in the second processing and the third processing, which will be described later. In a case where different item image data are used in the second processing and the third processing, which will be described later, the storage unit 422 may store therein item image data used for the second processing and item image data used for the third processing. Furthermore, in a case where object recognition other than feature matching, which will be described later, is used in the second processing, which will be described later, the item data may include data according to the object recognition associated with an identifier.

The control unit 423 includes one or more processors and a memory. The processors may include a general-purpose processor that reads a specific program and executes a specific function and a dedicated processor specialized for specific processing. The dedicated processor may include an application specific integrated circuit (ASIC). The processors may include a programmable logic device (PLD). The PLD may include an FPGA. The control unit 23 may be an SoC or an SiP in which one or a plurality of processors work together.

The control unit 423 may cause the communication unit 420 to acquire the item data from the server 412 over the network 413. The control unit 423 may cause the acquired item data to be stored in the storage unit 422.

The control unit 423 can cause the communication unit 420 to transmit a signal indicative of start of imaging to the camera 416. The control unit 423 may transmit the signal indicative of start of imaging when the information processing device 418 is activated. The control unit 423 may transmit the signal indicative of start of imaging when the input unit 421 detects user's entry indicative of start of imaging. This user's entry can be given by a store clerk with the use of the input unit 421, for example, when the store opens.

The control unit 423 causes the communication unit 420 to acquire an image signal from the camera 416. The control unit 423 can acquire a taken image corresponding to the image signal by acquiring the image signal. The control unit 423 may cause the acquired taken image to be stored in the storage unit 422. For example, the control unit 423 can acquire a taken image 430 such as the one illustrated in FIG. 30.

The taken image 430 includes a partial image 430a, a partial image 430b, and a partial image 430c. The partial image 430a, the partial image 430b, and the partial image 430c are parts of the taken image 430. The partial image 430a corresponds to a rice ball with pickled plum. The partial image 430b corresponds to butter. The partial image 430c corresponds to chocolate. The rice ball with pickled plum, the butter, and the chocolate are items of the store. A character string is given to a package of the rice ball with pickled plum and a package of the butter. A stripe pattern is given to a package of the chocolate. The rice ball with pickled plum, the butter, and the chocolate are placed on the placing surface 414a of the placing table 414 by a customer. Since the rice ball overlaps the butter on the placing table 414, a part of the partial image 430b is missing. The expression "a part of a partial image is missing" in the present disclosure means that a part of an actual partial image is missing when the actual partial image and outer appearance of the whole object viewed from the camera 416 side are compared. Since the butter overlaps the chocolate on the placing table 414, a part of the partial image 430c is missing.

The control unit 423 performs at least any one of plural kinds of image processing on a taken image. The image processing may be object recognition processing. The object recognition processing may be processing for detecting a partial image corresponding to an object included in a taken image and specifying which item the object is. The control unit 423 may give a degree of reliability to a processing result of the performed image processing. The degree of reliability is an index indicative of how reliable a processing result is. Hereinafter, it is assumed that specifying which item an object is means specifying an item name of the object. The plural kinds of image processing include the first processing, the second processing, and the third processing. Note, however, that the plural kinds of image processing are not limited to the first processing, the second processing, and the third processing.

The first processing is object recognition processing using symbol recognition. The symbol recognition may include, but is not limited to, character recognition and code recognition. The code recognition may include, but is not limited to, processing for recognizing a one-dimensional code such as a barcode, processing for recognizing a two-dimensional code such as a QR code (Registered Trademark), and processing for recognizing a marker such as an identification marker identifying an item. The first processing may be object recognition processing using character recognition, processing for recognizing a one-dimensional code, processing for recognizing a two-dimensional code, processing for recognizing a marker, or a combination of at least some of these.

In the present embodiment, it is assumed that the first processing is object recognition processing using character recognition as symbol recognition. That is, in the present embodiment, the first processing is processing for specifying an item name of an object in a taken image by character recognition. For example, in the first processing, the control unit 423 extracts a character image from a taken image. The control unit 423 extracts a character string from the extracted character image. The control unit 423 specifies an item name of an object by analyzing the extracted character string. As the analysis, the control unit 423 may specify an item name of an object corresponding to a partial image from which a character string has been extracted by matching between the extracted character string and a character string included in the character data of the storage unit 422. For example, the control unit 423 extracts a character string "rice ball pickled plum" from the partial image 430a of the taken image 430. The control unit 423 specifies an item name of an object corresponding to the partial image 430a as an item name "rice ball with pickled plum" by matching between the extracted character string "rice ball pickled plum" and the character data of the storage unit 422.

In the first processing, the control unit 423 may give a degree of reliability to a processing result of the first processing. The control unit 423 may calculate the degree of reliability on the basis of a rate of matching between an extracted character string and a character string included in the character data of the storage unit 422.

A processing speed of the first processing can be relatively high. For example, in a case where character recognition is used as the first processing, a processing speed of the first processing can be higher than a processing speed of the third processing using feature matching, which will be described later.

Data preparation for performing the first processing is relatively easier than data preparation for performing the second processing and the third processing, which will be described later. For example, in a case where the character recognition is used as the first processing, character data used in the first processing can be prepared relatively easily than item image data used in the second processing and the third processing, which will be described later.

In the first processing, in a case where a character string can be extracted from a taken image, the control unit 423 can specify an object by using the character string. In the first processing, an object can be specified accurately than the second processing and the third processing, which will be described later, depending on a state of the object on the placing table 414.

For example, some items handled at a store have similar outer appearances even though these items are different items. For example, an item "rice ball with pickled plum" and an item "rice ball with sea kelp" are different items. However, an outer appearance of the item "rice ball with pickled plum" and an outer appearance of the item "rice ball with sea kelp" can be similar in a case where these items have the same triangular shape. It is sometimes difficult to specify items having similar outer appearances as different items from a taken image by the second processing and the third processing, which will be described later. Even items having similar outer appearances can be specified from a taken image as different items by the first processing in a case where character strings are given to these items. For example, in the first processing, the control unit 423 can specify an item name of an object corresponding to the partial image 430a as "rice ball with pickled plum" by extracting a character string "rice ball pickled plum" from the partial image 430a.

For example, some items handled at a store are deformable. For example, an item whose package is a bag can be deformed when the bag is deformed by application of external force. When an item deforms, a shape of an image corresponding to the item in a taken image can also change. When a shape of a partial image corresponding to an object changes, it is sometimes impossible to prepare a machine learning model (described later) that can handle the deformed partial image in the second processing, which will be described later. In this case, it is sometimes difficult to specify the object by the second processing, which will be described later. Meanwhile, in a case where a character string can be extracted from a partial image even if a shape of the partial image changes, the object can be specified by the first processing.

For example, a plurality of items overlap one another on the placing table 414 in some cases. In a case where a plurality of items overlap one another, a partial image corresponding to an item has a missing part in a taken image in some cases. In a case where a partial image corresponding to an object has a missing part, it is sometimes impossible to sufficiently extract predetermined features, which will be described later, in the third processing, which will be described later. In this case, it is sometimes difficult to specify the object by the third processing, which will be described later. Even in a case where a partial image corresponding to an object has a missing part, the object can be specified by the first processing as long as a character string can be extracted from the partial image. For example, a part of the partial image 430*b* is missing. A character string "butter" can be extracted from the partial image 430*b*. In the first processing, the control unit 423 can specify an item name of the object corresponding to the partial image 430*b* as an item name "butter" by extracting the character string "butter" from the partial image 430*b*.

The second processing is object recognition processing using machine learning. In the present embodiment, the second processing is processing for specifying an item name of an object in a taken image on the basis of machine learning. The control unit 423 decides features used for object recognition on the basis of a machine learning model. The features may include at least any one of luminance and colors of pixels included in an item image, a shape of the item image, and the number of pixels constituting the item image. In the present embodiment, it is assumed that the object recognition is feature matching although the object recognition is not limited to this. The feature matching is to specify an item name of an object by matching between features extracted from a taken image and features of an item image of the item image data of the storage unit 422. That is, in the second processing, the control unit 423 decides features extracted from a partial image by a machine learning model. The control unit 423 extracts the decided features from the partial image and specifies an item name of an object by matching between the extracted features and features of an item image of the item image data of the storage unit 422.

In the second processing, the machine learning model may be generated by machine learning and learning data. In the second processing, a trained machine learning model may be used. The machine learning used to generate the machine learning model may be at least any one of support vector machine (SVM), Bayesian inference, deep learning, and the like. The machine learning model may be generated by combining support vector machine, Bayesian inference, deep learning, and the like as appropriate.

In the second processing, the control unit 423 may give a degree of reliability to a processing result of the second processing. The control unit 423 may calculate the degree of reliability on the basis of a rate of matching between features of a partial image and features of an item image of the storage unit 422 in the feature matching.

In the second processing, features used for object recognition such as feature matching can be decided by a machine learning model. On the other hand, in the third processing, features used for feature matching are decided in advance, as described later. A processing speed of the second processing can be higher than a processing speed of the third processing, which will be described later, since features are decided by a machine learning model.

In the second processing, an object can be specified more accurately than the first processing and the third processing, which will be described later, depending on a state of the object on the placing table 414.

Figure 30:
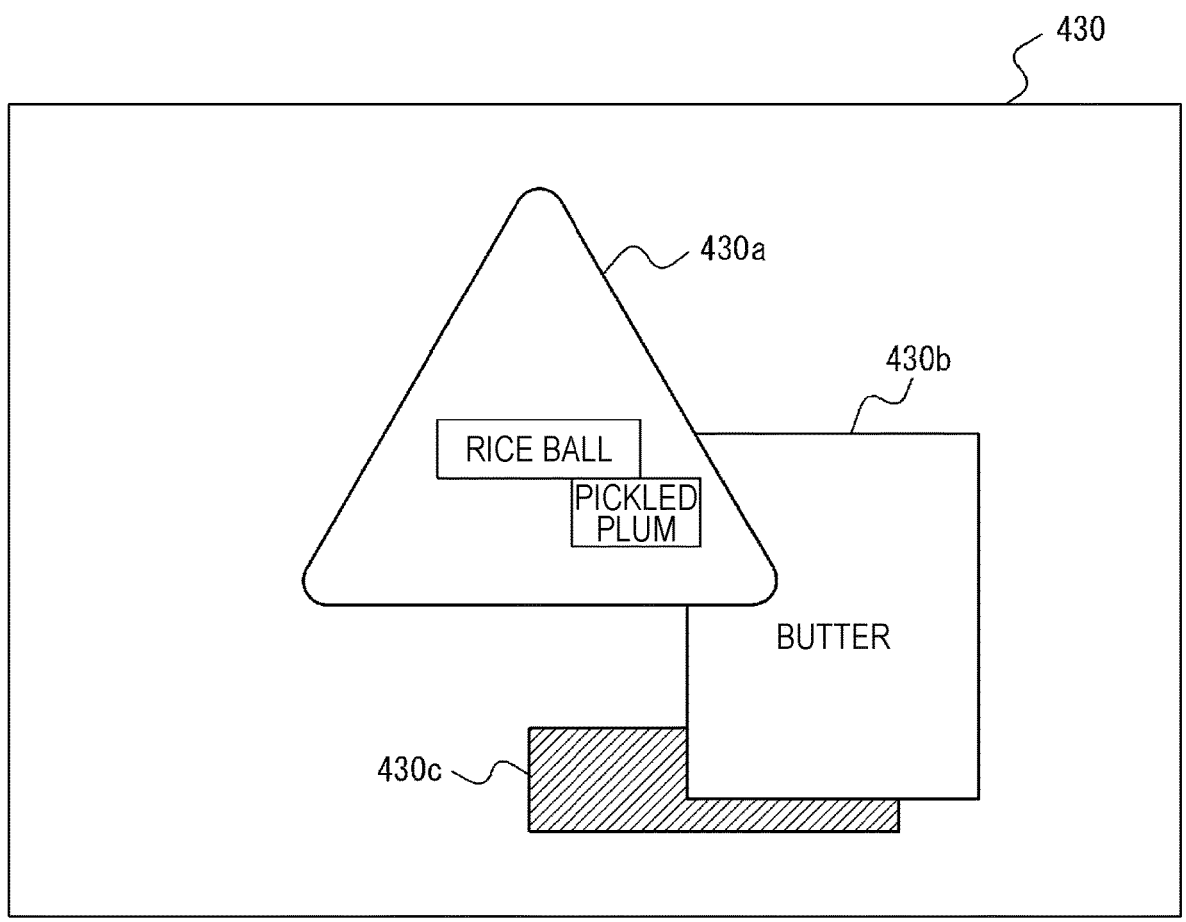
FIG. 30 illustrates an example of a taken image according to the embodiment of the present disclosure.

For example, some items handled at a store have no character string on a package or the like thereof. It is sometimes difficult to specify an object that is not given a character string from a taken image by the first processing. Even an object that has no character string on a package or the like thereof can be specified from a taken image by the second processing. For example, the item "chocolate" has no character string on a package thereof, as illustrated in FIG. 30. Accordingly, no character string can be extracted from the partial image 430*c*. An item name of the partial image 430*c* can be specified as chocolate by the third processing.

For example, outer appearances of some items handled at a store vary from one individual to another even although these individuals are handled as the same item. Examples of such items include vegetables and fruits. As for such an item whose outer appearance varies from one individual to another, features to be used for object recognition such as feature matching sometimes vary depending on a partial image of the item. In this case, it is sometimes difficult to specify the item from a taken image by the third processing, which will be described later. This is because features used for feature matching are decided in advance in the third processing, as described later. On the other hand, in the second processing, features used for object recognition such as feature matching can be decided by the machine learning model for each partial image. According to such a configuration, even an item whose outer appearance varies from one individual to another can be specified as the same item from a taken image by the second processing.

For example, a part of an image corresponding to an item is missing in a taken image due to overlapping between a plurality of items in some cases, as described above. In a case where a part of a partial image corresponding to an object is missing, it is sometimes impossible to sufficiently extract features used for feature matching in the third processing, which will be described later. In this case, it is sometimes difficult to specify the object by the third processing, which will be described later. On the other hand, in the second processing, features used for object recognition such as feature matching can be decided by a machine learning model for each partial image. Furthermore, even in a case where an object is given a character string, it is sometimes impossible to extract the character string from a partial image corresponding to the object due to missing of a part of the partial image in the first processing. In this case, it is difficult to specify the object by the first processing. According to the second processing, even in a case where a character string cannot be extracted due to missing of a part of an image corresponding to an object, the object can be specified from the image, unlike the first processing.

The third processing is object recognition processing using feature matching. In the present embodiment, the third processing is processing for specifying an item name of an object in a taken image by feature matching. In the third processing, features used for feature matching are decided in advance, unlike the second processing. The features used for feature matching may be decided as appropriate from among the features described above. That is, in the third processing, the control unit 423 extracts features decided in advance from a partial image. The control unit 423 specifies an item name of an object by matching between the extracted features and features of an item image of item image data of the storage unit 422.

In the third processing, the control unit 423 may give a degree of reliability to a processing result of the third processing. Furthermore, the control unit 423 may calculate the degree of reliability on the basis of a rate of matching between features of a partial image and features of an item image of the storage unit 422 in the feature matching.

Data preparation for performing the third processing is easier than data preparation for performing the second processing. For example, in the third processing, features used for feature matching are decided in advance. For example, in the third processing, features used for feature matching are decided in advance. In the third processing, features are decided in advance, and therefore it is unnecessary to prepare a machine learning model for deciding features unlike the second processing.

In the third processing, an object can be specified more accurately than the first processing and the second processing depending on a state of the object on the placing table 414.

For example, some items handled at a store have no character string on a package or the like thereof, as described above. It is sometimes difficult to specify an object having no character string thereon in a taken image by the first processing. Even an object having no character string on a package or the like thereof can be specified in a taken image by the third processing.

For example, some items handled at a store are deformable, as described above. When an item is deformed, a shape of a partial image corresponding to an object in a taken image can also change, as described above. Even in a case where an object has a character string thereon, it is sometimes impossible to extract the character string from a partial image corresponding to the object depending on a degree of deformation of the partial image in the first processing. In this case, it is difficult to specify the object by the first processing. According to the third processing, an object can be specified from a partial image even in a case where a character string cannot be specified due to deformation of the image, unlike the first processing. Furthermore, in the second processing, it is sometimes impossible to prepare a machine learning model that can handle a deformed partial image. In this case, it is difficult to specify an object from a deformed partial image by the second processing. In the third processing, an object can be specified from a deformed partial image since a machine learning model is not used.

In the present disclosure, the control unit 423 specifies an object corresponding to a partial image on the basis of a state of the object corresponding to the partial image or a degree of reliability given to a processing result. In the present embodiment, the control unit 423 specifies an object corresponding to a partial image on the basis of a degree of reliability given to a processing result.

Specifically, the control unit 423 performs the first processing, the second processing, and the third processing on a taken image. The control unit 423 gives a degree of reliability to a processing result of the first processing, a processing result of the second processing, and a processing result of the third processing. However, the control unit 423 need only perform at least two of the plural kinds of image processing. For example, as the at least two of the plural kinds of image processing, the control unit 423 may perform the character recognition and the code recognition included in the first processing or may perform the first processing and the second processing. Furthermore, the control unit 423 may perform the first processing, the second processing, and the third processing in parallel or may sequentially perform the first processing, the second processing, and the third processing in a predetermined order. Furthermore, the control unit 423 may detect the number of objects from a taken image by a known object detection method before performing the processing such as the first processing. In this case, in a case where a plurality of objects are detected from a taken image, the control unit 423 may perform the first processing, the second processing, and the third processing for each of partial images corresponding to the objects and give a degree of reliability to a processing result of the first processing, a processing result of the second processing, and a processing result of the third processing. For example, the control unit 423 can detect three objects from the taken image 430. The control unit 423 may perform the first processing, the second processing, and the third processing for each of the partial images 430a, 430b, and 430c corresponding to the objects and give a degree of reliability to a processing result of the first processing, a processing result of the second processing, and a processing result of the third processing. For example, the control unit 423 acquires processing results such as the ones illustrated in FIG. 31.

As illustrated in FIG. 31, the control unit 423 specifies an item name of an object as a "rice ball with pickled plum" as a processing result of the first processing performed on the partial image 430a. The control unit 423 calculates a degree of reliability given to the processing result of the first processing as 95%. Furthermore, the control unit 423 specifies an item name of an object as a "rice ball with pickled plum" as a processing result of the second processing performed on the partial image 430a. The control unit 423 calculates a degree of reliability given to the processing result of the second processing as 65%. Furthermore, the control unit 423 specifies an item name of an object as a "rice ball with sea kelp" as a processing result of the third processing performed on the partial image 430a. The control unit 423 calculates a degree of reliability given to the processing result of the third processing as 64%.

As illustrated in FIG. 31, the control unit 423 specifies an item name of an object as "butter" as a processing result of the first processing performed on the partial image 430b. The control unit 423 calculates a degree of reliability given to the processing result of the first processing as 94%. Furthermore, the control unit 423 specifies an item name of an object as "butter" as a processing result of the second processing performed on the partial image 430b. The control unit 423 calculates a degree of reliability given to the processing result of the second processing as 90%. Furthermore, the control unit 423 specifies an item name of an object as "cheese" as a processing result of the third processing performed on the partial image 430b. The control unit 423 calculates a degree of reliability given to the processing result of the third processing as 75%.

As illustrated in FIG. 31, the control unit 423 determines that a processing result of the first processing is "unable to specify" since a character string cannot be extracted from the partial image 430c. Furthermore, the control unit 423 specifies an item name of an object as "chocolate" as a processing result of the second processing performed on the partial image 430c. The control unit 423 calculates a degree of reliability given to the processing result of the second processing as 80%. Furthermore, the control unit 423 specifies an item name of an object as "chocolate" as a processing result of the third processing performed on the partial image 430c. The control unit 423 calculates a degree of reliability given to the processing result of the third processing as 70%.

In the present embodiment, the control unit 423 specifies an object corresponding to a partial image on the basis of a processing result given a highest degree of reliability. In a case where the first processing, the second processing, and the third processing are performed for each of partial images corresponding to a plurality of objects as described above, the control unit 423 may specify a corresponding object for each of the partial images.

For example, as for the partial image 430a, the control unit 423 acquires the processing result of the first processing given the highest degree of reliability of 95%. The control unit 423 specifies the item name of the object corresponding to the partial image 430a as a "rice ball with pickled plum" on the basis of the processing result of the first processing.

For example, as for the partial image 430b, the control unit 423 acquires the processing result of the first processing given the highest degree of reliability of 94%. The control unit 423 specifies the item name of the object corresponding to the partial image 430b as "butter" on the basis of the processing result of the first processing.

For example, as for the partial image 430c, the control unit 423 acquires the processing result of the second processing given the highest degree of reliability of 80%. The control unit 423 specifies the item name of the object corresponding to the partial image 430c as "chocolate" on the basis of the processing result of the second processing.

The control unit 423 causes the communication unit 420 to transmit the item information thus specified to the server 412 over the network 413. The item information can include an item name and the number of items. The server 412 acquires the item information from the information processing device 418 over the network 413. The server 412 calculates a billing amount for a customer on the basis of the item information. The server 412 transmits a signal indicative of the billing amount to the information processing device 418 over the network 413. The control unit 423 causes the communication unit 420 to acquire the signal indicative of the billing amount from the server 412 over the network 413. The control unit 423 causes the communication unit 420 to transmit the signal indicative of the billing amount to the display device 417.

Figure 32:
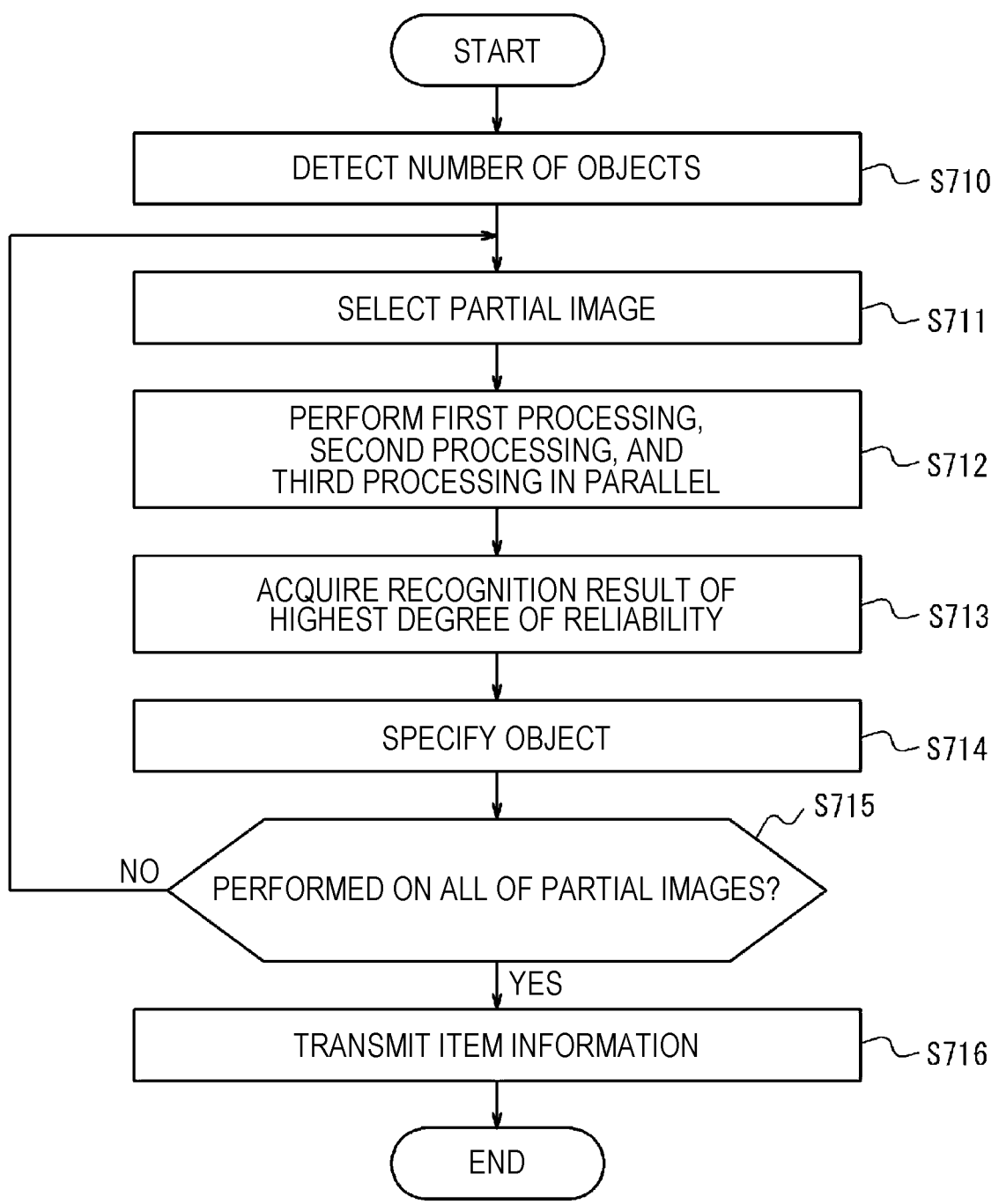
FIG. 32 is a flowchart illustrating object specifying processing of the information processing system according to the embodiment of the present disclosure.

FIG. 32 is a flowchart illustrating object specifying processing of the information processing system 410 according to the embodiment of the present disclosure. The control unit 423 may perform the object specifying processing every time an image signal corresponding to a taken image of 1 frame is acquired from the camera 416. The control unit 423 may cause the acquired taken image to be stored in the storage unit 422.

The control unit 423 detects the number of objects from a taken image (step S710). In the process in step S710, the control unit 423 causes the detected number of objects to be stored in the storage unit 422.

The control unit 423 selects a partial image on which a process in step S714, which will be described later, has not been performed (step S711). The control unit 423 performs the first processing, the second processing, and the third processing in parallel on the partial image selected in the process in step S711 (step S712). In the process in step S712, the control unit 423 gives a degree of reliability to a processing result of the first processing, a processing result of the second processing, and a processing result of the third processing.

The control unit 423 acquires a processing result given a highest degree of reliability from among the processing result of the first processing, the processing result of the second processing, and the processing result of the third processing (step S713). The control unit 423 specifies an object on the basis of the processing result acquired in the process in step S713 (step S714).

The control unit 423 determines whether or not the process in step S714 has been performed on all of partial images corresponding to the objects included in the taken image (step S715). In a case where the control unit 423 does not determine that the process in step S714 has been performed on all of the partial images corresponding to the objects included in the taken image (NO in step S715), the control unit 423 returns to the process in step S711. On the other hand, in a case where the control unit 423 determines that the process in step S714 has been performed on all of the partial images corresponding to the objects included in the taken image (YES in step S715), the control unit 423 proceeds to a process in step S716.

In the process in step S716, the control unit 423 causes the communication unit 420 to transmit item information to the server 412 over the network 413.

The number of items which a customer buys may be one or two depending on a store type. In this case, the processes in steps S710, S711, and S715 need not be performed. In a case where the processes in steps S710, S711, and S715 are not performed, the control unit 423 may perform the first processing, the second processing, and the third processing on a taken image in the process in step S712.

Furthermore, in the process in step S712, the control unit 423 need not perform the first processing, the second processing, and the third processing in parallel. For example, the control unit 423 may perform the first processing, the second processing, and the third processing sequentially in a predetermined order.

As described above, in the information processing device 418 according to the present embodiment, the control unit 423 performs the first processing, the second processing, and the third processing on a taken image. The control unit 423 specifies an object from a taken image on the basis of a processing result given a highest degree of reliability among processing results of the first processing, the second processing, and the third processing. By thus specifying an object on the basis of a processing result given a highest degree of reliability, the object can be accurately specified without using images of the object placed on the placing table 414 taken from a plurality of directions. Since an object placed on the placing table 414 need not be imaged from a plurality of directions, the information processing system 410 can have a simple configuration. Therefore, according to the present embodiment, information processing system 410, information processing device 418, and information processing method that are improved can be provided.

Processing of the information processing device 418 according to still another embodiment of the present disclosure is described. As in the above embodiment, the control unit 423 performs the first processing, the second processing, and the third processing on a taken image. As in the above embodiment, the control unit 423 may perform the first processing, the second processing, and the third processing in parallel or may perform the first processing, the second processing, and the third processing sequentially in a predetermined order. The control unit 423 gives a degree of reliability to processing results of the first processing, the second processing, and the third processing. As in the above embodiment, the control unit 423 acquires a highest degree of reliability from among the degrees of reliability given to the processing results of the first processing, the second processing, and the third processing.

In the embodiment of the present disclosure, in a case where the highest degree of reliability is higher than a threshold value, the control unit 423 specifies an object on the basis of the processing result given the highest degree of reliability. The threshold value may be set as appropriate, for example, on the basis of a rate of correctness of past processing results. On the other hand, in a case where the highest degree of reliability is equal to or lower than the threshold value, the control unit 423 specifies a candidate for an object on the basis of the processing result given this degree of reliability.

For example, it is assumed that the control unit 423 obtains the above results (see FIG. 31). It is assumed that the threshold value is 90%.

As for the partial image 430a, the highest degree of reliability is 95%, which is the degree of reliability given to the processing result of the first processing. As for the partial image 430a, the control unit 423 determines that the highest degree of reliability 95% is higher than the threshold value 90%. The control unit 423 specifies an item name of an object corresponding to the partial image 430a as a "rice ball with pickled plum" on the basis of the processing result of the first processing.

As for the partial image 430b, the highest degree of reliability is 94%, which is the degree of reliability given to the processing result of the first processing. As for the partial image 430b, the control unit 423 determines that the highest degree of reliability 94% is higher than the threshold value 90%. The control unit 423 specifies an item name of an object corresponding to the partial image 430b as "butter" on the basis of the processing result of the first processing.

As for the partial image 430c, the highest degree of reliability is 80%, which is the degree of reliability given to the processing result of the second processing. As for the partial image 430c, the control unit 423 determines that the highest degree of reliability 80% is lower than the threshold value 90%. The control unit 423 specifies a candidate for an object corresponding to the partial image 430c as "chocolate" on the basis of the processing result of the second processing.

In a case where the control unit 423 specifies a candidate for an object, the control unit 423 may cause the candidate for the object to be displayed on the display device 417 by causing the communication unit 420 to transmit a control signal to the display device 417 as appropriate. The control unit 423 may present the candidate for the object to a customer by causing the candidate for the object to be displayed on the display device 417. The control unit 423 may present a predetermined message to the customer together with the candidate for the object by causing the predetermined message to be displayed on the display device 417. The predetermined message may be a message inquiring of the customer about whether or not the candidate for the object matches an actual object. In the example of the partial image 430c, the predetermined message may be "Is the item chocolate?".

The control unit 423 may confirm or correct the candidate for the object in accordance with user's entry detected by the input unit 421. In a case where the user's entry detected by the input unit 421 is entry agreeing with the predetermined message, the control unit 423 may specify the candidate for the object as the object corresponding to the partial image. In the example of the partial image 430c, in a case where the user's entry is entry agreeing with the message "Is the item chocolate?", the control unit 423 confirm the object candidate "chocolate" as the object corresponding to the partial image 430c. In a case where the user's entry is entry denying the predetermined message, the control unit 423 may correct the candidate for the object. In this case, the control unit 423 may cause a message prompting customer's entry of a correct item name to be displayed on the display device 417 by causing the communication unit 420 to transmit a control signal to the display device 417 as appropriate. Upon detection of user's entry indicative of an item name by the input unit 421, the control unit 423 may correct an item name of the object corresponding to the partial image to the item name indicated by the user's entry.

As in the above embodiment, the control unit 423 may detect the number of objects from a taken image by a known object detection method before performing the processing such as the first processing. In this case, in a case where a plurality of objects are detected from the taken image, the control unit 423 may perform the first processing, the second processing, and the third processing for each of partial images corresponding to the objects and give a degree of reliability to processing results of the first processing, the second processing, and the third processing. Furthermore, the control unit 423 may specify an object or a candidate for the object in accordance with the degree of reliability for each of the partial images.

Figure 33:
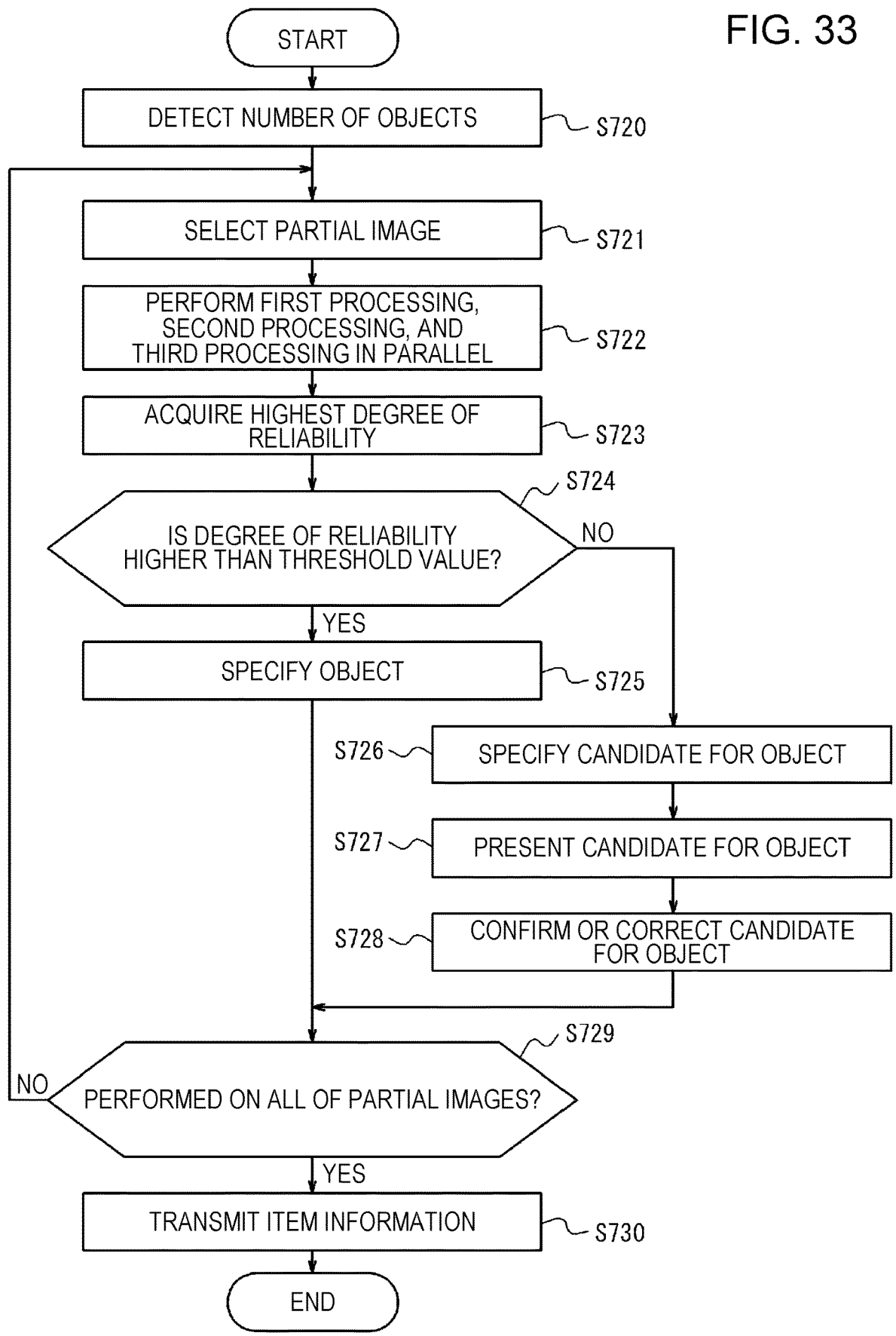
FIG. 33 is a flowchart illustrating object specifying processing of the information processing system according to still another embodiment of the present disclosure.

FIG. 33 is a flowchart illustrating object specifying processing of the information processing system 410 according to the embodiment of the present disclosure. The control unit 423 may perform the object specifying processing every time an image signal corresponding to a taken image of 1 frame is acquired from the camera 416. The control unit 423 may cause the acquired taken image to be stored in the storage unit 422.

The control unit 423 performs a process in step S720 in the same manner as the process in step S710 illustrated in FIG. 32. The control unit 423 selects a partial image on which a process in step S725 or step S728, which will be described later, has not been performed (step S721).

The control unit 423 performs the first processing, the second processing, and the third processing in parallel on the partial image selected in the process in step S721 (step S722). In the process in step S722, the control unit 423 gives a degree of reliability to a processing result of the first processing, a processing result of the second processing, and a processing result of the third processing.

The control unit 423 acquires a highest degree of reliability from among the degrees of reliability given to the recognition results of the first processing, the second processing, and the third processing (step S723). The control unit 423 determines whether or not the highest degree of reliability is higher than a threshold value (step S724). In a case where the control unit 423 determines that the highest degree of reliability is higher than the threshold value (YES in step S724), the control unit 423 proceeds to the process in step S725. On the other hand, in a case where the control unit 423 determines that the highest degree of reliability is equal to or lower than the threshold value (NO in step S724), the control unit 423 proceeds to a process in step S726.

In the process in step S725, the control unit 423 specifies an object corresponding to the partial image on the basis of a processing result given the highest degree of reliability.

In the process in step S726, the control unit 423 specifies a candidate for an object on the basis of the processing result given the highest degree of reliability. In a process in step S727, the control unit 423 presents the candidate for the object to the customer by causing the candidate for the object to be displayed on the display device 417. In a process in step S728, the control unit 423 confirms or corrects the candidate for the object in accordance with user's entry detected by the input unit 421.

In a process in step S729, the control unit 423 determines whether or not the process in step S725 or the process in step S728 has been performed on all of partial images corresponding to objects included in the taken image. In a case where the control unit 423 does not determine that the process in step S725 or the process in step S728 has been performed on all of the partial images (NO in step S729), the control unit 423 returns to the process in step S721. On the other hand, in a case where the control unit 423 determines that the process in step S725 or the process in step S728 has been performed on all of the partial images (YES in step S729), the control unit 423 proceeds to a process in step S730.

In the process in step S730, the control unit 423 causes the communication unit 420 to transmit item information specified by the process in step S725 or item information confirmed or corrected in the process in step S728 to the server 412 over the network 413.

The number of items which a customer buys may be one or two depending on a store type. In this case, the processes in steps S720, S721, and S729 need not be performed. In a case where the processes in steps S720, S721, and S729 are not performed, the control unit 423 may perform the first processing, the second processing, and the third processing on a taken image.

Furthermore, in the process in step S722, the control unit 423 need not perform the first processing, the second processing, and the third processing in parallel. For example, the control unit 423 may perform the first processing, the second processing, and the third processing sequentially in a predetermined order.

Processing of the information processing device 418 according to still another embodiment of the present disclosure is described. In the present embodiment, the control unit 423 performs plural kinds of processing on a taken image in a predetermined order. In the following description, it is assumed that the predetermined order is an order of the first processing, the second processing, and the third processing. However, the predetermined order is not limited to the order of the first processing, the second processing, and the third processing.

The control unit 423 performs the first processing on a taken image and gives a degree of reliability to a processing result of the performed first processing. In a case where the degree of reliability is higher than a threshold value, the control unit 423 specifies an object corresponding to a partial image on the basis of the processing result of the first processing. The threshold value may be set as appropriate, for example, on the basis of a rate of correctness of past processing results, as described above. A processing speed of the first processing can be relatively high, as described above. By performing the first processing first, an object can be specified more speedily in a case where an item has a character string thereon.

In a case where the degree of reliability given to the processing result of the first processing is equal to or lower than the threshold value, the control unit 423 performs the second processing on the taken image. The control unit 423 gives a degree of reliability to a processing result of the second processing. In a case where the degree of reliability given to the processing result of the second processing is higher than the threshold value, the control unit 423 specifies an object on the basis of the processing result of the second processing. A processing speed of the second processing can be higher than a processing speed of the third processing, as described above. By performing the second processing earlier than the third processing, an object can be specified more speedily in a case where the object can be specified by the second processing.

In a case where the degree of reliability given to the processing result of the second processing is equal to or lower than the threshold value, the control unit 423 performs the third processing on the taken image. The control unit 423 gives a degree of reliability to a processing result of the third processing. In a case where the degree of reliability given to the processing result of the third processing is higher than the threshold value, the control unit 423 specifies an object on the basis of the processing result of the third processing.

In a case where the degree of reliability given to the processing result of the third processing is equal to or lower than the threshold value, the control unit 423 specifies a candidate for an object on the basis of any of the processing result of the first processing, the processing result of the second processing, and the processing result of the third processing. The control unit 423 may specify the candidate for the object on the basis of a processing result given a highest degree of reliability among the processing results of the first processing, the second processing, and the third processing. As in the above embodiment, in a case where the control unit 423 specifies the candidate for the object, the control unit 423 may cause the candidate for the object to be displayed on the display device 417 by causing the communication unit 420 to transmit a control signal to the display device 417 as appropriate. The control unit 423 may present the candidate for the object to the customer by causing the candidate for the object to be displayed on the display device 417. As in the above embodiment, the control unit 423 may present a predetermined message to the customer together with the candidate for the object by causing the predetermined message to be displayed on the display device 417. As in the above embodiment, the control unit 423 may confirm or correct the candidate for the object in accordance with user's entry detected by the input unit 421.

As in the above embodiment, the control unit 423 may detect the number of objects from a taken image by a known object detection method before performing the processing such as the first processing. In this case, in a case where a plurality of objects are detected from the taken image, the control unit 423 may perform the first processing, the second processing, and the third processing sequentially for each of partial images corresponding to the objects and give a degree of reliability to processing results of the first processing, the second processing, and the third processing. Furthermore, the control unit 423 may specify an object or a candidate for the object in accordance with the degree of reliability for each of the partial images.

Figure 34:
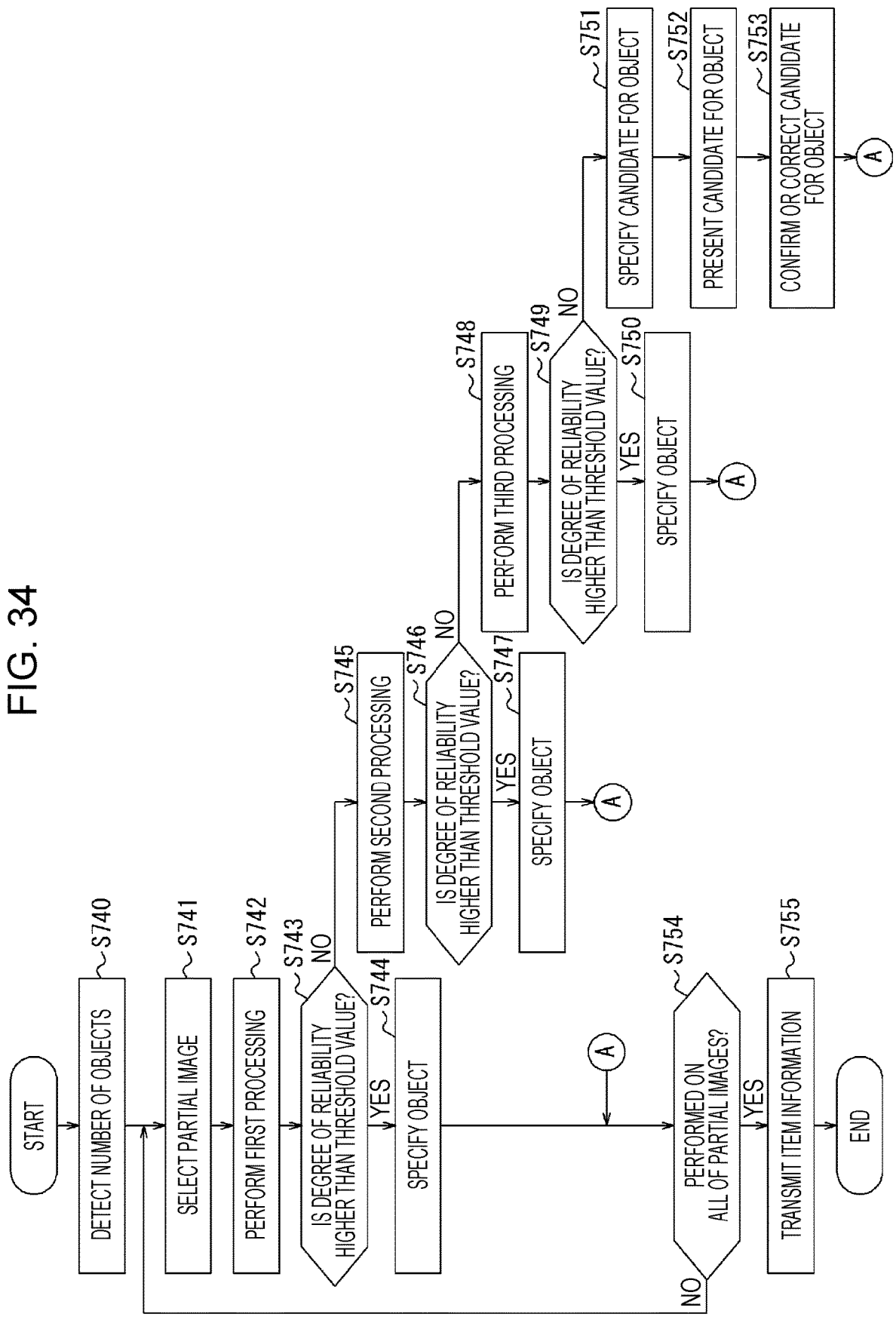
FIG. 34 is a flowchart illustrating object specifying processing of the information processing system according to still another embodiment of the present disclosure.

FIG. 34 is a flowchart illustrating object specifying processing of the information processing system 410 according to the embodiment of the present disclosure. The control unit 423 may perform the object specifying processing every time an image signal corresponding to a taken image of 1 frame is acquired from the camera 416. The control unit 423 may cause the acquired taken image to be stored in the storage unit 422.

The control unit 423 performs a process in step S740 in the same manner as the process in step S710 illustrated in FIG. 32. The control unit 423 selects a partial image on which any of processes in steps S744, S747, S750, and S753, which will be described later, has not been performed (step S741).

The control unit 423 performs the first processing on the partial image selected in the process of step S741 (step S742). In the process of step S742, the control unit 423 gives a degree of reliability to a processing result of the performed first processing.

The control unit 423 determines whether or not the degree of reliability given to the processing result of the first processing is higher than the threshold value (step S743). In a case where the control unit 423 determines that the degree of reliability is higher than the threshold value (YES in step S743), the control unit 423 proceeds to a process in step S744. On the other hand, in a case where the control unit 423 determines that the degree of reliability is equal to or lower than the threshold value (NO in step S743), the control unit 423 proceeds to a process in step S745.

In the process in step S744, the control unit 423 specifies an object corresponding to the partial image on the basis of the processing result of the first processing. After performing the process in step S744, the control unit 423 proceeds to a process in step S754.

In the process in step S745, the control unit 423 performs the second processing on the partial image selected in the process in step S741. In the process in step S745, the control unit 423 gives a degree of reliability to a processing result of the second processing.

In a process in step S746, the control unit 423 determines whether or not the degree of reliability given to the processing result of the second processing is higher than the threshold value. In a case where the control unit 423 determines that the degree of reliability is higher than the threshold value (YES in step S746), the control unit 423 proceeds to a process in step S747. On the other hand, in a case where the control unit 423 determines that the degree of reliability is equal to or lower than the threshold value (NO in step S746), the control unit 423 proceeds to a process in step S748.

In the process in step S747, the control unit 423 specifies an object on the basis of the processing result of the second processing. After performing the process in step S747, the control unit 423 proceeds to the process in step S754.

In the process in step S748, the control unit 423 performs the third processing on the partial image selected in the process in step S741. In the process in step S748, the control unit 423 gives a degree of reliability to a processing result of the third processing.

In a process in step S749, the control unit 423 determines whether or not the degree of reliability given to the processing result of the third processing is higher than the threshold value. In a case where the control unit 423 determines that the degree of reliability is higher than the threshold value (YES in step S749), the control unit 423 proceeds to a process in step S750. On the other hand, in a case where the control unit 423 determines that the degree of reliability is equal to or lower than the threshold value (NO in step S749), the control unit 423 proceeds to a process in step S751.

In the process in step S750, the control unit 423 specifies an object on the basis of the processing result of the third processing. After performing the process in step S750, the control unit 423 proceeds to the process in step S754.

In the process in step S751, the control unit 423 specifies a candidate for an object on the basis of any of the processing result of the first processing, the processing result of the second processing, and the processing result of the third processing. In a process in step S752, the control unit 423 presents the candidate for the object to the customer by causing the candidate for the object to be displayed on the display device 417. In a process in step S753, the control unit 423 confirms or corrects the candidate for the object in accordance with user's entry detected by the input unit 421. After performing the process in step S753, the control unit 423 proceeds to the process in step S754.

In the process in step S754, the control unit 423 determines whether or not any of the processes in steps S744, S747, S750, and S753 has been performed on all of partial images corresponding to objects included in the taken image. In a case where the control unit 423 does not determine that any of the processes in steps S744, S747, S750, and S753 has been performed on all of the partial images (NO in step S754), the control unit 423 returns to the process in step S741. On the other hand in a case where the control unit 423 determines that any of the processes in steps S744, S747, S750, and S753 has been performed on all of the partial images (YES in step S754), the control unit 423 proceeds to the process in step S755.

In the process in step S755, the control unit 423 causes the communication unit 420 to transmit item information specified in the process in step S744, S747, or S750 and item information confirmed or corrected in the process in step S753 to the server 412 over the network 413.

The number of items which a customer buys may be one or two depending on a store type. In this case, the processes in steps S740, S741, and S754 need not be performed. In a case where the processes in steps S740, S741, and S754 are not performed, the control unit 423 may perform the first processing, the second processing, and the third processing on a taken image in the processes in steps S742, S745, and S748.

Processing of the information processing device 418 according to still another embodiment of the present disclosure is described. In the present embodiment, in a case where an object in a predetermined state on the placing table 414 is detected from a taken image, the control unit 423 specifies the object by performing image processing according to the predetermined state on a partial image corresponding to the object.

In a case where an overlapping object is detected from a taken image as an object in the predetermined state, the control unit 423 may detect the object by performing the second processing on a partial image corresponding to the object. The control unit 423 may detect an overlapping object from a taken image by a known method. The overlapping object may be an object that overlaps another object and is located below the other object and whose corresponding partial image has a missing part. In this case, the overlapping object can be butter corresponding to the partial image 430b and chocolate corresponding to the partial image 430c in the example of the taken image 430 (FIG. 30). Alternatively, the overlapping object may be all objects that overlap each other. In this case, the overlapping object can be a rice ball corresponding to the partial image 430a, butter corresponding to the partial image 430b, and chocolate corresponding to the partial image 430c in the taken image 430.

In a case where a deformed object is detected from a taken image as an object in the predetermined state, the control unit 423 may detect the object by performing the third processing on a partial image corresponding to the object. The control unit 423 may detect a deformed object from a taken image by a known method.

In a case where an object detected from a taken image is not an overlapping object nor a deformed object as an object in the predetermined state, the control unit 423 may detect the object by performing the first processing on a partial image corresponding to the object. In a case where a character string is detected from a predetermined image as the predetermined state, the control unit 423 may specify an object for which the character string has been detected by performing the first processing.

In a case where an object generating halation is detected from a taken image as an object in the predetermined state, the control unit 423 may specify the object by performing the second processing on a partial image corresponding to the object. In a case where a light amount of reflected light from a part of an object is locally large, halation can be generated in a partial image corresponding to the object. Examples of the object generating halation include an object including a mirror surface and an object including a glossy surface. The control unit 423 may detect an object generating halation from a taken image by a known method. The control unit 423 may specify an object by performing the second processing in a region of a partial image excluding a region where halation is generated. In a case where halation is generated in a partial image, even in the object has a character string thereon, the control unit 423 cannot sometimes extract the character string from the partial image. In this case, it can be difficult to specify the object by the first processing. Furthermore, in a case where halation is generated in a partial image, the control unit 423 cannot sometimes detect features used for the third processing from the partial image. In this case, it can be difficult to specify the object by the third processing.

In a case where a broken object is detected from a taken image as an object in the predetermined state, the control unit 423 may cause information indicating that an item is broken to be displayed on the display device 417 by causing the communication unit 420 to transmit a control signal to the display device 417 as appropriate. The control unit 423 may present the information indicating that an item is broken to a customer and/or a store clerk by causing the information indicating that an item is broken to be displayed on the display device 417.

In a case where a dirty object is detected from a taken image as an object in the predetermined state, the control unit 423 may cause information indicating that an item is dirty to be displayed on the display device 417 by causing the communication unit 420 to transmit a control signal to the display device 417 as appropriate. The control unit 423 may present the information indicating that an item is dirty to a customer and/or a store clerk by causing the information indicating that an item is dirty to be displayed on the display device 417.

As in the above embodiment, the control unit 423 may detect the number of objects from a taken image by a known object detection method. In this case, in a case where a plurality of objects are detected from a taken image, the control unit 423 may specify each of the objects by performing image processing according to a state of the object among plural kinds of image processing on a partial image corresponding to the object.

Figure 35:
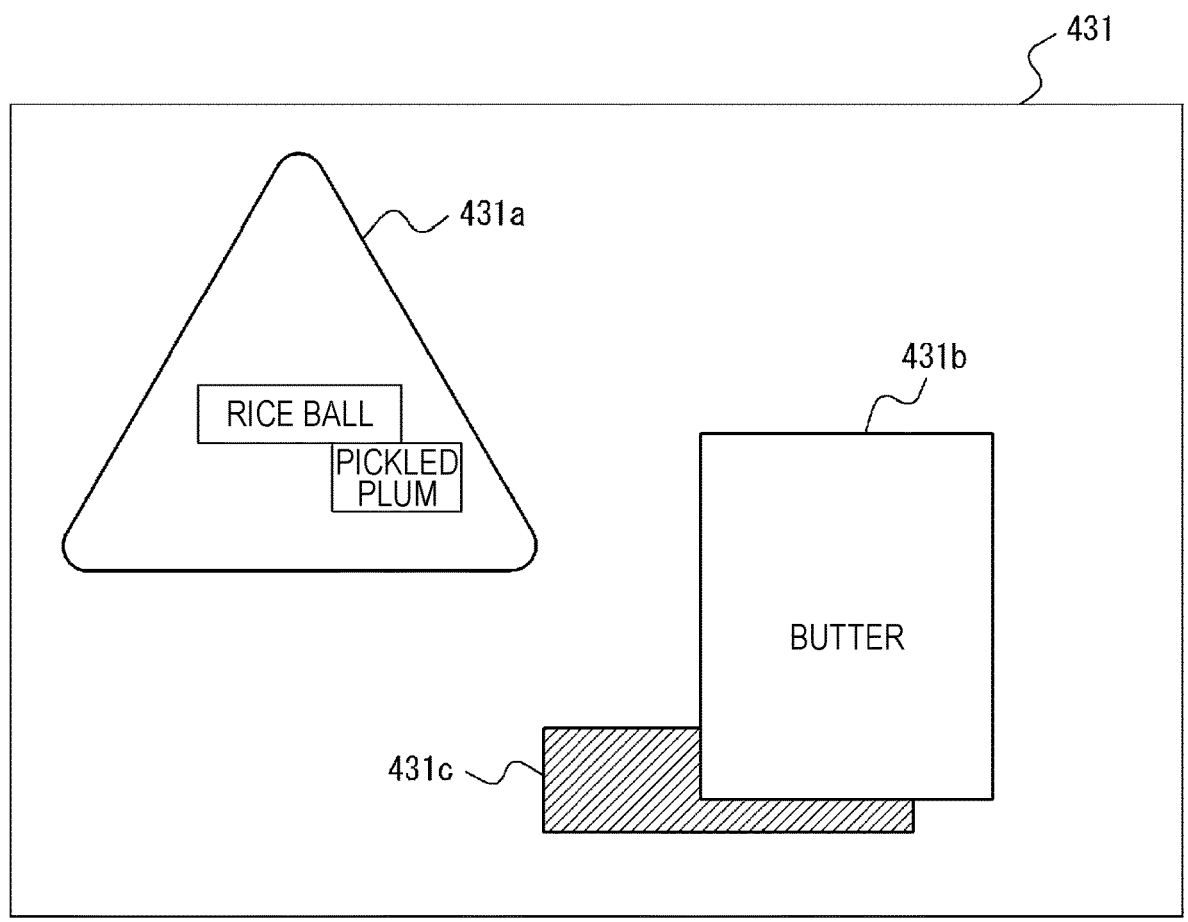
FIG. 35 illustrates an example of a taken image according to still another embodiment of the present disclosure.

An example of the processing is described below. The control unit 423 acquires a taken image 431 such as the one illustrated in FIG. 35. The taken image 431 includes a partial image 431*a*, a partial image 431*b*, and a partial image 431*c*. The partial image 431*a*, the partial image 431*b*, and the partial image 431*c* are parts of the taken image 431. The control unit 423 can determine that an object corresponding to the partial image 431*a* is not an overlapping object nor a deformed object. The control unit 423 can determine that an object corresponding to the partial image 431*b* and an object corresponding to the partial image 431*c* are overlapping. The control unit 423 may specify an item name of the object corresponding to the partial image 431*a* as a "rice ball with pickled plum" by performing the first processing on the partial image 431*a*. The control unit 423 may specify an item name of the object corresponding to the partial image 431*b* as "butter" and specify an item name of the object corresponding to the partial image 430*c* as "chocolate" by performing the second processing and the partial image 431*b* and the partial image 431*c*.

Figure 36:
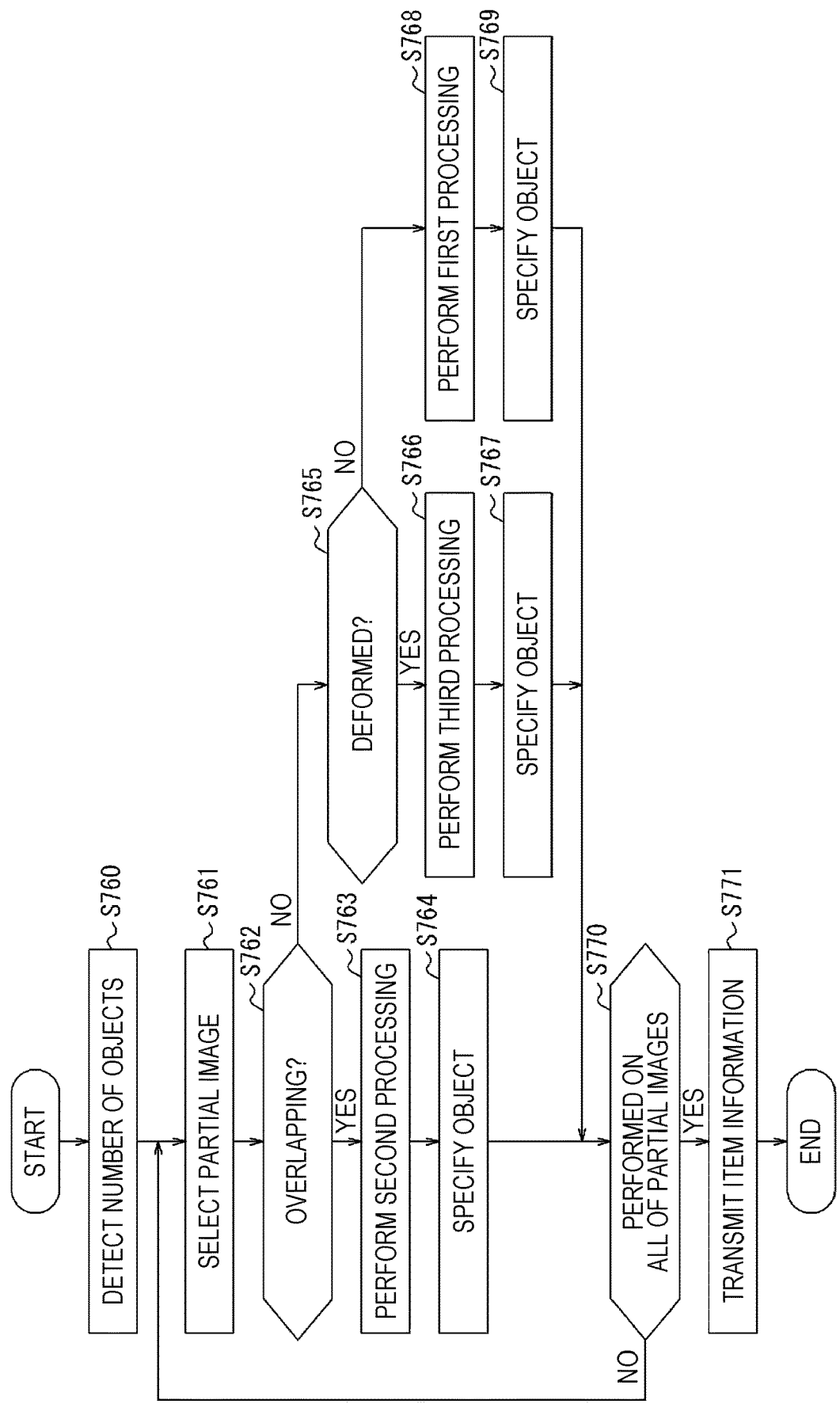
FIG. 36 is a flowchart illustrating object specifying processing of an information processing system according to the embodiment of the present disclosure.

FIG. 36 is a flowchart illustrating object specifying processing of the information processing system 410 according to the embodiment of the present disclosure. The control unit 423 may perform the object specifying processing every time an image signal corresponding to a taken image of 1 frame is acquired from the camera 416. The control unit 423 may cause the acquired taken image to be stored in the storage unit 422.

The control unit 423 performs a process in step S760 in the same manner as the process in step S710 illustrated in FIG. 32. The control unit 423 selects a partial image on which any of processes in steps S764, S767, and S769, which will be described later, has not been performed (step S761).

The control unit 423 determines whether or not an object corresponding to the partial image selected in the process in step S761 is an overlapping object (step S762). In a case where the control unit 423 determines that the object is an overlapping object (YES in step S762), the control unit 423 proceeds to a process in step S763. On the other hand, in a case where the control unit 423 determines that the object is not an overlapping object (NO in step S762), the control unit 423 proceeds to a process in step S765.

In the process in step S763, the control unit 423 performs the second processing on the partial image selected in the process in step S761. In a process in step S764, the control unit 423 specifies an object corresponding to the partial image on the basis of a processing result of the second processing in the process in step S763. After performing the process in step S764, the control unit 423 proceeds to a process in step S770.

In the process in step S765, the control unit 423 determines whether or not the object corresponding to the partial image selected in the process in step S761 is a deformed object. In a case where the control unit 423 determines that the object is a deformed object (YES in step S765), the control unit 423 proceeds to a process in step S766. On the other hand, in a case where the control unit 423 determines that the object is not a deformed object (NO in step S765), the control unit 423 proceeds to a process in step S768.

In the process in step S766, the control unit 423 performs the third processing on the partial image selected in the process in step S761. In a process in step S767, the control unit 423 specifies an object corresponding to the partial image on the basis of a processing result of the third processing in the process in step S766. After performing the process in step S766, the control unit 423 proceeds to the process in step S770.

In the process in step S768, the control unit 423 performs the first processing on the partial image selected in the process in step S761. That is, in a case where the object corresponding to the partial image selected in the process in step S761 is not an overlapping object nor a deformed object, the control unit 423 performs the first processing on the partial image. In a process in step S769, the control unit 423 specifies an object corresponding to the partial image on the basis of a processing result of the first processing in the process in step S768. After performing the process in step S769, the control unit 423 proceeds to the process in step S770.

In the process in step S770, the control unit 423 determines whether or not any of the processes in steps S764, S767, and S769 has been performed on all of partial images corresponding to objects included in the taken image. In a case where the control unit 423 does not determine that any of the processes in steps S764, S767, and S769 has been performed on all of the partial images (NO in step S770), the control unit 423 returns to the process in step S761. On the other hand, in a case where the control unit 423 determines that any of the processes in steps S764, S767, and S769 has been performed on all of the partial images (YES in step S770), the control unit 423 proceeds to a process in step S771.

In the process in step S771, the control unit 423 causes the communication unit 420 to transmit item information specified in the process in step S764, S767, or S769 to the server 412 over the network 413.

The number of items which a customer buys may be one or two depending on a store type. In this case, the processes in steps S760, S761, and S770 need not be performed. In a case where the processes in steps S760, S761, and S770 are not performed, the control unit 423 may perform the first processing, the second processing, and the third processing on a taken image.

Processing of the information processing device 418 according to still another embodiment of the present disclosure is described. In the present embodiment, processing for calculating a price of an item in the information processing device 418 is described. In the present embodiment, the storage unit 422 may store therein prices of items associated with item names.

After specifying an item name of an object, the control unit 423 determines whether or not an image of a discount sticker is included in a partial image corresponding to the object. In a case where the control unit 423 determined that an image of a discount sticker is included, the control unit 423 acquires discount information from the image of the discount sticker. For example, the control unit 423 acquires information such as "**-yen discount". The control unit 423 confirms a price of an item on the basis of the acquired information and a price of the item stored in the storage unit 422. On the other hand, in a case where the control unit 423 determines that an image of a discount sticker is not included, the control unit 423 confirms a price of the item stored in the storage unit 422 as a price of the item.

The control unit 423 may cause the communication unit 420 to transmit the confirmed price of the item to the server 412 over the network 413. Alternatively, the control unit 423 may cause the price of the item to be displayed on the display device 417 by causing the communication unit 420 to transmit a control signal to the display device 417 as appropriate. The control unit 423 may present the price of the item to a customer by causing the price of the item to be displayed on the display device 417.

Figure 37:
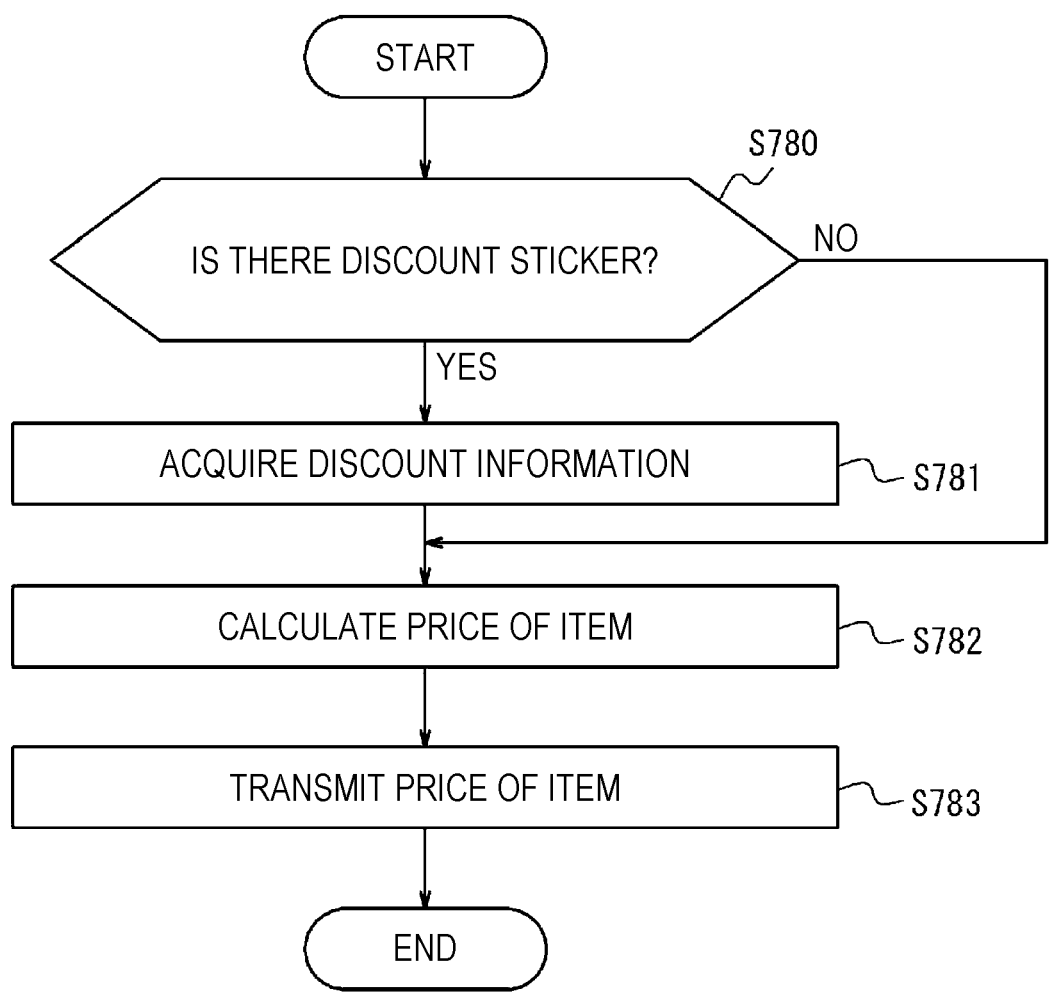
FIG. 37 is a flowchart illustrating item price calculating processing of an information processing system according to still another embodiment of the present disclosure.

FIG. 37 is a flowchart illustrating item price calculating processing of the information processing system 410 according to the embodiment of the present disclosure. The control unit 423 may perform the item price calculating processing instead of the process in step S716 illustrated in FIG. 35, the process in step S730 illustrated in FIG. 33, the process in step S755 illustrated in FIG. 34, and the process in step S771 illustrated in FIG. 36.

The control unit 423 determines whether or not an image of a discount sticker is included in a partial image corresponding to an object (step S780). In a case where the control unit 423 determines that an image of a discount sticker is included (YES in step S780), the control unit 423 proceeds to a process in step S781. On the other hand, in a case where the control unit 423 does not determine that an image of a discount sticker is included (NO in step S780), the control unit 423 proceeds to a process in step S782.

In the process in step S782, the control unit 423 acquires discount information from the image of the discount sticker.

In the process in step S783, in a case where the discount information is acquired in the process in step S782, the control unit 423 confirms a price of an item on the basis of the acquired information and a price of the item stored in the storage unit 422. In a case where the control unit 423 determines in the process in step S781 that an image of a discount sticker is not included, the control unit 423 confirms a price of the item stored in the storage unit 422 as a price of the item.

In a process in step S784, the control unit 423 causes the communication unit 420 to transmit the confirmed price of the item to the server 412 over the network 413. Instead of transmitting the confirmed price of the item, the control unit 423 may present the price of the item to a customer by causing the price of the item to be displayed on the display device 417.

Although the present disclosure has been described based on the drawings and embodiments, it should be noted that various changes and modifications can be easily made based on the present disclosure by a person skilled in the art. Therefore, it should be noted that such changes and modifications are encompassed within the scope of the present disclosure. For example, functions and the like included in units, steps, and the like can be rearranged as long as logical inconsistency does not occur, and plural units, steps, and the like can be combined to one or may be divided.

Figure 5:
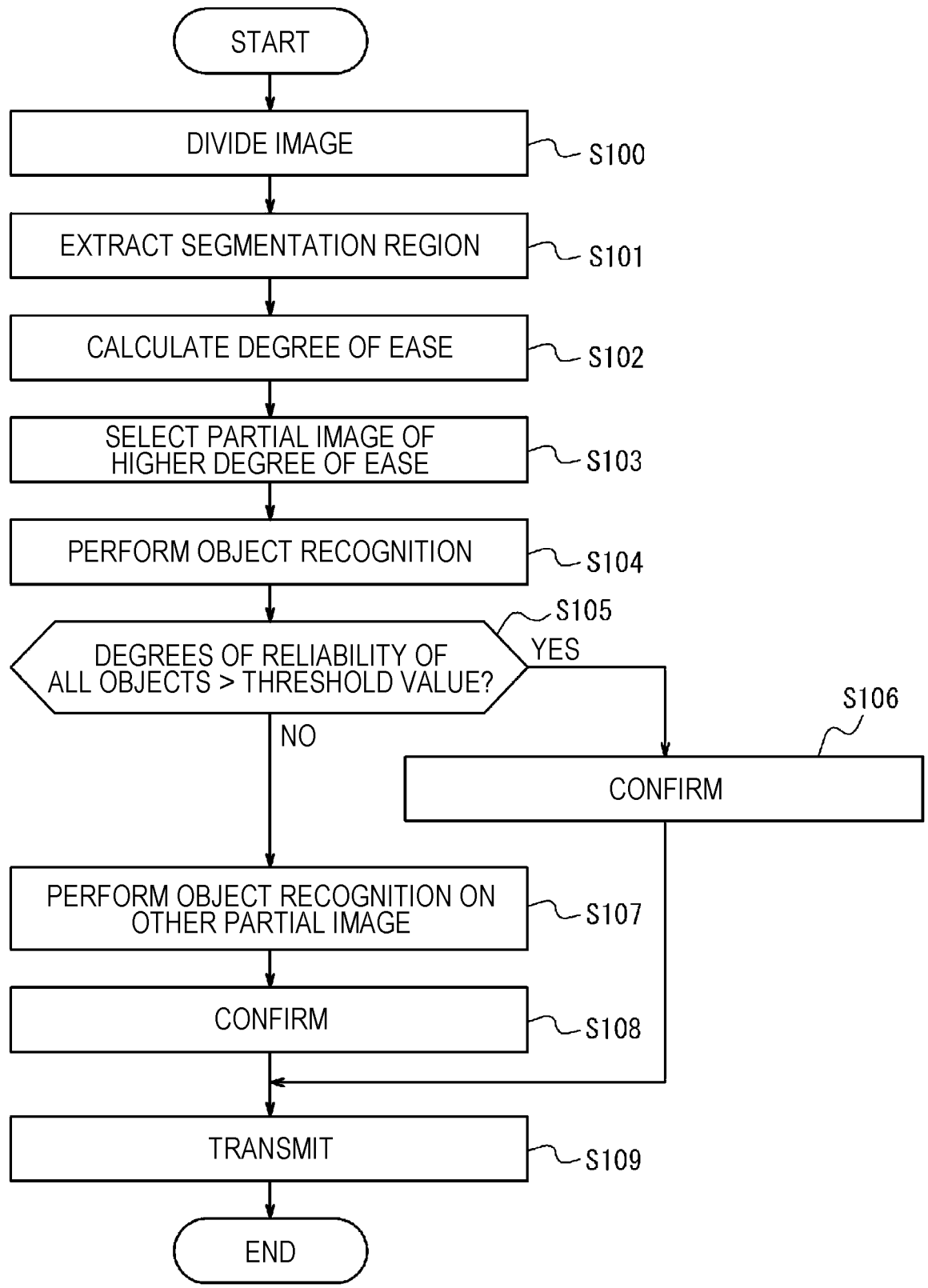
FIG. 5 is a flowchart for explaining confirming processing according to a first method performed by a control unit of FIG. 3.
Figure 6:
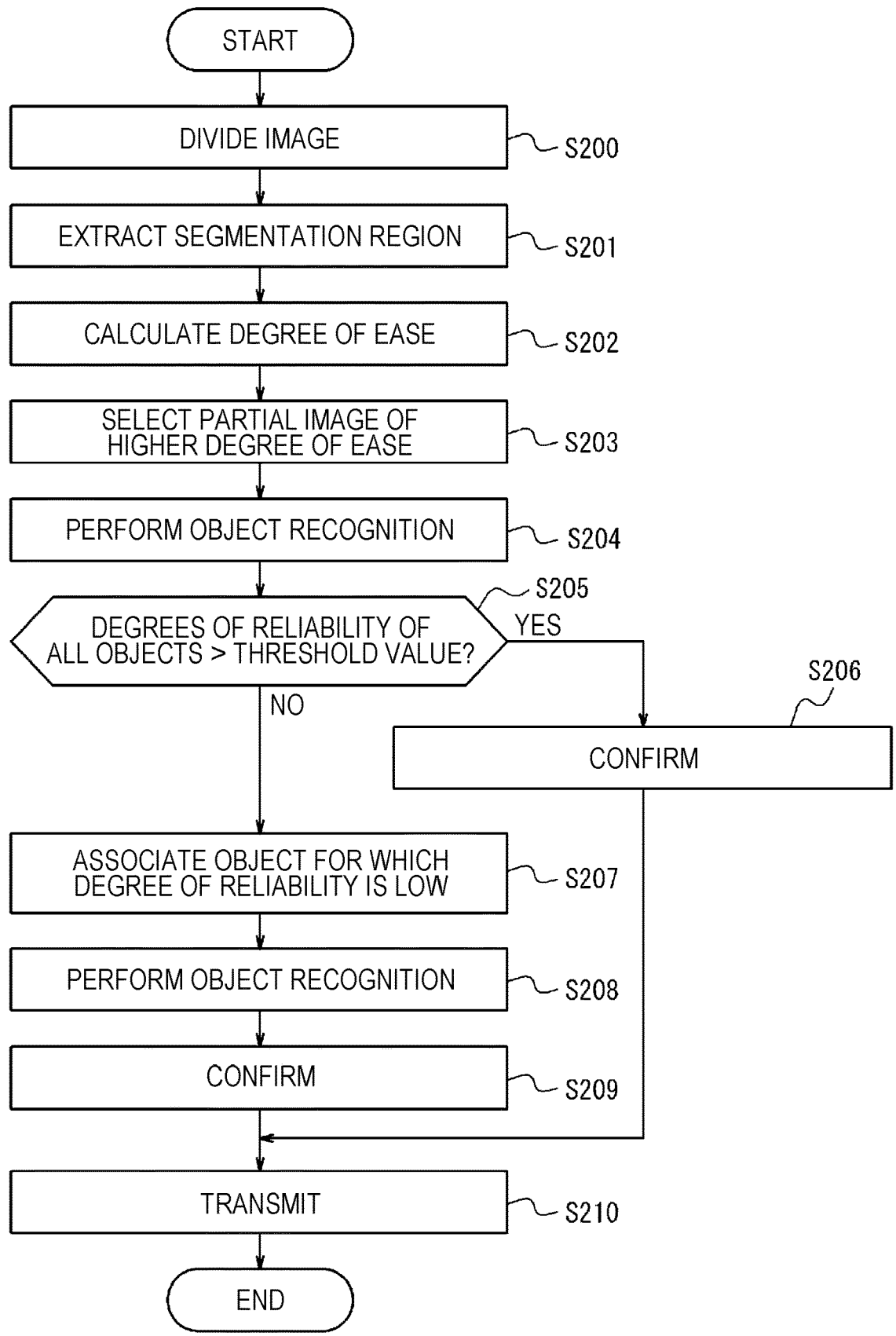
FIG. 6 is a flowchart for explaining confirming processing according to a second method performed by the control unit of FIG. 3.

For example, although the information processing system 10 calculates degrees of ease and performs object recognition earlier on one of the first and second partial images $im_{p1}$ and $im_{p2}$ on the basis of the degrees of ease according to the first method and the second method in the above embodiment as illustrated in FIGS. 5 and 6, object recognition may be performed on a predetermined one of the first and second partial images $im_{p1}$ and $im_{p2}$ without calculating degrees of ease.

Furthermore, although the information processing system 10 is included in a register terminal in the above embodiments, application of the information processing system 10 is not limited to a register terminal. For example, the information processing system 10 can be applied to object recognition in check of a stock, detection of a defective product, and the like in a warehouse or the like.

For example, in the above embodiments, the camera 416 images an item placed on the placing surface 414a of the placing table 414 by a customer. However, an item imaged by the camera 416 is not limited to an item placed on the placing surface 414a of the placing table 414. For example, the camera 416 may image an item that is not placed on the placing surface 414a of the placing table 414 by is held before the camera 416 by a customer.

In the present disclosure, expressions such as "first" and "second" are identifiers for distinguishing constituent elements. Constituent elements distinguished by expressions such as "first" and "second" in the present disclosure can exchange their numbers. For example, a first partial image and a second partial image can exchange their identifiers "first" and "second". The exchange of the identifiers is performed concurrently. Even after the exchange of the identifiers, the constituent elements are distinguished. The identifiers may be deleted. Constituent elements from which identifiers have been deleted are distinguished by reference signs. The identifiers such as "first" and "second" in the present disclosure should not be used for interpretation of an order of constituent elements and should not be used as a ground for the presence of an identifier of a smaller number.

REFERENCE SIGNS LIST 10 information processing system
11 payment system
12 server
13 network
14 camera 15 reflecting unit
16 display
17 information processing device
18 placing table
19 support pole
20 communication unit
21 input unit
22 storage unit
23 control unit
im image
$im_{p1}$ first partial image
$im_{p2}$ second partial image
rs reflecting surface
us upper surface
110,210,310 information processing system
111 payment system
112 server
113 network
114 placing table
114a placing surface
115 support pole
116 camera
117 display device
118 information processing device
119 weight sensor
120 communication unit
121 input unit
314 shopping basket
122 storage unit
123 control unit
130,131,132,133,134 taken image
131a,132a,132b,133a,133b,134a,134b,134c partial image
140,141,142 difference image
140a,141a,142a,142b partial image
410 information processing system
411 payment system
412 server
413 network
414 placing table
414a placing surface
415 support pole
416 camera
417 display device
418 information processing device
420 communication unit
421 input unit
422 storage unit
423 control unit
430,431 taken image
430a,430b,430c,431a,431b,431c partial image

The invention claimed is:

1. An information processing system comprising:
an imaging unit that generates an image signal by imaging; and
an information processing device that performs at least any one of plural kinds of image processing on a taken image corresponding to the image signal,
wherein
in a case where the degree of reliability each of the processing results of first processing that is object recognition processing using character recognition and second processing that is object recognition processing using machine learning is equal to or lower than a threshold value, the information processing device performs, on the taken image, third processing that is object recognition processing using feature matching and is different from the second processing among the plural kinds of image processing, and
in a case where the degree of reliability of the processing result of the third processing is higher than the threshold value, the information processing device specifies the object on a basis of the processing result of the third processing.

2. The information processing system according to claim 1, wherein
at least any one of symbol recognition, machine learning, and feature matching is used in the image processing.

3. The information processing system according to claim 1, wherein
the information processing device performs at least two of the plural kinds of image processing, gives degrees of reliability to processing results of the performed image processing, and specifies the object on a basis of a processing result given a highest degree of reliability among the processing results.

4. The information processing system according to claim 3, wherein
in a case where a plurality of objects are detected from the taken image, the information processing device performs at least two of the plural kinds of image processing for each of partial images corresponding to the objects, gives degrees of reliability to processing results of the performed image processing, and specifies each of the objects on a basis of a processing result given a highest degree of reliability among the processing results.

5. The information processing system according to claim 1, wherein
the information processing device performs at least two of the plural kinds of image processing, gives degrees of reliability to processing results of the performed image processing, and in a case where a highest degree of reliability is higher than a threshold value, specifies the object on a basis of a processing result given the highest degree of reliability among the processing results.

6. The information processing system according to claim 5, wherein
in a case where a plurality of objects are detected from the taken image, the information processing device specifies each of the objects or specifies a candidate for each of the objects by performing at least two of the plural kinds of image processing for each of partial images corresponding to the objects.

7. The information processing system according to claim 1, wherein
the information processing device performs at least two of the plural kinds of image processing, gives degrees of reliability to processing results of the performed image processing, and in a case where a highest degree of reliability is equal to or lower than a threshold value, specifies a candidate for the object on a basis of a processing result given the highest degree of reliability among the processing results.

8. The information processing system according to claim 7, wherein
in a case where a plurality of objects are detected from the taken image, the information processing device specifies each of the objects or specifies a candidate for each of the objects by performing at least two of the plural kinds of image processing for each of partial images corresponding to the objects.

9. The information processing system according to claim 1, wherein in a case where a plurality of objects are detected from the taken image, the information processing device sequentially performs the first processing, the second processing, and the third processing for each of partial images corresponding to the objects.

10. The information processing system according to claim 1, wherein
in a case where an object in a predetermined state is detected from the taken image, the information processing system specifies the object by performing image processing according to the predetermined state among the plural kinds of image processing on a partial image corresponding to the object.

11. The information processing system according to claim 10, wherein
in a case where an overlapping object is detected from the taken image, the information processing device specifies the object by performing second processing that is object recognition processing using machine learning among the plural kinds of image processing on a partial image corresponding to the object.

12. The information processing system according to claim 10, wherein
in a case where a deformed object is detected from the taken image, the information processing device specifies the object by performing third processing that is object recognition processing using feature matching among the plural kinds of image processing on a partial image corresponding to the object.

13. The information processing system according to claim 10, wherein
in a case where an object detected from the taken image is not an overlapping object nor a deformed object, the information processing device specifies the object by performing first processing that is object recognition processing using character recognition among the plural kinds of image processing on a partial image corresponding to the object.

14. The information processing system according to claim 10, wherein
in a case where a plurality of objects are detected from the taken image, the information processing device specifies each of the objects by performing image processing according to a state of the object among the plural kinds of image processing on a corresponding partial image.

15. The information processing system according to claim 1, further comprising a placing table on which an item that is the object is placed,
wherein the imaging unit is disposed so as to be capable of imaging a placing surface of the placing table.

16. An information processing device comprising:
a communication unit that is communicable with an imaging unit that generates an image signal by imaging; and
a control unit that causes the communication unit to acquire a taken image corresponding to the image signal and performs at least any one of plural kinds of image processing on the acquired taken image,
wherein
in a case where the degree of reliability each of the processing results of first processing that is object recognition processing using character recognition and second processing that is object recognition processing using machine learning is equal to or lower than a threshold value, the control unit performs, on the taken image, third processing that is object recognition processing using feature matching and is different from the second processing among the plural kinds of image processing, and
in a case where the degree of reliability of the processing result of the third processing is higher than the threshold value, the control unit specifies the object on a basis of the processing result of the third processing.

17. An information processing method comprising:
generating an image signal by imaging;
acquiring a taken image corresponding to the image signal and performing at least any one of plural kinds of image processing on the acquired taken image;
in a case where the degree of reliability each of the processing results of first processing that is object recognition processing using character recognition and second processing that is object recognition processing using machine learning is equal to or lower than a threshold value, performing, on the taken image, third processing that is object recognition processing using feature matching and is different from the second processing among the plural kinds of image processing; and
in a case where the degree of reliability of the processing result of the third processing is higher than the threshold value, specifying the object on a basis of the processing result of the third processing.

* * * * *